US010537974B2

(12) United States Patent
Bajaj et al.

(10) Patent No.: US 10,537,974 B2
(45) Date of Patent: Jan. 21, 2020

(54) CMP PAD CONSTRUCTION WITH COMPOSITE MATERIAL PROPERTIES USING ADDITIVE MANUFACTURING PROCESSES

(71) Applicant: Applied Materials, Inc., Santa Clara, CA (US)

(72) Inventors: Rajeev Bajaj, Fremont, CA (US); Kasiraman Krishnan, Milpitas, CA (US); Mahendra C. Orilall, Downingtown, PA (US); Daniel Redfield, Morgan Hill, CA (US); Fred C. Redeker, Fremont, CA (US); Nag B. Patibandla, Pleasanton, CA (US); Gregory E. Menk, Pleasanton, CA (US); Jason G. Fung, Santa Clara, CA (US); Russell Edward Perry, Pleasanton, CA (US); Robert E. Davenport, Los Gatos, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 94 days.

(21) Appl. No.: 15/876,436

(22) Filed: Jan. 22, 2018

(65) Prior Publication Data
US 2018/0161954 A1 Jun. 14, 2018

Related U.S. Application Data

(62) Division of application No. 14/695,299, filed on Apr. 24, 2015, now Pat. No. 9,873,180.

(51) Int. Cl.
B24D 18/00 (2006.01)
B24B 37/26 (2012.01)
(Continued)

(52) U.S. Cl.
CPC ............ *B24B 37/26* (2013.01); *B24B 37/205* (2013.01); *B24B 37/22* (2013.01); *B24B 37/24* (2013.01);
(Continued)

(58) Field of Classification Search
CPC ....... B24B 37/26; B24B 37/205; B24B 37/22; B24B 37/24; B24D 18/00; B24D 18/0018;
(Continued)

(56) References Cited

U.S. PATENT DOCUMENTS 3,741,116 A 6/1973 Green et al.
4,575,330 A 3/1986 Hull
(Continued)

FOREIGN PATENT DOCUMENTS

CN 1345264 A 4/2002
CN 1484566 A 3/2004
(Continued)

OTHER PUBLICATIONS

Taiwan Office Action dated Jul. 4, 2019, for Taiwan Application/Patent No. 10413235.
(Continued)

*Primary Examiner* — Timothy V Eley
(74) *Attorney, Agent, or Firm* — Patterson + Sheridan LLP

(57) ABSTRACT

Embodiments of the disclosure generally provide polishing pads includes a composite pad body and methods for forming the polishing pads. One embodiment provides a polishing pad including a composite pad body. The composite pad body includes one or more first features formed from a first material or a first composition of materials, and one or more second features formed from a second material or a second composition of materials, wherein the one or more first
(Continued)

features and the one or more second features are formed by depositing a plurality of layers comprising the first material or first composition of materials and second material or second composition of materials.

8 Claims, 33 Drawing Sheets

Related U.S. Application Data

(60) Provisional application No. 62/065,193, filed on Oct. 17, 2014, provisional application No. 62/065,270, filed on Oct. 17, 2014.

(51) Int. Cl.
*B24B 37/24* (2012.01)
*B33Y 80/00* (2015.01)
*B24B 37/20* (2012.01)
*B24B 37/22* (2012.01)
*B29C 64/112* (2017.01)

(52) U.S. Cl.
CPC ..... *B24D 18/0018* (2013.01); *B24D 18/0045* (2013.01); *B29C 64/112* (2017.08); *B33Y 80/00* (2014.12)

(58) Field of Classification Search
CPC .... B24D 18/0045; B29C 64/112; B33Y 80/00
See application file for complete search history.

(56) References Cited

U.S. PATENT DOCUMENTS

| | | | |
|---|---|---|---|
| 4,844,144 | A | 7/1989 | Murphy et al. |
| 4,942,001 | A | 7/1990 | Murphy et al. |
| 5,096,530 | A | 3/1992 | Cohen |
| 5,120,476 | A | 6/1992 | Scholz |
| 5,121,329 | A | 6/1992 | Crump |
| 5,212,910 | A | 5/1993 | Breivogel et al. |
| 5,287,663 | A | 2/1994 | Pierce et al. |
| 5,300,417 | A | 4/1994 | Lushington et al. |
| 5,387,380 | A | 2/1995 | Cima et al. |
| 5,533,923 | A | 7/1996 | Shamouilian et al. |
| 5,605,760 | A | 2/1997 | Roberts |
| 5,609,517 | A | 3/1997 | Lofaro |
| 5,626,919 | A | 5/1997 | Chapman et al. |
| 5,738,574 | A | 4/1998 | Tolles et al. |
| 5,876,268 | A | 3/1999 | Lamphere et al. |
| 5,900,164 | A | 5/1999 | Budinger et al. |
| 5,906,863 | A | 5/1999 | Lombardi et al. |
| 5,921,855 | A | 7/1999 | Osterheld et al. |
| 5,932,040 | A | 8/1999 | Audisio |
| 5,932,290 | A | 8/1999 | Lombardi et al. |
| 5,940,674 | A | 8/1999 | Sachs et al. |
| 5,984,769 | A | 11/1999 | Bennett et al. |
| 5,989,111 | A | 11/1999 | Lamphere et al. |
| 6,022,264 | A | 2/2000 | Cook et al. |
| 6,029,096 | A | 2/2000 | Manners et al. |
| 6,036,579 | A | 3/2000 | Cook et al. |
| 6,062,968 | A | 5/2000 | Sevilla et al. |
| 6,090,475 | A | 7/2000 | Robinson et al. |
| 6,095,902 | A | 8/2000 | Reinhardt |
| 6,117,000 | A | 9/2000 | Anjur et al. |
| 6,122,564 | A | 9/2000 | Koch et al. |
| 6,126,532 | A | 10/2000 | Sevilla et al. |
| 6,155,910 | A | 12/2000 | Lamphere et al. |
| 6,206,759 | B1 | 3/2001 | Agarwal et al. |
| 6,210,254 | B1 | 4/2001 | Cook et al. |
| 6,241,596 | B1 | 6/2001 | Osterheld et al. |
| 6,273,806 | B1 | 8/2001 | Bennett et al. |
| 6,328,634 | B1 | 12/2001 | Shen et al. |
| 6,361,832 | B1 | 3/2002 | Agarwal et al. |
| 6,423,255 | B1 | 7/2002 | Hoechsmann et al. |
| 6,454,634 | B1 | 9/2002 | James et al. |
| 6,488,570 | B1 | 12/2002 | James et al. |
| 6,500,053 | B2 | 12/2002 | James et al. |
| 6,520,847 | B2 | 2/2003 | Osterheld et al. |
| 6,569,373 | B2 | 5/2003 | Napadensky |
| 6,582,283 | B2 | 6/2003 | James et al. |
| 6,585,563 | B1 | 7/2003 | Redeker et al. |
| 6,641,471 | B1 | 11/2003 | Pinheiro et al. |
| 6,645,061 | B1 | 11/2003 | Bennett et al. |
| 6,682,402 | B1 | 1/2004 | Roberts et al. |
| 6,699,115 | B2 | 3/2004 | Osterheld et al. |
| 6,719,818 | B1 | 4/2004 | Birang et al. |
| 6,736,709 | B1 | 5/2004 | James et al. |
| 6,746,225 | B1 | 6/2004 | McHugh |
| 6,749,485 | B1 | 6/2004 | James et al. |
| 6,796,880 | B2 | 9/2004 | Redeker et al. |
| 6,811,937 | B2 | 11/2004 | Lawton |
| 6,840,843 | B2 | 1/2005 | Jones et al. |
| 6,860,793 | B2 | 3/2005 | Budinger et al. |
| 6,860,802 | B1 | 3/2005 | Vishwanathan et al. |
| 6,869,350 | B2 | 3/2005 | Roberts et al. |
| 6,875,097 | B2 | 4/2005 | Grunwald |
| 6,896,593 | B2 | 5/2005 | Prasad |
| 6,913,517 | B2 | 7/2005 | Prasad |
| 6,935,931 | B2 | 8/2005 | Prasad |
| 6,955,588 | B1 | 10/2005 | Anderson, II et al. |
| 6,984,163 | B2 | 1/2006 | Roberts |
| 6,991,517 | B2 | 1/2006 | Redeker et al. |
| 6,998,166 | B2 | 2/2006 | Prasad |
| 7,169,030 | B1 | 1/2007 | Kulp |
| 7,195,544 | B2 | 3/2007 | Prasad |
| 7,252,871 | B2 | 8/2007 | Crkvenac et al. |
| 7,264,641 | B2 | 9/2007 | Prasad |
| 7,267,607 | B2 | 9/2007 | Prasad |
| 7,300,619 | B2 | 11/2007 | Napadensky et al. |
| 7,311,862 | B2 | 12/2007 | Prasad |
| 7,371,160 | B1 | 5/2008 | Cruz et al. |
| 7,377,840 | B2 | 5/2008 | Deopura et al. |
| 7,425,172 | B2 | 9/2008 | Misra et al. |
| 7,435,161 | B2 | 10/2008 | Prasad et al. |
| 7,435,165 | B2 | 10/2008 | Prasad |
| 7,438,636 | B2 | 10/2008 | Kulp et al. |
| 7,445,847 | B2 | 11/2008 | Kulp |
| 7,455,571 | B1 | 11/2008 | Kuo et al. |
| 7,497,885 | B2 | 3/2009 | Kollodge |
| 7,517,488 | B2 | 4/2009 | Saikin |
| 7,530,880 | B2 | 5/2009 | Bajaj et al. |
| 7,531,117 | B2 | 5/2009 | Ederer et al. |
| 7,537,446 | B2 | 5/2009 | James et al. |
| 7,699,684 | B2 | 4/2010 | Prasad |
| 7,704,122 | B2 | 4/2010 | Misra et al. |
| 7,704,125 | B2 | 4/2010 | Roy et al. |
| 7,815,778 | B2 | 10/2010 | Bajaj |
| 7,846,008 | B2 | 12/2010 | Bajaj |
| 8,066,555 | B2 | 11/2011 | Bajaj |
| 8,075,372 | B2 | 12/2011 | Prasad |
| 8,075,745 | B2 | 12/2011 | Bajaj |
| 8,118,641 | B2 | 2/2012 | Kulp et al. |
| 8,142,860 | B2 | 3/2012 | Vanmaele et al. |
| 8,142,869 | B2 | 3/2012 | Kobayashi et al. |
| 8,177,603 | B2 | 5/2012 | Bajaj |
| 8,257,545 | B2 | 9/2012 | Loyack et al. |
| 8,260,447 | B2 | 9/2012 | Mattes et al. |
| 8,287,793 | B2 | 10/2012 | Deopura et al. |
| 8,288,448 | B2 | 10/2012 | Kulp |
| 8,292,692 | B2 | 10/2012 | Bajaj |
| 8,377,623 | B2 | 2/2013 | Fong |
| 8,380,339 | B2 | 2/2013 | Misra et al. |
| 8,546,717 | B2 | 10/2013 | Stecker |
| 8,598,523 | B2 | 12/2013 | Stecker et al. |
| 8,702,479 | B2 | 4/2014 | Huang et al. |
| 8,709,114 | B2 | 4/2014 | Cantrell et al. |
| 8,715,035 | B2 | 5/2014 | Roy et al. |
| 8,784,721 | B2 | 7/2014 | Philippi et al. |
| 8,821,214 | B2 | 9/2014 | Joseph |
| 8,864,859 | B2 | 10/2014 | Roy et al. |
| 8,883,392 | B2 | 11/2014 | Napadensky et al. |
| 8,888,480 | B2 | 11/2014 | Yoo et al. |
| 8,932,116 | B2 | 1/2015 | Deopura et al. |

(56) References Cited

U.S. PATENT DOCUMENTS

| | | |
|---|---|---|
| 8,986,585 B2 | 3/2015 | Cantrell et al. |
| 9,017,140 B2 | 4/2015 | Allison et al. |
| 9,067,297 B2 | 6/2015 | Allison et al. |
| 9,067,299 B2 | 6/2015 | Bajaj et al. |
| 9,156,124 B2 | 10/2015 | Allison et al. |
| 9,162,340 B2 | 10/2015 | Joseph et al. |
| 9,259,820 B2 | 2/2016 | Qian et al. |
| 9,259,821 B2 | 2/2016 | Qian et al. |
| 9,278,424 B2 | 3/2016 | Roy et al. |
| 9,296,085 B2 | 3/2016 | Bajaj et al. |
| 9,314,897 B2 | 4/2016 | Qian et al. |
| 9,333,620 B2 | 5/2016 | Qian et al. |
| 9,421,666 B2 | 8/2016 | Krishnan et al. |
| 9,457,520 B2 | 10/2016 | Bajaj et al. |
| 9,587,127 B2 | 3/2017 | Herlihy et al. |
| 9,630,249 B2 | 4/2017 | Toyserkani et al. |
| 9,744,724 B2 | 8/2017 | Bajaj et al. |
| 9,873,180 B2 | 1/2018 | Bajaj et al. |
| 9,993,907 B2 | 6/2018 | Murugesh et al. |
| 10,029,405 B2 * | 7/2018 | Bajaj .................. B24B 37/26 |
| 2001/0008830 A1 | 7/2001 | Tolles et al. |
| 2001/0020448 A1 | 9/2001 | Vaartstra et al. |
| 2001/0046834 A1 | 11/2001 | Ramana et al. |
| 2002/0112632 A1 | 8/2002 | Faibish |
| 2002/0173248 A1 | 11/2002 | Doan et al. |
| 2003/0019570 A1 | 1/2003 | Chen et al. |
| 2003/0056870 A1 | 3/2003 | Comb et al. |
| 2003/0134581 A1 | 7/2003 | Wang et al. |
| 2003/0181137 A1 | 9/2003 | Redeker et al. |
| 2004/0033758 A1 | 2/2004 | Wiswesser |
| 2004/0055223 A1 | 3/2004 | Ono et al. |
| 2004/0058623 A1 | 3/2004 | Lin et al. |
| 2004/0106367 A1 | 6/2004 | Walker et al. |
| 2004/0126575 A1 | 7/2004 | Yoshida et al. |
| 2004/0133298 A1 | 7/2004 | Toyserkani et al. |
| 2004/0154533 A1 | 8/2004 | Agarwal et al. |
| 2004/0173946 A1 | 9/2004 | Pfeifer et al. |
| 2004/0187714 A1 | 9/2004 | Napadensky et al. |
| 2004/0198185 A1 | 10/2004 | Redeker et al. |
| 2005/0086869 A1 | 4/2005 | Park et al. |
| 2005/0101228 A1 | 5/2005 | Prasad |
| 2005/0110853 A1 | 5/2005 | Gardner et al. |
| 2005/0153634 A1 | 7/2005 | Prasad et al. |
| 2005/0227590 A1 | 10/2005 | Sung |
| 2006/0019587 A1 | 1/2006 | Deopura et al. |
| 2006/0052040 A1 | 3/2006 | Prasad |
| 2006/0160478 A1 | 7/2006 | Donohue et al. |
| 2006/0185256 A1 | 8/2006 | Nevoret et al. |
| 2006/0192315 A1 | 8/2006 | Farr et al. |
| 2006/0226567 A1 | 10/2006 | James et al. |
| 2007/0054599 A1 | 3/2007 | Taylor et al. |
| 2007/0117393 A1 | 5/2007 | Tregub et al. |
| 2007/0128874 A1 | 6/2007 | Shida et al. |
| 2007/0128991 A1 | 6/2007 | Yoon et al. |
| 2007/0149096 A1 | 6/2007 | Nishimura et al. |
| 2007/0212979 A1 | 9/2007 | Preston |
| 2007/0235904 A1 | 10/2007 | Saikin |
| 2008/0009228 A1 | 1/2008 | Nagase et al. |
| 2008/0057845 A1 | 3/2008 | Prasad |
| 2008/0157436 A1 | 7/2008 | Patel et al. |
| 2008/0207100 A1 | 8/2008 | Roy et al. |
| 2008/0211141 A1 | 9/2008 | Deopura et al. |
| 2008/0314878 A1 | 12/2008 | Cai et al. |
| 2009/0053976 A1 | 2/2009 | Roy et al. |
| 2009/0093201 A1 | 4/2009 | Kazuno et al. |
| 2009/0105363 A1 | 4/2009 | Napadensky |
| 2009/0206065 A1 | 8/2009 | Kruth et al. |
| 2009/0253353 A1 | 10/2009 | Ogawa et al. |
| 2009/0311955 A1 | 12/2009 | Kerprich et al. |
| 2009/0321979 A1 | 12/2009 | Hiraide |
| 2010/0203815 A1 | 8/2010 | Bajaj |
| 2010/0323050 A1 | 12/2010 | Kumagai et al. |
| 2011/0059247 A1 | 3/2011 | Kuzusako et al. |
| 2011/0077321 A1 | 3/2011 | Napadensky |
| 2011/0180952 A1 | 7/2011 | Napadensky |
| 2012/0178845 A1 | 7/2012 | Napadensky et al. |
| 2012/0302148 A1 | 11/2012 | Bajaj et al. |
| 2012/0315830 A1 | 12/2012 | Joseph et al. |
| 2013/0012108 A1 | 1/2013 | Li et al. |
| 2013/0017769 A1 | 1/2013 | Kimura |
| 2013/0019570 A1 | 1/2013 | Weible |
| 2013/0055568 A1 | 3/2013 | Dusel et al. |
| 2013/0059509 A1 | 3/2013 | Deopura et al. |
| 2013/0172509 A1 | 7/2013 | Pawloski et al. |
| 2013/0231032 A1 | 9/2013 | Swedek et al. |
| 2013/0283700 A1 | 10/2013 | Bajaj et al. |
| 2013/0309951 A1 | 11/2013 | Benvegnu et al. |
| 2013/0316081 A1 | 11/2013 | Kovalcik et al. |
| 2013/0328228 A1 | 12/2013 | Pettis et al. |
| 2014/0048970 A1 | 2/2014 | Batchelder et al. |
| 2014/0117575 A1 | 5/2014 | Kemperle et al. |
| 2014/0163717 A1 | 6/2014 | Das et al. |
| 2014/0206268 A1 | 7/2014 | Lefevre et al. |
| 2014/0239527 A1 | 8/2014 | Lee |
| 2014/0324206 A1 | 10/2014 | Napadensky |
| 2014/0370788 A1 | 12/2014 | Nair |
| 2015/0024233 A1 | 1/2015 | Gunther |
| 2015/0031781 A1 | 1/2015 | Landers et al. |
| 2015/0037601 A1 | 2/2015 | Blackmore |
| 2015/0038066 A1 | 2/2015 | Huang et al. |
| 2015/0045928 A1 | 2/2015 | Perez et al. |
| 2015/0056421 A1 | 2/2015 | Yudovin-Farber et al. |
| 2015/0056892 A1 | 2/2015 | Vacassy et al. |
| 2015/0056895 A1 | 2/2015 | Fotou et al. |
| 2015/0061170 A1 | 3/2015 | Engel et al. |
| 2015/0065020 A1 | 3/2015 | Roy et al. |
| 2015/0084238 A1 | 3/2015 | Bonassar et al. |
| 2015/0093977 A1 | 4/2015 | Deopura et al. |
| 2015/0115490 A1 | 4/2015 | Reinarz |
| 2015/0123298 A1 | 5/2015 | Napadensky |
| 2015/0126099 A1 | 5/2015 | Krishnan et al. |
| 2015/0129798 A1 | 5/2015 | Napadensky |
| 2015/0174826 A1 | 6/2015 | Murugesh et al. |
| 2015/0216790 A1 | 8/2015 | Feng et al. |
| 2016/0052103 A1 | 2/2016 | Qian et al. |
| 2016/0107287 A1 | 4/2016 | Bajaj et al. |
| 2016/0107288 A1 | 4/2016 | Orilall et al. |
| 2016/0114458 A1 | 4/2016 | Bajaj et al. |
| 2016/0176021 A1 | 6/2016 | Orilall et al. |
| 2016/0221145 A1 | 8/2016 | Huang et al. |
| 2016/0229023 A1 | 8/2016 | Lugg et al. |
| 2016/0279757 A1 | 9/2016 | Qian et al. |
| 2016/0354901 A1 | 12/2016 | Krishnan et al. |
| 2017/0100817 A1 | 4/2017 | Ganapathiappan et al. |
| 2017/0151648 A1 | 6/2017 | Huang et al. |
| 2017/0182629 A1 | 6/2017 | Lehuu et al. |
| 2017/0203409 A1 | 7/2017 | Lefevre et al. |
| 2018/0236632 A1 | 8/2018 | Murugesh et al. |

FOREIGN PATENT DOCUMENTS

| | | |
|---|---|---|
| CN | 1531473 A | 9/2004 |
| CN | 1569399 A | 1/2005 |
| CN | 1802237 A | 7/2006 |
| CN | 1829587 A | 9/2006 |
| CN | 1897226 A | 1/2007 |
| CN | 101199994 A | 6/2008 |
| CN | 102686361 A | 9/2012 |
| CN | 102770239 A | 11/2012 |
| CN | 102892553 A | 1/2013 |
| CN | 103465155 A | 12/2013 |
| CN | 104105575 A | 10/2014 |
| CN | 104210108 A | 12/2014 |
| CN | 104385595 A | 3/2015 |
| CN | 104400998 A | 3/2015 |
| CN | 104607639 A | 5/2015 |
| DE | 19834559 A1 | 2/2000 |
| EP | 1512519 A2 | 3/2005 |
| EP | 1661690 A1 | 5/2006 |
| EP | 2025458 A2 | 2/2009 |
| EP | 2025459 A2 | 2/2009 |
| EP | 2277686 A2 | 1/2011 |
| EP | 2431157 A1 | 3/2012 |
| EP | 2463082 A1 | 6/2012 |

(56) References Cited

FOREIGN PATENT DOCUMENTS

| | | |
|---|---|---|
| JP | H08132342 A | 5/1996 |
| JP | 09076353 A | 3/1997 |
| JP | 11-254542 A | 9/1999 |
| JP | 11-347761 A | 12/1999 |
| JP | 2001501544 A | 2/2001 |
| JP | 2001507634 A | 6/2001 |
| JP | 2001507997 A | 6/2001 |
| JP | 200228849 A | 1/2002 |
| JP | 2004235446 A | 8/2004 |
| JP | 2004243518 A | 9/2004 |
| JP | 3801100 B2 | 7/2006 |
| JP | 2007281435 A | 10/2007 |
| JP | 2008207323 A | 9/2008 |
| JP | 2008546167 A | 12/2008 |
| JP | 2009-101487 A | 5/2009 |
| JP | 2013515379 A | 5/2013 |
| JP | 2013530061 A | 7/2013 |
| JP | 2014515319 A | 6/2014 |
| KR | 2003-0020658 A | 3/2003 |
| KR | 2005-0052876 A | 6/2005 |
| KR | 10-0606476 B1 | 8/2006 |
| KR | 2008-0038607 A | 5/2008 |
| KR | 1020130138841 | 12/2013 |
| KR | 10-2015-0047628 A | 5/2015 |
| TW | 200528529 A | 9/2005 |
| TW | 200628262 A | 8/2006 |
| TW | I290576 B | 12/2007 |
| TW | 200909134 A | 3/2009 |
| TW | 200927382 A | 7/2009 |
| TW | 201016387 A | 5/2010 |
| TW | I374792 B | 10/2012 |
| TW | 201309419 A | 3/2013 |
| TW | I388398 B | 3/2013 |
| TW | 201350265 A | 12/2013 |
| WO | 9830356 A1 | 7/1998 |
| WO | 1998047662 A1 | 10/1998 |
| WO | 9849723 A1 | 11/1998 |
| WO | 2000002707 A1 | 1/2000 |
| WO | 2000002708 A1 | 1/2000 |
| WO | 01/64396 A1 | 9/2001 |
| WO | 02/24415 A1 | 3/2002 |
| WO | 2002043921 A1 | 6/2002 |
| WO | 2002070200 A1 | 9/2002 |
| WO | 03089702 A1 | 10/2003 |
| WO | 03103959 A1 | 12/2003 |
| WO | 2003099518 A1 | 12/2003 |
| WO | 2004037490 A1 | 5/2004 |
| WO | 2005000526 A1 | 1/2005 |
| WO | 2005100497 A1 | 10/2005 |
| WO | 2007001699 A1 | 1/2007 |
| WO | 2007024464 A1 | 3/2007 |
| WO | 2007055678 A2 | 5/2007 |
| WO | 2007055901 A1 | 5/2007 |
| WO | 2008123085 A1 | 10/2008 |
| WO | 2009026776 A1 | 3/2009 |
| WO | 2009158665 A1 | 12/2009 |
| WO | 2010123744 A2 | 10/2010 |
| WO | 201001116486 A1 | 10/2010 |
| WO | 2011082155 A2 | 7/2011 |
| WO | 2011088057 A1 | 7/2011 |
| WO | 2012173885 A2 | 12/2012 |
| WO | 2013128452 | 9/2013 |
| WO | 2013162856 A | 10/2013 |
| WO | 2013162856 A1 | 10/2013 |
| WO | 2014/095200 A1 | 6/2014 |
| WO | 2014141276 A2 | 9/2014 |
| WO | 2015/040433 A2 | 3/2015 |
| WO | 2015/055550 A1 | 4/2015 |
| WO | 2015111366 A1 | 7/2015 |
| WO | 2015118552 A1 | 8/2015 |
| WO | 2015120430 A1 | 8/2015 |
| WO | 20150161210 A1 | 10/2015 |

OTHER PUBLICATIONS

The Dow Chemical Company—"Specialty Elastomers for Automotive TPO Compounds" brochure, Nov. 2006, 8 pages.
The Dow Chemical Company—"Dow VLDPE DFDB-1085 NT, Very Low Density Polyethylene Resin" Technical Data, UL Prospector, Oct. 2003, 2 pages.
Lubrizol Advanced Materials, Inc.—"Lubrizol Engineered Polymers, Estane 58144 TPU" Technical Data, Feb. 2014, 2 pages.
Sekisui Voltek, LLC—"Volara Type EO" Technical Data, Jan. 2010, 2 pages.
Rogers Corporation, High Performance Foams Division, PORON Microcellular Urethanes—Product Availability Booklet, May 1, 2015, 11 pages.
EPO Partial Supplementary Search Report dated Jun. 29, 2018, European Application No. 15850997.6.
Japanese Office Action dated Feb. 5, 2019, for Japanese Patent Application No. 2017-520394.
Antje M.J. Van Den Berg et al., "Inkjet Printing of Polyurethane Colloidal Suspensions", www.rsc.org/softmatter. Jul. 13, 2006.
Andrews, Rodney J., et al.—"Glass Transition Temperatures of Polymers," Polymer Handbook, Fourth Edition, J. Brandrup et al., Editors, A Wiley Interscience Publication, John Wiley & Sons, Inc., 1999, VI / 193-198.
Crow—"Glass Transition Temperature," webpage, Polymer Properties Database, http://polymerdatabase.com/polymer%20physics/GlassTransition.html, 2015, printed Apr. 10, 2019, 2 pages.
Crow—"Glass Transition Temperatures," webpage, Polymer Properties Database, http://polymerdatabase.com/polymer%20physics/Polymer%20Tg%20C.html, 2015, printed Apr. 10, 2019, 6 pages.
HUPC—"Dipropylene Glycol Diacrylate (DPGDA)" webpage, CAS No. 57472-68-1_Radiation, http://www.union-pigment.com/china/radiation-curable-57472.html, printed Apr. 8, 2019, 2 pages.
Polysciences, Inc.—"Monomers Product Guide," 2012, 16 pages.
Whisnaut, David—"Polymer Chemistry: The Glass Transition" webpage, Engineering Libre Texts, https://eng.libretexts.org/Bookshelves/Materials_Schience?Supplemental_Modules_Materia . . . , printed Apr. 10, 2019, 2 pages.
Sigma-Aldrich—"Thermal Transitions of Homopolymers: Glass Transition & Melting Point" webpage, https://www.sigmaaldrich.com/technical-documents/articles/materials-science/polymer-scie . . . , printed Apr. 8, 2019, 3 pages.
PCT Notification of Transmittal of the International Search Report and the Written Opinion of the International Searching Authority for International Application No. PCT/US2015/027537 dated Jul. 29, 2015; 11 total pages.
PCT Notification of Transmittal of the International Search Report and the Written Opinion of the International Searching Authority for International Application No. PCT/US2015/027473 dated Jul. 29, 2015; 10 total pages.
Plastics in Action; 3-D Printing Speeds Prototype Development dated May/Jun. 1998; 2 total pages.
Wikipedia [online]; 3D Printing; 2013; 17 total pages.
PCT Notification of Transmittal of the International Search Report and the Written Opinion of the International Searching Authority for International Application No. PCT/US2013/035513 dated Jun. 25, 2013; 12 total pages.
3D Printing: The Next Industrial Revolution: Christopher Barnatt Publisher: CreateSpace Independent Publishing Platform (May 4, 2013) Language: English ISBN-10: 148418176X ISBN-13: 978-1484181768.
C. Wong. "Damping Associated with Incipient Melting in Aluminum-Indium Alloys", David Taylor Research Center—SME 89-99. Jan. 1990.
Tammy Hickey et al. "Internal Friction and Modules Studies on Austempered Ductile Iron", Technical Report ARCCB-TR-98001. Jan. 1996. 24 pages.
Rodel. Rodel IC1000 CMP Pad. 1999. 2 pages.
Byoung-Ho Kwon et al. "Dishing and Ersosion in STI CMP". System IC R&D Center, Hyundai Electronics Industries Co. Ltd. 1999 IEEE. 3 pages.

(56) References Cited

OTHER PUBLICATIONS

S. Raghavan et al. "Chemical Mechanical Planariarization in Integrated Circuit Device Manufacturing". vol. 98-7. 1998. 19 pages.
Rajeev Bajaj et al. "Effect of Polishing Pad Material Properties on Chemical Mechanical Polishing (CMP) Processes". 1994. 8 pages.
Rodel. Rodel IC1010. 1998. 2 pages.
Peter Freeman et al. "A Study of the Variation of Physical Properties in Random Lots of Urethane Polishing Pads for CMP". A RODEL Publication. vol. 2, Issue 6. Jun. 1996. 8 Pages.
John J. Aklonis et al. "Introduction to Polymer Viscoelasticity". Second Edition. 1983. 6 pages.
Weidan Li et al. "The Effect of the Polishing Pad Treatments on the Chemical-Mechanical Polishing of SiO2 Films", Thin Solid Films 270 (1995). 6 pages.
U.S. Appl. No. 14/575,608, filed Dec. 18, 2014.
Antje M.J. Van Den Berg, "Inkjet Printing of Polyurethane Colloidal Suspensions", www.rsc.org/softmatter. Jul. 13, 2006.
Peter Krober et al. "Reactive Inkjet Printing of Polyurethanes", www.rsc.org/materials. Journal of Materials Chemistry. Jan. 6, 2009.
Yu-Lim Jun et al. "Slicing Bitmap Generation and Patterning Technique a SFF System Using UV-Resin", International Conference on Control, Automation and Systems 2007. 5 Pages.
H. Yang. "High Viscosity Jetting System for 3D Reactive Inkjet Printing", Additive Manufacturing and 3D Printing Group, University of Nottingham. 9 pages.
I Hermant et al. "A Comparative Study of Polyurethane-Poly(Methyl Methacrylate) Interpenetrating and Semi-1 Interprenetrating Polymer Networks", vol. 20, No. 1. pp. 85-89, 1984.
Lee M. Cook. "CMP Consumables II: Pad" Chapter 6. Semiconductors and Semimetals, vol. 63. Published 1999. Chemical Mechanical Polishing in Silicon Processing. ISBN: 978-0-12-752172-5.
International Search Report dated Dec. 28, 2015 for application No. PCT/US2015/056077.
Search Report for 023693/ALRT/CMP/CMP/JW dated Nov. 12, 2015.
International Search Report dated Jan. 28, 2016 for Application No. PCT/US2015/056254.
Taiwan Office Action dated Oct. 4, 2018, for Taiwan Patent Application No. 104118517.
Taiwan Office Action dated Jul. 9, 2019, for Taiwan Patent Application No. 108102209.
Chinese Office Action dated Oct. 18, 2019, for Chinese Patent Application No. 201680060117.6.
Taiwan Office Action dated Oct. 24, 2019, for Taiwan Patent Application No. 105132308.
Japanese Office Action dated Nov. 5. 2019, for Japanese Patent Application No. 2018-519328.
Japanese Office Action dated Oct. 29, 2019, for Japanese Patent Application No. 2017-520508.
Japanese Office Action dated Sep. 24, 2019, for Japanese Patent Application No. 2017-520496.
Chinese Office Action dated Oct. 8, 2019, for Chinese Patent Application No. 2015800696241.
Chinese Office Action dated Oct. 9, 2019, for Chinese Patent Application No. 201580069573.2.

* cited by examiner

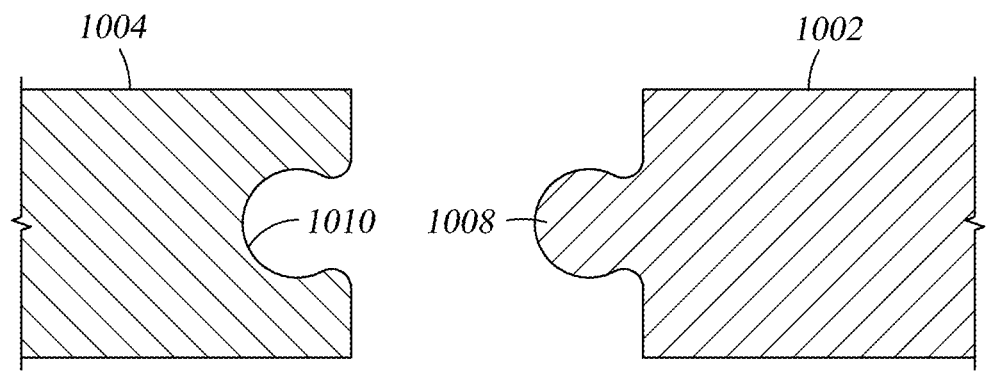
FIG. 11
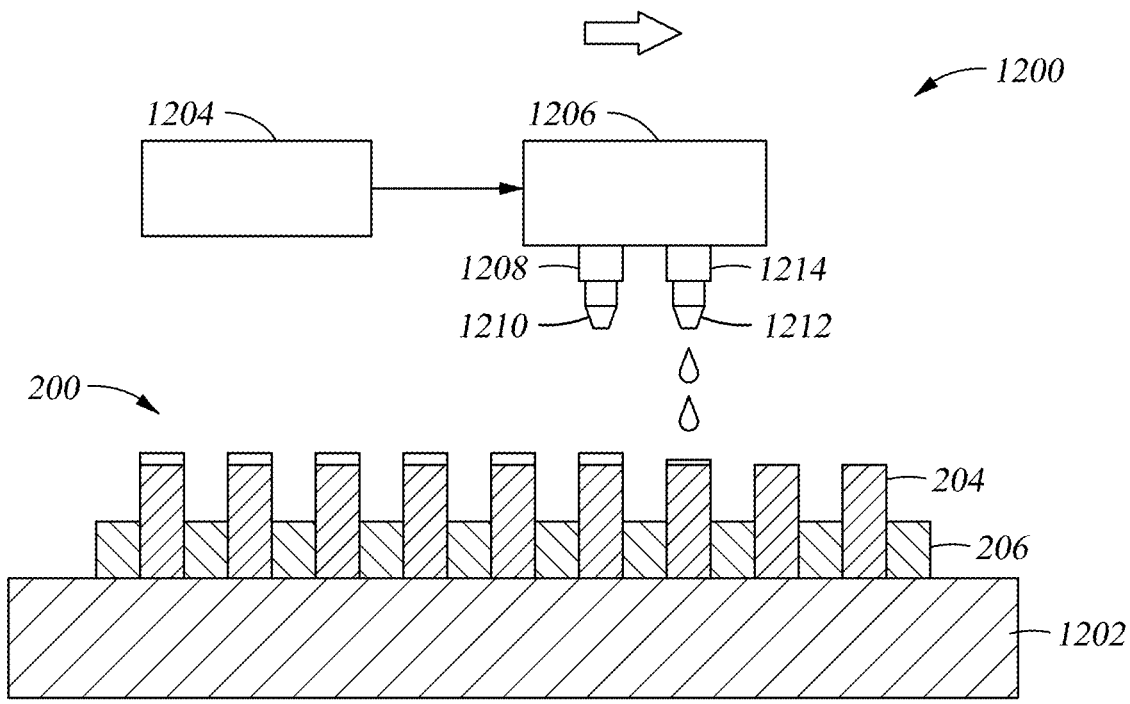
FIG. 12
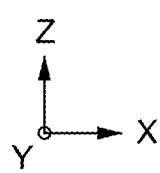

CMP PAD CONSTRUCTION WITH COMPOSITE MATERIAL PROPERTIES USING ADDITIVE MANUFACTURING PROCESSES

CROSS-REFERENCE TO RELATED APPLICATIONS

This application is a divisional of U.S. patent application Ser. No. 14/695,299, filed on Apr. 24, 2015, which claims priority to U.S. Provisional Patent Application Ser. No. 62/065,193, filed on Oct. 17, 2014 and U.S. Provisional Patent Application Ser. No. 62/065,270, filed on Oct. 17, 2014.

BACKGROUND

Field

Embodiments disclosed herein generally relate to the manufacture of polishing articles used in chemical mechanical polishing (CMP) processes. More specifically, embodiments disclosed herein are related to composite polishing pads.

Description of the Related Art

Chemical-mechanical polishing (CMP) is commonly used for planarize substrates during fabrication of semiconductor devices. During CMP, a substrate being processed is mounted on a carrier head with the device surface placed against a rotating polishing pad. The carrier head provides a controllable load on the substrate to push the device surface against the polishing pad. A polishing liquid, such as slurry with abrasive particles, is typically supplied to the surface of the polishing pad. Polishing pads are consumables for typically become worn after polishing certain amount of substrates and need to be replaced.

Polishing pads are typically made by molding, casting or sintering polyurethane materials. In the case of molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process. These methods of manufacturing polishing pads are expensive and time consuming. Polishing pads manufactured by these methods often yield non-uniform polishing results. For example, during CMP, different areas on the substrate may be polished at different rates resulting in too much material removed ("overpolishing") in some areas or too little material removed ("underpolishing") in other areas.

Therefore, there is a need for a polishing pad that provides an improved polishing uniformity, and also methods for making the improved polishing pad.

SUMMARY

Embodiments of the disclosure generally provide polishing pads that include a composite pad body and methods for forming the polishing pads.

One embodiment provides a polishing pad including a composite pad body. The composite pad body includes one or more first features formed from a first material or first composition of materials, and one or more second features formed from a second material or second composition of materials, wherein the one or more first features and the one or more second features are formed by depositing a plurality of layers comprising the first material or first composition of materials and second material or second composition of materials.

Another embodiment provides a method for forming a polishing pad. The methods include depositing a plurality of composite layers with a 3D printer until reaching a target thickness. Depositing each of the plurality of composite layers comprises depositing a first material or first composition of materials on one or more first regions, and depositing a second material or second composition of materials on one or more second regions, wherein the one or more first regions and the one or more second regions form a continuous area. The method further includes solidifying the composite layers to form a composite pad body having one or more first features of the first material or first composition of materials and one or more second features of the second material or second composition of materials, wherein the one or more first features and the one or more second features form a unitary body.

Another embodiment provides a polishing pad having a composite pad body. The composite pad body includes a plurality of polishing features forming a polishing surface, wherein the plurality of polishing features are formed from a first material, and one or more base features formed from a second material, wherein the one or more base features jointly surround the plurality of polishing features to form a unitary body.

One embodiment provides a polishing pad comprising a composite polishing pad body. The composite polishing body comprises one or more first features formed from a first material, and one or more second features formed from a second material. The one or more first features and the one or more second features are formed by depositing a plurality of layers comprising the first material and the second material.

In one embodiment, the first comprises a first composition of materials that is formed by depositing droplets of a third material and a fourth material. In one embodiment, the second material comprises a second composition of materials that is formed by depositing droplets of a fifth material and a sixth material.

Yet another embodiment provides a method of forming a polishing pad. The method includes depositing a plurality of composite layers with a 3D printer to reach a target thickness. Depositing the plurality of composite layers comprises depositing a first material over one or more first regions of a surface, and depositing a second material over one or more second regions of the surface, wherein the one or more first regions and the one or more second regions form a continuous part of each of the plurality of composite layers. The method further includes solidifying the plurality of composite layers to form a composite pad body having one or more first features comprising the first material and one or more second features comprising the second material. The one or more first features and the one or more second features form a unitary body.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 11 is a partial sectional view of the polishing pad of FIG. 10.

FIG. 12 is a schematic sectional view of an apparatus for manufacturing polishing pads according to an embodiment of the present disclosure.

To facilitate understanding, common words have been used, where possible, to designate identical elements that are common to the figures. It is contemplated that elements disclosed in one embodiment may be beneficially utilized on other embodiments without specific recitation.

DETAILED DESCRIPTION

The present disclosure relates to polishing articles and methods of manufacture thereof, as well as methods of polishing substrates and conditioning of the polishing articles before, during and after polishing of substrates.

Embodiments of the present disclosure provide a polishing pad having a composite pad body. The composite pad body includes discrete features formed from at least two different materials. The polishing pad may be produced by a three-dimensional (3D) printing process according to embodiments of the present disclosure. For example, the composite pad body may be formed by successively depositing a plurality of layers, each layer comprising of regions of different materials or different compositions of materials, by a 3D printer. In some embodiments, the plurality of layers may then be solidified by curing. The discrete features in the composite pad body may be formed simultaneously from different materials or different compositions of materials. The depositing and curing process of 3D printing allow the discrete features to be securely joined together. The geometry of the discrete features may be easily controlled using the 3D printing process. By choosing different materials or different compositions of materials, the discrete features may have different mechanical, physical, chemical, and/or geometry properties to obtain target pad properties. In one embodiment, the composite body may be formed from viscoelastic materials having different mechanical properties. For example the composite body may be formed from viscoelastic materials having different storage moduli and different loss moduli. As a result, the composite pad body may include some elastic features formed from a first material or a first composition of materials and some hard features formed from a second material or a second composition of materials that are stiffer than the first material or the first composition of materials.

Figure 1:
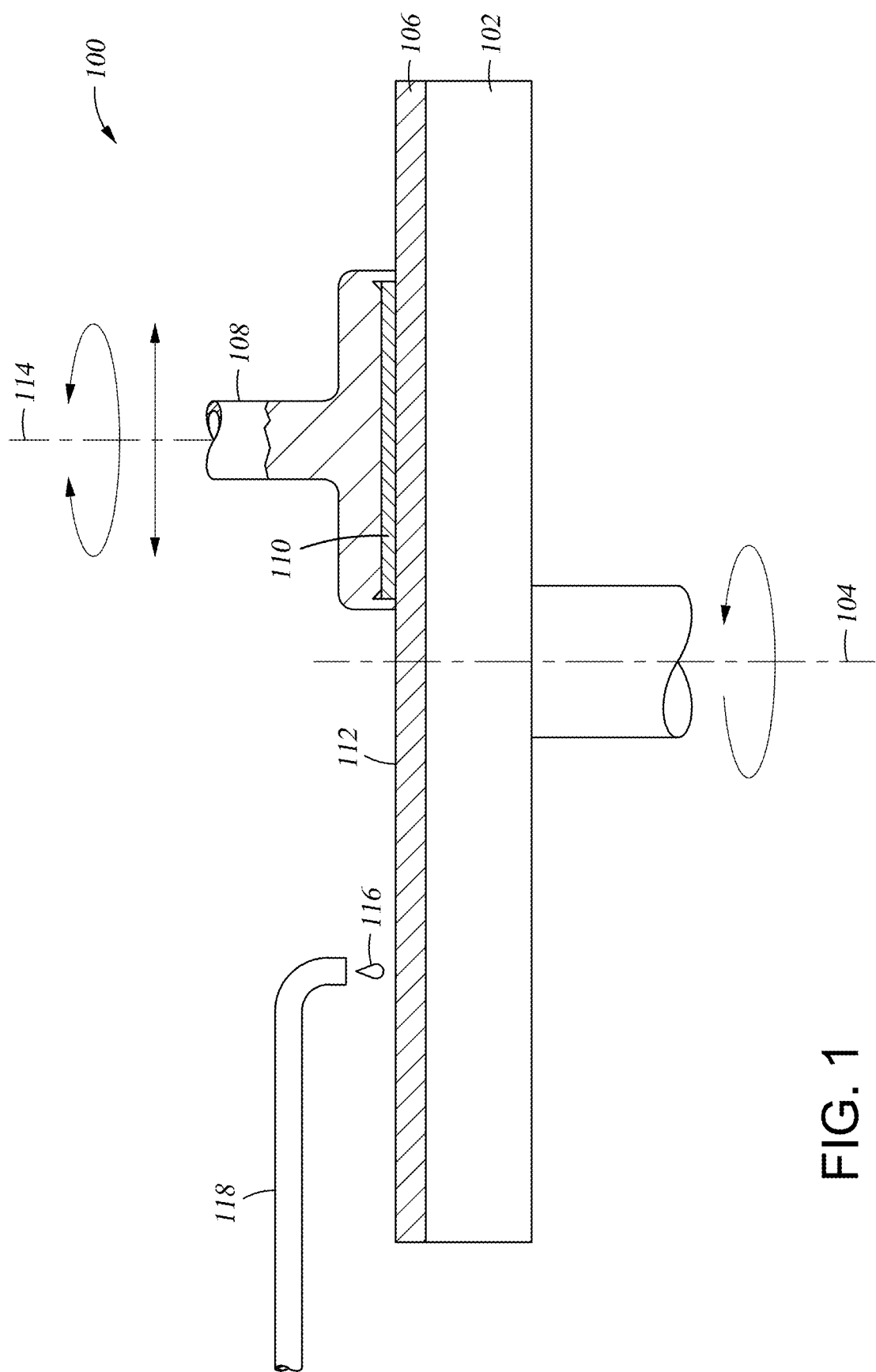
FIG. 1 is a schematic sectional view of a polishing station.

FIG. 1 is a schematic sectional view of a polishing station 100. The polishing station 100 may be used in a polishing system to perform substrate polishing. The polishing station 100 includes a platen 102. The platen 102 may rotate about a central axis 104. A polishing pad 106 may be placed on the platen 102. The polishing pad 106 may include a composite polishing body according to embodiments of the present disclosure. The polishing pad 106 includes a polishing surface 112 configured to contact and process substrates. The platen 102 supports the polishing pad 106 and rotates the polishing pad 106 during polishing. A carrier head 108 may hold a substrate 110 being processed against the polishing surface 112 of the polishing pad 106. The carrier head 108 may rotate about a central axis 114 and/or move in a sweeping motion to generate relative motions between the substrate 110 and the polishing pad 106. During polishing, a polishing fluid 116, such as an abrasive slurry, may be supplied to the polishing surface 112 by a delivery arm 118. The polishing liquid 116 may contain abrasive particles, a pH adjuster and/or chemically active components to enable chemical mechanical polishing of the substrate.

Polishing Pads

Figure 2A:
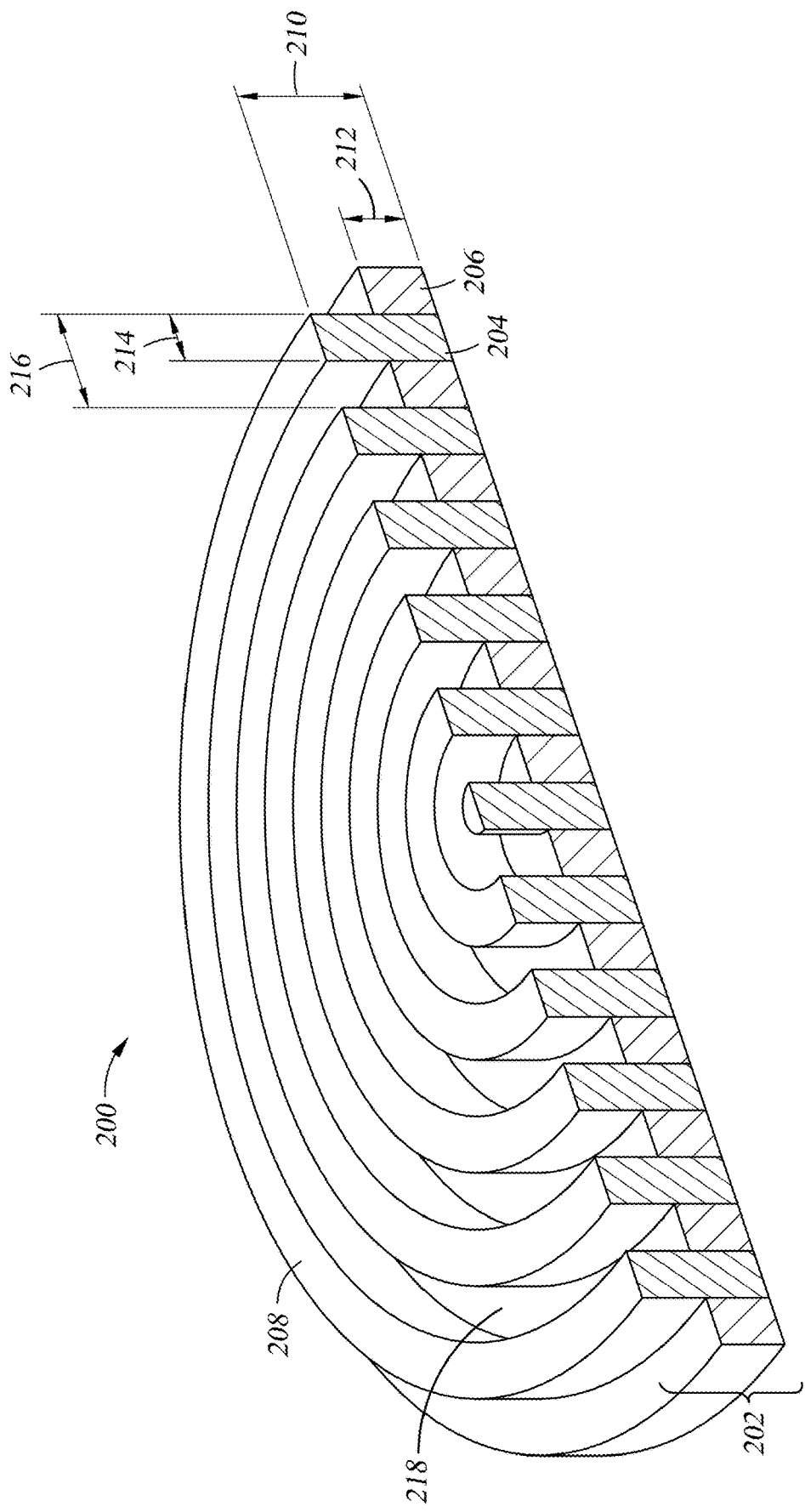
FIG. 2A is a schematic perspective sectional view of a polishing pad according to an embodiment of the present disclosure.

FIG. 2A is a schematic perspective sectional view of a polishing pad 200 according to one embodiment of the present disclosure. The polishing pad 200 may be used in polishing stations, such as the polishing station 100, for polishing substrates by chemical mechanical polishing.

The polishing pad 200 includes a composite pad body 202. The composite pad body 202 includes one or more hard features 204 and one or more elastic features 206. The hard features 204 and the elastic features 206 are discrete features that are joined together at boundaries to form the composite pad body 202. In one embodiment, the hard features 204 may have a hardness of about 40 Shore D scale to about 90 Shore D scale. The elastic features 206 may have a hardness value between about 26 Shore A scale to about 95 Shore A scale.

The composite pad body 202 may be formed by 3D printing or other suitable techniques. The composite pad body 202 may include a plurality of layers, which each include regions of the elastic features 206 and/or regions of hard features 204 according to the design of the composite pad body 202, that are deposited by a 3D printer. The plurality of layers may then be cured, for example by UV light or by a heat source, to solidify and achieve a target hardness. After deposition and curing, a unitary composite pad body 202 is formed including the hard features 204 and the elastic features 206 that are coupled or joined together.

Materials having different mechanical properties may be selected for the elastic features 206 and the hard features 204 to achieve a target polishing process. The dynamic mechanical properties of the elastic features 206 and the hard features 204 may be achieved by selecting different materials and/or choosing different curing processes used during the feature forming process. In one embodiment, the elastic features 206 may have a lower hardness value and a lower value of Young's modulus, while the hard features 204 may have a higher hardness value and a higher value of Young's modulus. In another embodiment, the dynamic mechanical properties, such as storage modulus and loss modulus, may be adjusted or controlled within each feature and/or by the physical layout, pattern or combination of elastic features 206 and hard features 204 within or across the polishing surface of the polishing pad.

The hard features 204 may be formed from one or more polymer materials. The hard features 204 may be formed from a single polymer material or a mixture of two or more polymers to achieve target properties. In one embodiment, the hard features 204 may be formed from one or more thermoplastic polymers. The hard features 204 may be formed from thermoplastic polymers, such as polyurethane, polypropylene, polystyrene, polyacrylonitrile, polymethyle methacrylate, polychlorotrifluoroethylene, polytetrafluoroethylene, polyoxymethylene, polycarbonate, polyimide, polyetheretherketone, polyphenylene sulfide, polyether sulfone, acrylonitrile butadiene styrene (ABS), polyetherimide, polyamides, melamines, polyesters, polysulfones, polyvinyl acetates, fluorinated hydrocarbons, and the like, and acrylates, copolymers, grafts, and mixtures thereof. In one embodiment, the hard features 204 may be formed from acrylates. For example, the hard features 204 may be polyurethane acrylate, polyether acrylate, or polyester acrylate. In another embodiment, the hard features 204 may include one or more thermosetting polymers, such as epoxies, phenolics, amines, polyesters, urethanes, silicon, and acrylates, mixtures, copolymers, and grafts thereof.

In one embodiment, the hard feature may be formed from a simulating plastic 3D printing material. In one embodiment, abrasive particles may be embedded in the hard features 204 to enhance the polishing process. The material comprising the abrasive particles may be a metal oxide, such as ceria, alumina, silica, or a combination thereof, a polymer, an inter-metallic or ceramic.

The elastic features 206 may be formed from one or more polymer materials. The elastic features 206 may be formed from a single polymer material or a mixture of two more polymers to achieve target properties. In one embodiment, the elastic features 206 may be formed one or more of thermoplastic polymers. For example, the elastic features 206 may be formed from thermoplastic polymers, such as polyurethane, polypropylene, polystyrene, polyacrylonitrile, polymethyle methacrylate, polychlorotrifluoroethylene, polytetrafluoroethylene, polyoxymethylene, polycarbonate, polyimide, polyetheretherketone, polyphenylene sulfide, polyether sulfone, acrylonitrile butadiene styrene (ABS), polyetherimide, polyamides, melamines, polyesters, polysulfones, polyvinyl acetates, fluorinated hydrocarbons, and the like, and acrylates, copolymers, grafts, and mixtures thereof. In one embodiment, the elastic features 206 may be formed from acrylates. For example, the elastic features 206 may be polyurethane acrylate, polyether acrylate, or polyester acrylate. In another embodiment, the elastic features 206 may be formed from thermoplastic elastomers. In one embodiment, the elastic features 206 may be formed from a rubber-like 3D printing material.

The hard features 204 are generally harder and more rigid than the elastic features 206, while the elastic features 206 are softer and more flexible than the hard features 204. Materials and patterns of the hard features 204 and the elastic features 206 may be selected to achieve a "tuned" bulk material of the polishing pad 200. The polishing pad 200 formed with this "tuned" bulk material has various advantages, such as improved polishing results, reduced cost of manufacturing, elongated pad life. In one embodiment, the "tuned" bulk material or the polishing pad as a whole may have hardness between about 65 shore A to about 75 shore D. Tensile strength of the polishing pad may be between 5 MPa to about 75 MPa. The polishing pad may have about 5% to about 350% elongation to break. The polishing pad may have shear strength above about 10 m Pa. The polishing pad may have storage modulus between about 5 MPa to about 2000 MPa. The polishing pad may have stable storage modules over temperature range 25° C. to 90° C. such that storage modulus ratio at E30/E90 falls within the range between about 6 to about 30, wherein E30 is the storage modulus at 30° C. and E90 is the storage modulus at 90° C.

In one embodiment, the materials of the hard features 204 and elastic features 206 are chemically resistant to attack from the polishing slurry. In another embodiment, the materials of the hard features 204 and elastic features 206 are hydrophilic.

In one embodiment, the hard features 204 and the elastic features 206 may be alternating concentric rings alternately arranged to form a circular composite pad body 202. In one embodiment, a height 210 of the hard features 204 is higher than a height 212 of the elastic features 206 so that upper surfaces 208 of the hard features 204 protrude from the elastic features 206. Grooves 218 or channels are formed between the hard features 204 and the elastic features 206. During polishing, the upper surfaces 208 of the hard features 204 form a polishing surface that contacts the substrate, while the grooves 218 retains the polishing fluid. In one embodiment, the hard features 204 are thicker than the elastic features 206 in a direction normal to a plane parallel to the composite pad body 202 so that the grooves 218 and/or channels are formed on the top surface of the composite pad body 202.

In one embodiment, a width 214 of the hard features 204 may be between about 250 microns to about 2 millimeters. The pitch 216 between the hard features 204 may be between about 0.5 millimeters to about 5 millimeters. Each hard feature 204 may have a width within a range between about 250 microns to about 2 millimeters. The width 214 and/or the pitch 216 may vary across a radius of the polishing pad 200 to zones of varied hardness.

Compared with traditional polishing pads, the composite polishing pad 200 of the present disclosure has several advantages. Traditional polishing pads generally include a polishing layer with a textured polishing surface and/or an abrasive materials supported by a subpad formed from a soft material, such as a foam, to obtain target hardness or Young's modulus for polishing substrates. By selecting materials having various mechanical properties, such as Young's modulus, storage modulus and loss modulus, and adjusting the dimensions and spacing of the features or varying arrangement of the different features, desirable hardness, dynamic properties and/or mechanical properties may be achieved in the composite pad body 202 without using a subpad. Therefore, the polishing pad 200 reduces cost of ownership by eliminating subpads. Additionally, hardness and abrasiveness of the polishing pad 200 may be tuned by mixing features with different hardness and abrasiveness, therefore, improving polishing performance.

Composite polishing pads according to the present disclosure may have variable mechanical properties, such as Young's modulus or storage modulus and loss modulus, across surface features, such as the hard features 204, and base material, such as the elastic features 206, by pattern variation and/or feature size variation. Mechanical properties across the polishing pads may be symmetric or non-symmetric, uniform or non-uniform to achieve target properties. Pattern of the surface features may be radial, concentric, rectangular, or random according to achieve target property, such as a predetermined mechanical properties, such as Young's modulus or storage modulus and loss modulus, across the polishing pad.

In one embodiment, the hard features and the elastic features may be interlocked to improve the strength of the composite polishing pad and improve physical integrity of the composite polishing pads. Interlocking of the hard features and elastic features may increase sheer strength and/or tensile strength of the polishing pad.

Figure 2B:
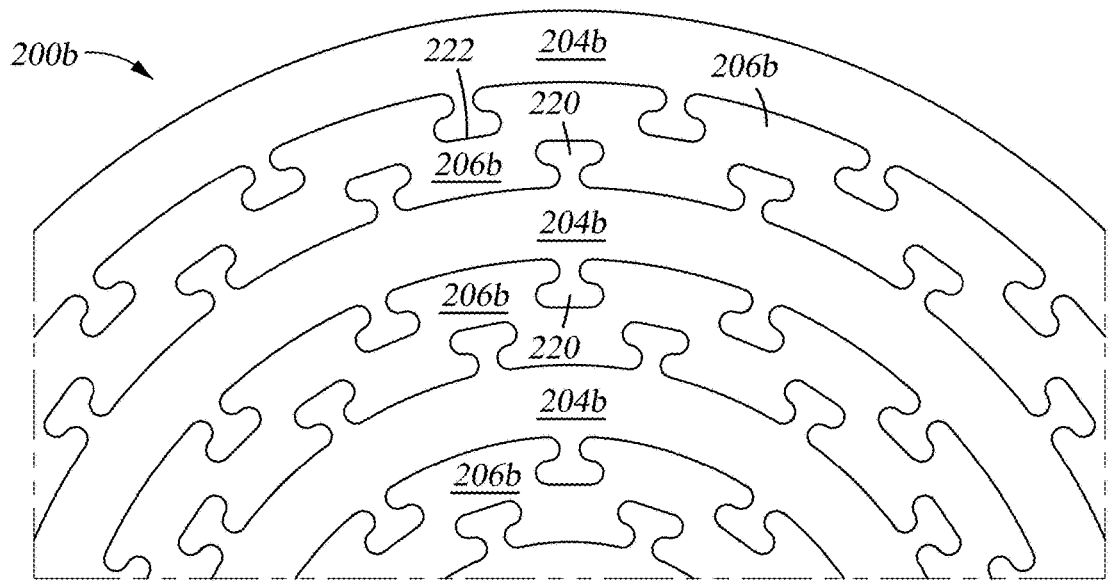
FIG. 2B is a schematic partial top view of a polishing pad according to an embodiment of the present disclosure.

FIG. 2B is a schematic partial top view of a polishing pad 200b according to one embodiment of the present disclosure. The polishing pad 200b is similar to the polishing pad 200 of FIG. 2A except that the polishing pad 200b includes interlocking hard features 204b and elastic features 206b. The hard features 204b and the elastic features 206b may form a plurality of concentric rings. In one embodiment, the hard features 204b may include protruding vertical ridges 220 and the elastic features 206b may include vertical recesses 222 for receiving the vertical ridges 220. Alternatively, the elastic features 206b may include protruding ridges while the hard features 204b include recesses. By having the elastic features 206b interlock with the hard features 204b, the polishing pad 200b will be mechanically stronger in relation to applied shear forces, which may be generated during the CMP process and/or material handling.

Figure 2C:
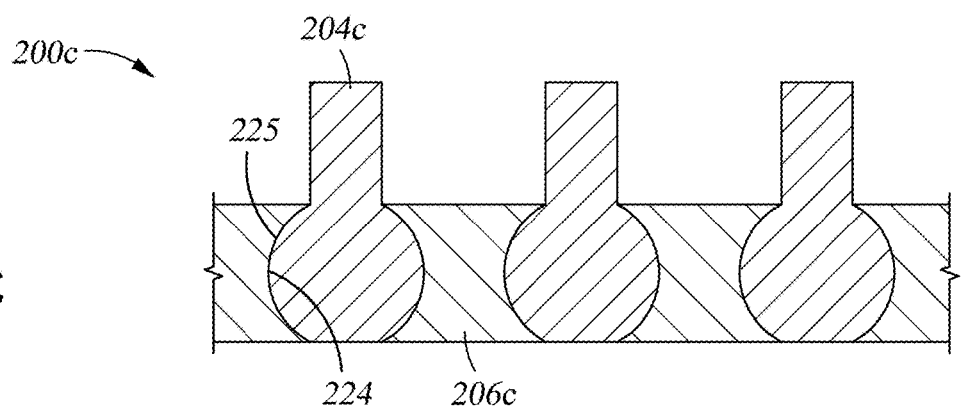
FIG. 2C is a schematic partial sectional view of a polishing pad according to an embodiment of the present disclosure.

FIG. 2C is a schematic partial sectional view of a polishing pad 200c according to one embodiment of the present disclosure. The polishing pad 200c is similar to the polishing pad 200 of FIG. 2A except that the polishing pad 200c includes interlocking hard features 204c and elastic features 206c. The hard features 204c and the elastic features 206c may include a plurality of concentric rings. In one embodiment, the hard features 204c may include protruding sidewalls 224 while the elastic features 206c may include recessing sidewalls 225 to receive the hard features 204c. Alternatively, the elastic features 206c may include protruding sidewalls while the hard features 204c include recessing sidewalls. By having the elastic features 206c interlock with the hard features 204c by protruding sidewalls, the polishing pad 200c obtains an increased tensile strength. Additional, the interlocking sidewalls prevents the polishing pad 200c from being pulled apart.

Figure 2D:
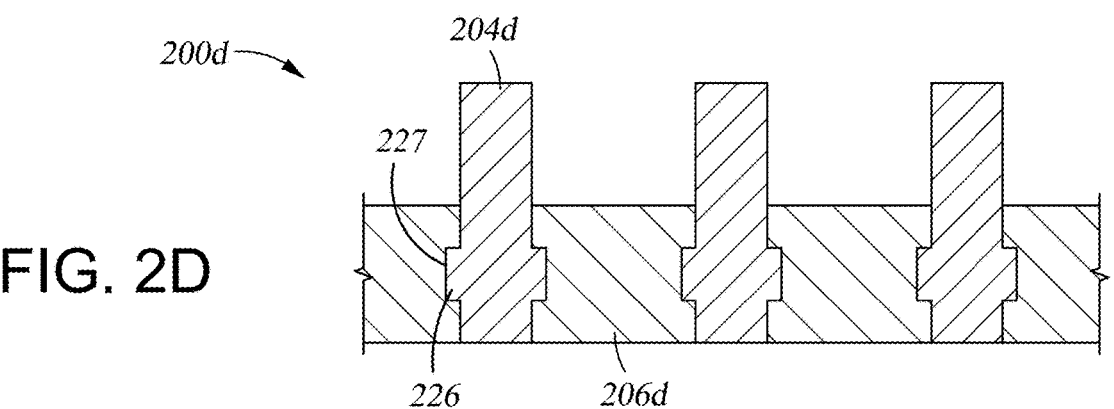
FIG. 2D is a schematic partial sectional view of a polishing pad according to an embodiment of the present disclosure.

FIG. 2D is a schematic partial sectional view of a polishing pad according to one embodiment of the present disclosure. The polishing pad 200d is similar to the polishing pad 200c of FIG. 2C except that the polishing pad 200d includes differently configured interlocking features. The polishing pad 200d may include hard features 204d and elastic features 206d. The hard features 204d and the elastic features 206d may include a plurality of concentric rings. In one embodiment, the hard features 204d may include horizontal ridges 226 while the elastic features 206d may include horizontal recesses 227 to receive the horizontal ridges 226 of the hard features 204d. Alternatively, the elastic features 206d may include horizontal ridges while the hard features 204d include horizontal recesses. In one embodiment, vertical interlocking features, such as the interlocking features of FIG. 2B and horizontal interlocking features, such as the interlocking features of FIGS. 2C and 2D, may be combined to form a polishing pad.

Figure 3A:
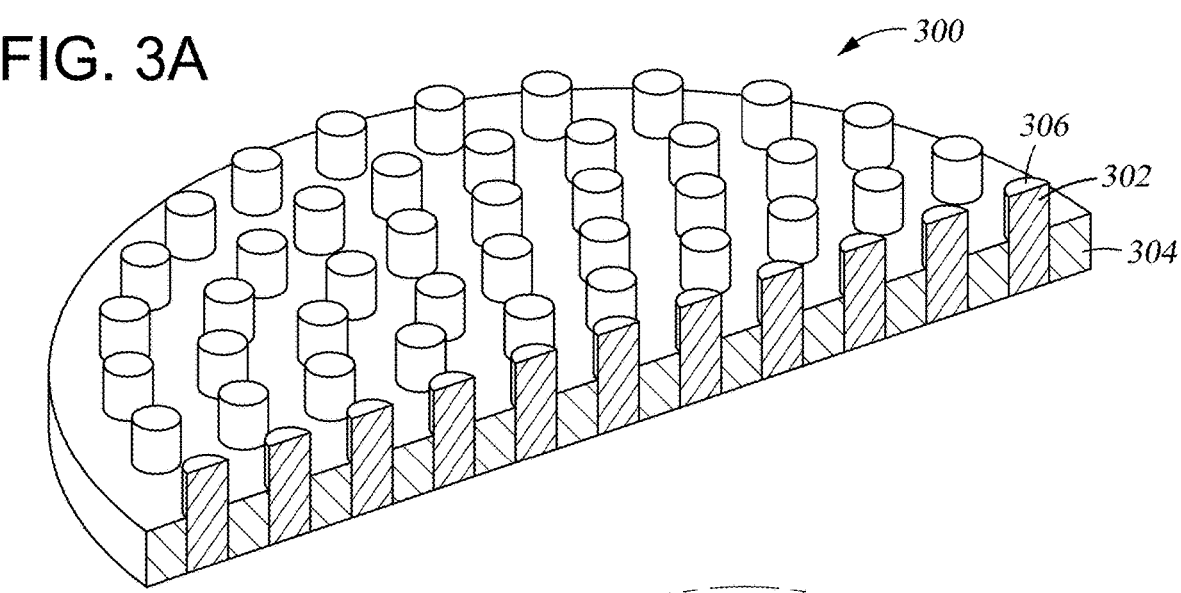
FIG. 3A is a schematic perspective sectional view of a polishing pad according to an embodiment of the present disclosure.

FIG. 3A is a schematic perspective sectional view of a polishing pad 300 according to one embodiment of the present disclosure. The polishing pad 300 includes a plurality of surface features 302 extending from a base material layer 304. Upper surfaces 306 of the surface features 302 form a polishing surface for contacting with the substrate during polishing. The surface features 302 and the base material layer 304 have different properties. For example, the surface features 302 may be formed from a hard material, such as materials for the hard feature 204 of the polishing pad 200, while the base material layers 304 may be formed from an elastic material, such as materials for the elastic features 206 of the polishing pad 200. The polishing pad 300 may be formed by 3D printing, similar to the polishing pad 200.

In one embodiment, the surface features 302 may have substantially the same size. Alternatively, the surface features 302 may vary in size to create varied mechanical property, such as varied Young's modulus or varied storage modulus and varied loss modulus, across the polishing pad 300.

In one embodiment, the surface features 302 may be uniformly distributed across the polishing pad 300. Alternatively, the surface features 302 may be arranged in a non-uniform pattern to achieve target properties in the polishing pad 300.

In FIG. 3A, the surface features 302 are shown to be circular columns protruding from the base material layer 304. Alternatively, the surface features 302 may be of any suitable shape, for example columns with oval, square, rectangle, triangle, polygonal, or irregular sectionals. In one embodiment, the surface features 302 may be of different shapes to tune hardness of the polishing pad 300.

Figure 3B:
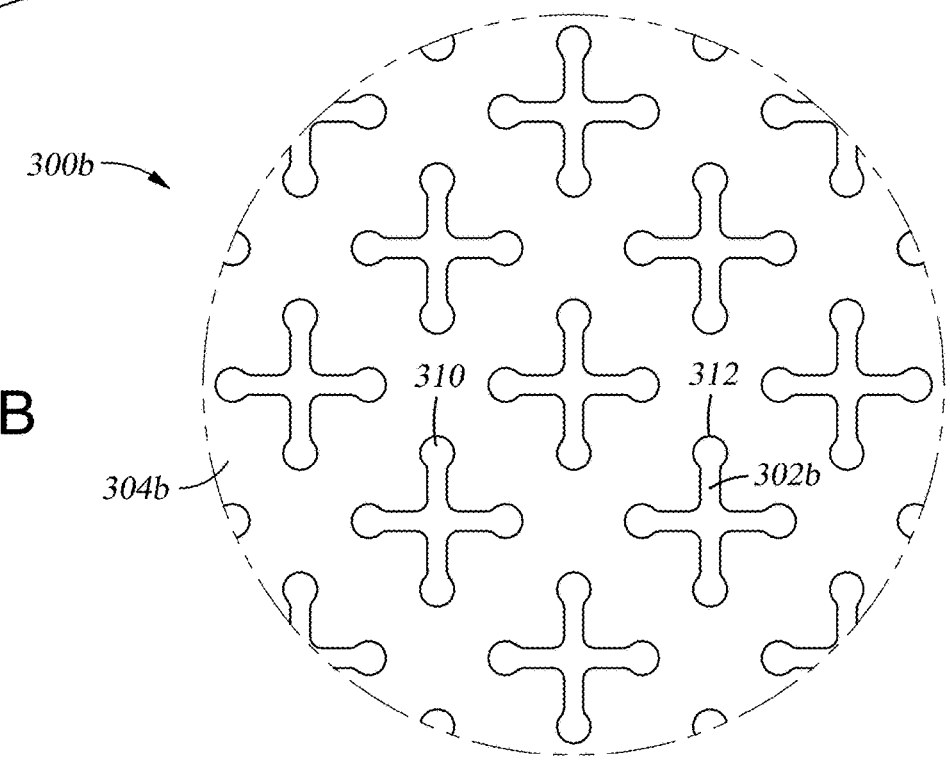
FIG. 3B is a schematic partial top view of a polishing pad according to an embodiment of the present disclosure.

FIG. 3B is a schematic partial top view of a polishing pad 300b according to one embodiment of the present disclosure. The polishing pad 300b is similar to the polishing pad 300 of FIG. 3A except that the polishing pad 300b includes a plurality of surface features 302b interlock with base material layer 304b. In one embodiment, each of the plurality of surface features 302b may include protruding vertical ridges 310 and the base material layer 304b may include vertical recesses 312 for receiving the vertical ridges 310. Alternatively, the base material layer 304b may include protruding ridges while the surface features 302b include recesses. By having the surface features 302b interlock with the base material layer 304b, the polishing pad 300b becomes mechanically stronger under an applied shear force.

Figure 3C:
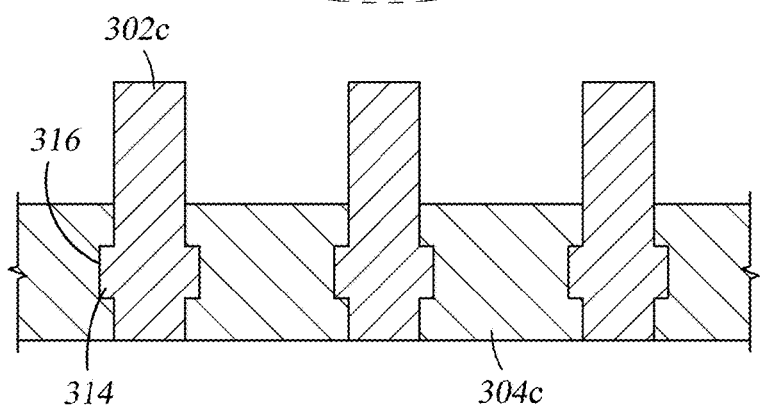
FIG. 3C is a schematic partial sectional view of a polishing pad according to an embodiment of the present disclosure.

FIG. 3C is a schematic partial sectional view of a polishing pad 300c according to one embodiment of the present disclosure. The polishing pad 300c is similar to the polishing pad 300 of FIG. 3A except that the polishing pad 300c includes a plurality of surface features 302c that interlock with base material layer 304c. In one embodiment, each of the plurality of surface features 302c may include protruding horizontal ridges 314 and the base material layer 304c may include horizontal recesses 316 for receiving the horizontal ridges 314. Alternatively, the base material layer 304c may include protruding ridges while the surface features 302c include recesses. By having the base material layer 304c interlock with the surface features 302c by use of the protruding sidewalls, the polishing pad 300c obtains increased tensile strength. Additional, the interlocking sidewalls prevents the polishing pad 300c from being pulled apart during CMP processing or during handling of the CMP pad.

In another embodiment, vertical interlocking features, such as the interlocking features of FIG. 3B and horizontal interlocking features, such as the interlocking features of FIG. 3C, may be combined to form a polishing pad.

Figure 4:
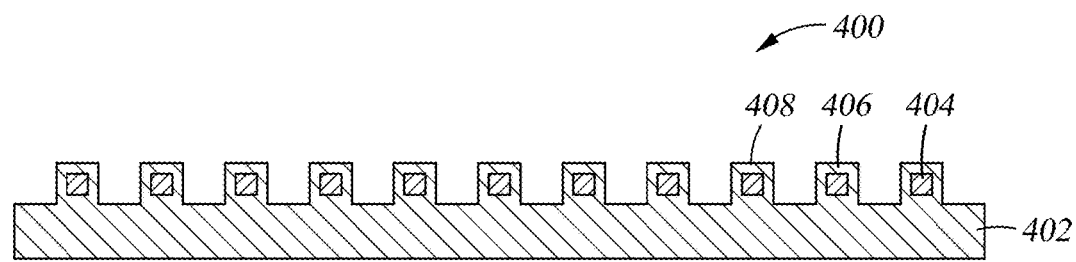
FIG. 4 is a schematic perspective sectional view of a polishing pad according to an embodiment of the present disclosure.

FIG. 4 is a schematic perspective sectional view of a polishing pad 400 according to one embodiment of the present disclosure. The polishing pad 400 includes a base layer 402 that is soft and elastic similar to the elastic features 206 of the polishing pad 200. Similar to the elastic features 206, the base layer 402 may be formed from one or more elastomeric polymers. The polishing pad 400 includes a plurality of surface features 406 extending from the base layer 402. Outer surfaces 408 of the surface features 406 may be formed from a soft material or a composition of soft materials. In one embodiment, the outer surface 408 of the surface features 406 may be formed from the same material or the same composition of materials as the base layer 402. The surface features 406 may also include a hard feature 404 embedded therein. The hard features 404 may be formed from a material or a composition of materials that is harder than the surface features 406. The hard features 404 may be formed from materials similar to the material or materials of the hard features 204 of the polishing pad 200. The embedded hard features 404 alter the effective hardness of the surface features 406, and thus provide a desired target pad hardness for polishing. The soft polymeric layer of the outer surface 408 can be used to reduce defects and improve planarization on the substrate being polished. Alternatively, a soft polymer material may be printed on surfaces of other polishing pads of the present disclosure to provide the same benefit.

Figure 5:
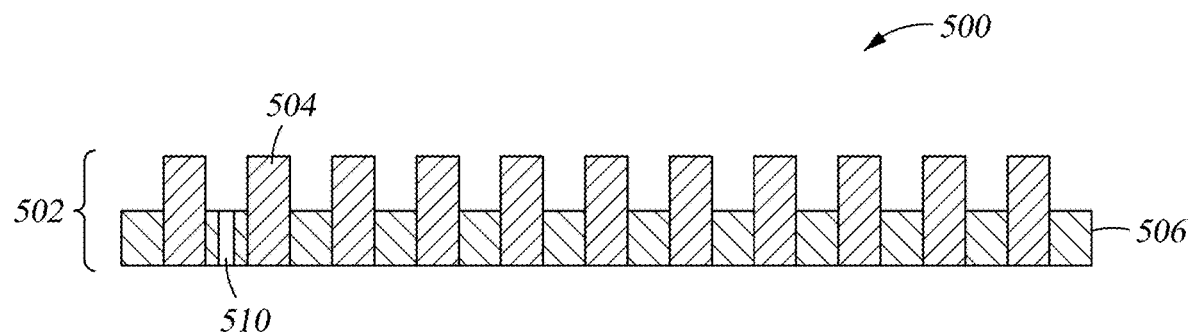
FIG. 5 is a schematic perspective sectional view of a polishing pad having one or more observation windows, according to an embodiment of the present disclosure.

FIG. 5 is a schematic perspective sectional view of a polishing pad 500 having one or more observation windows 510. The polishing pad 500 may have a pad body 502. The pad body 502 may include one or more elastic features 506 and a plurality of hard features 504 extending from the elastic features 506 for polishing. The elastic features 506 and the hard features 504 may be formed from materials similar to those for the elastic features 206 and hard features 204 of the polishing pad 200. The hard features 504 may be arranged in any suitable patterns according to the present disclosure.

The one or more observation windows 510 may be formed from a transparent material to allow observation of the substrate being polished. The observation windows 510 may be formed through, and/or abut portions of, the elastic feature 506 or the hard features 504. In some embodiments, the observation window 510 may be formed from a material that is substantially transparent, and thus is able to transmit light emitted from a laser and/or white light source for use in a CMP optical endpoint detection system. In one embodiment, the observation window 510 may be formed from a transparent 3D printing photopolymer. In one example, the observation window 510 may be formed from polymethylmethacrylate (PMMA). In some embodiments, the observation window 510 is formed from a material that has a low refractive index that is about the same as that of the polishing slurry and has a high optical clarity to reduce reflections from the air/window/water interface and improve transmission of the light through the observation window 510 to and from the substrate. The optical clarity should be high enough to provide at least about 25% (e.g., at least about 50%, at least about 80%, at least about 90%, at least about 95%) light transmission over the wavelength range of the light beam used by the end point detection system's optical detector. Typical optical end point detection wavelength ranges include the visible spectrum (e.g., from about 400 nm to about 800 nm), the ultraviolet (UV) spectrum (e.g., from about 300 nm to about 400 nm), and/or the infrared spectrum (e.g., from about 800 nm to about 1550 nm).

Figure 6:
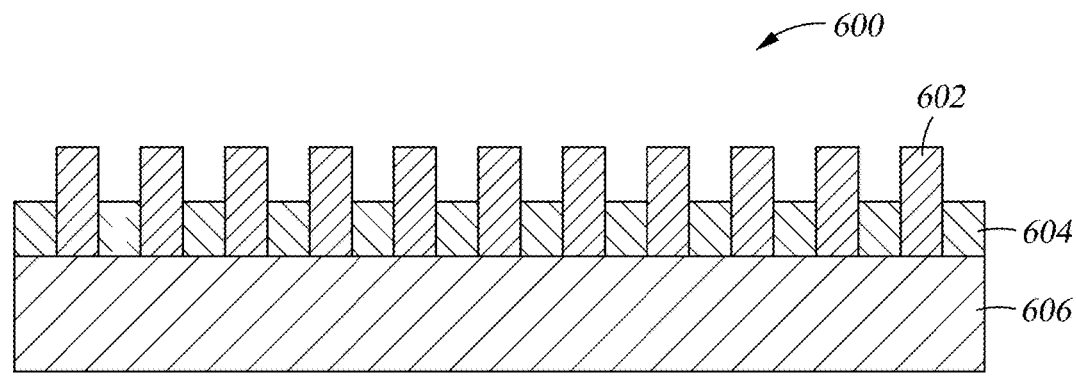
FIG. 6 is a schematic perspective sectional view of a polishing pad including a supporting foam layer, according to an embodiment of the present disclosure.

FIG. 6 is a schematic perspective sectional view of a polishing pad 600 including a backing layer 606. The polishing pad 600 includes a base material layer 604 and a plurality of surface features 602 protruding from the base material layer 604. The polishing pad 600 may be similar to the polishing pads 200, 300, 400, 500 described above except having the backing layer 606 attached to the base material layer 604. The backing layer 606 may provide a desired compressibility to the polishing pad 600. The backing layer 606 may also be used to alter the overall mechanical properties of the polishing pad 600 to achieve a desired hardness and/or have desired dynamic material properties (e.g., storage modulus and elastic modulus). The backing layer 606 may have a hardness value of less than 80 Shore A scale.

In one embodiment, the backing layer 606 may be formed from an open-cell or a closed-cell foam, such as polyurethane or polysilicone with voids, so that under pressure the cells collapse and the backing layer 606 compresses. In another embodiment, the backing layer 606 may be formed from natural rubber, ethylene propylene diene monomer (EPDM) rubber, nitrile, or polychloroprene (neoprene).

Figure 7:
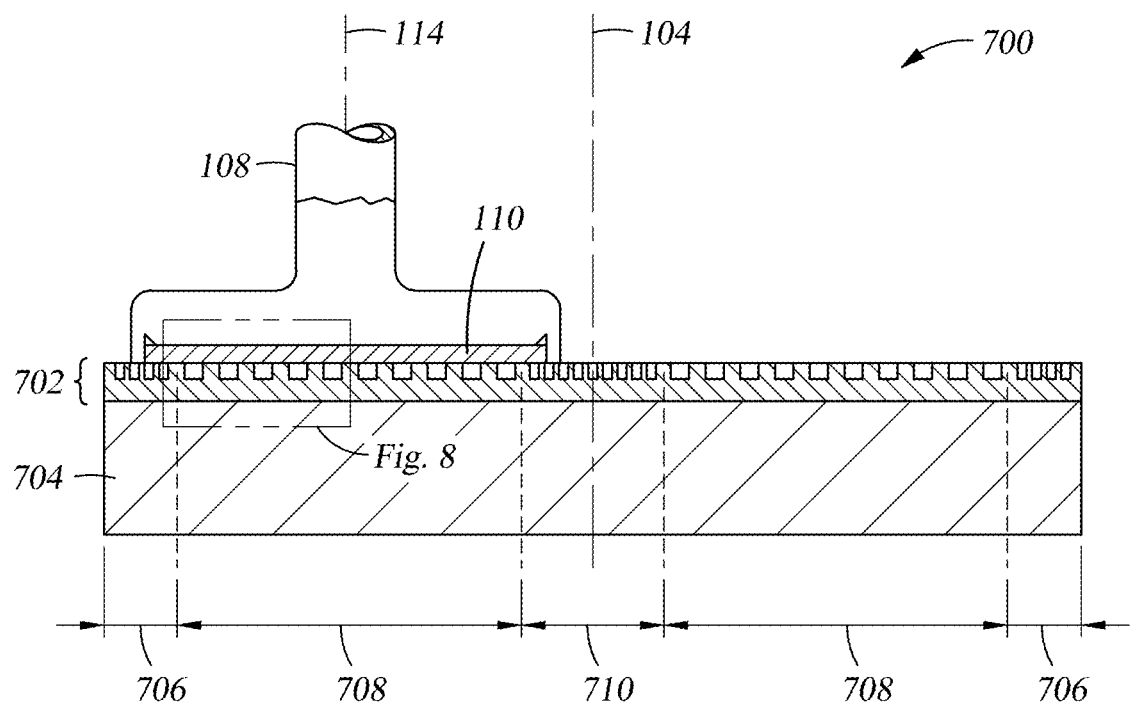
FIG. 7 is a schematic sectional view of a polishing pad having multiple zones, according to an embodiment of the present disclosure.

FIG. 7 is a schematic sectional view of a polishing pad 700 having multiple zones. The polishing pad 700 may be designed to have different properties in regions contacting a central area of the substrate and regions contacting edge regions of the substrate during polishing. FIG. 7 schematically illustrates the carrier head 108 positioning the substrate 110 relative to the polishing pad 700. In one embodiment, the polishing pad 700 may include a composite pad body 702 disposed on a backing layer 704. The composite pad body 702 may be manufactured by 3D printing. As shown in FIG. 7, the polishing pad 700 may be divided into an outer edge zone 706, a central zone 708 and an inner edge zone 710 along the radius of the polishing pad. The outer edge zone 706 and the inner edge zone 710 contact the edge region of the substrate 110 during polishing while the central zone 708 contacts the central region of the substrate during polishing.

The polishing pad 700 has different mechanical properties, such as Young's Modulus or storage modulus and loss modulus, on the edge zones 706, 708 from the central zone 708 to improve edge polishing quality. In one embodiment, the edge zones 706, 710 may have a lower Young's modulus than the central zone 708.

Figure 8:
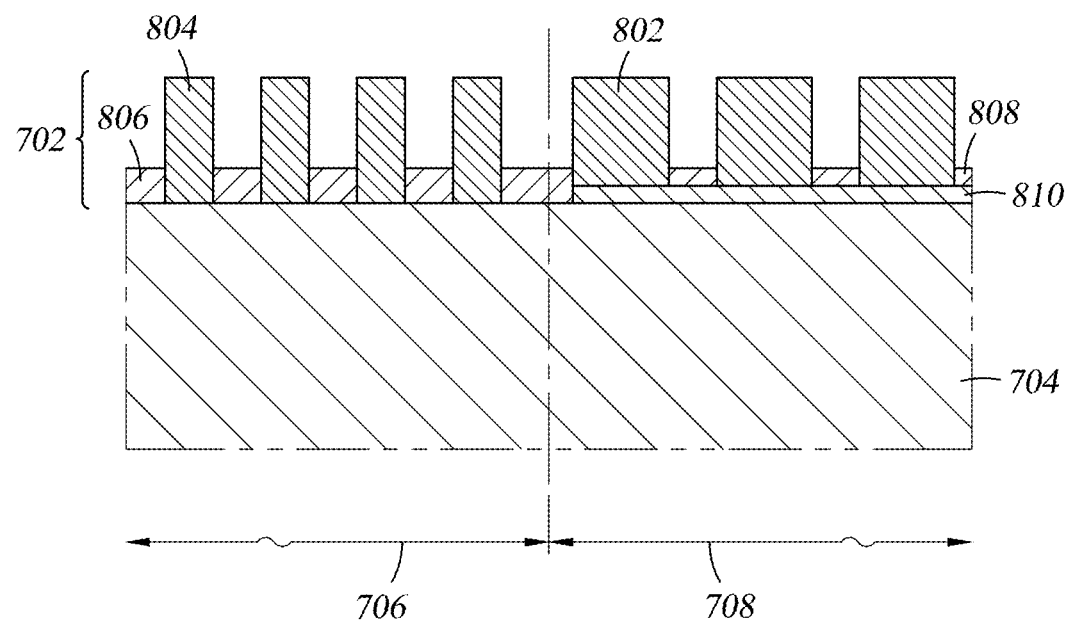
FIG. 8 is a partial enlarged sectional view of the polishing pad of FIG. 7, according to an embodiment of the present disclosure.

FIG. 8 is a partial enlarged sectional view of the polishing pad 700 showing exemplary designs for the outer edge zone 706 and the central zone 708. The outer edge zone 706 includes a base material layer 806 and a plurality of surface features 802. The surface features 804 may be formed from materials harder than the base material layer 806. The central zone 708 includes a base material layer 808 and a plurality of surface features 804. The surface features 802 may be formed from materials harder than the base material layer 808. In one embodiment, the central zone 708 may include a locking layer 810 under the base material layer 808. The locking layer 810 may be formed from a hard material, such as the material for the surface features 302 or hard features 202. The plurality of surface features 804 may be printed on the locking layer 810 to improve stability. As shown in FIG. 8, the surface features 802 in the central zone 708 are larger in size than the surface features 804 in the outer edge zone 706. In one embodiment, the pitch of the surface features 804 in the outer edge zone 706 may be smaller than the pitch of the surface features 802 in the central zone 708.

Figure 9:
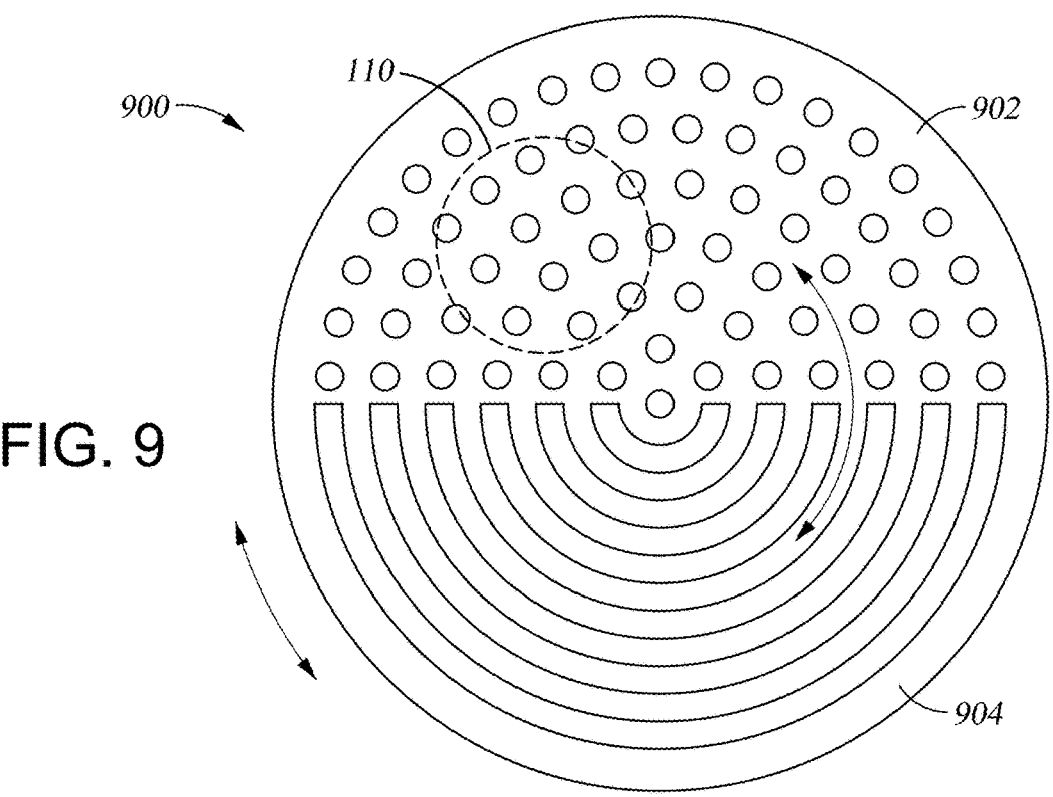
FIG. 9 is a schematic perspective sectional view of a polishing pad according to an embodiment of the present disclosure.

FIG. 9 is a schematic sectional view of a polishing pad 900 having two different polishing surfaces 902, 904. The polishing pad 900 is a composite polishing pad including discrete features. The polishing surfaces 902, 904 may have different patterns and/or different hardness and abrasiveness. In one embodiment, the polishing surface 904 may be a hard and abrasive surface for polishing a substrate and the polishing surface 904 may be soft buff surface. During polishing, while the polishing pad 900 rotates about its central axis (e.g., center of polishing pad extending out of the page of the drawing), the substrate 110 is alternatively exposed to the two polishing surfaces 902, 904 during each rotation of the polishing pad. If the polishing surface 902 is configured to perform a bulk polishing and the polishing surface 904 is configured to perform a buff polishing, the polishing pad 900 performs both bulk polishing and buff polishing at each rotation, thus enable two stages of polishing to be performed at the same time.

Figure 10:
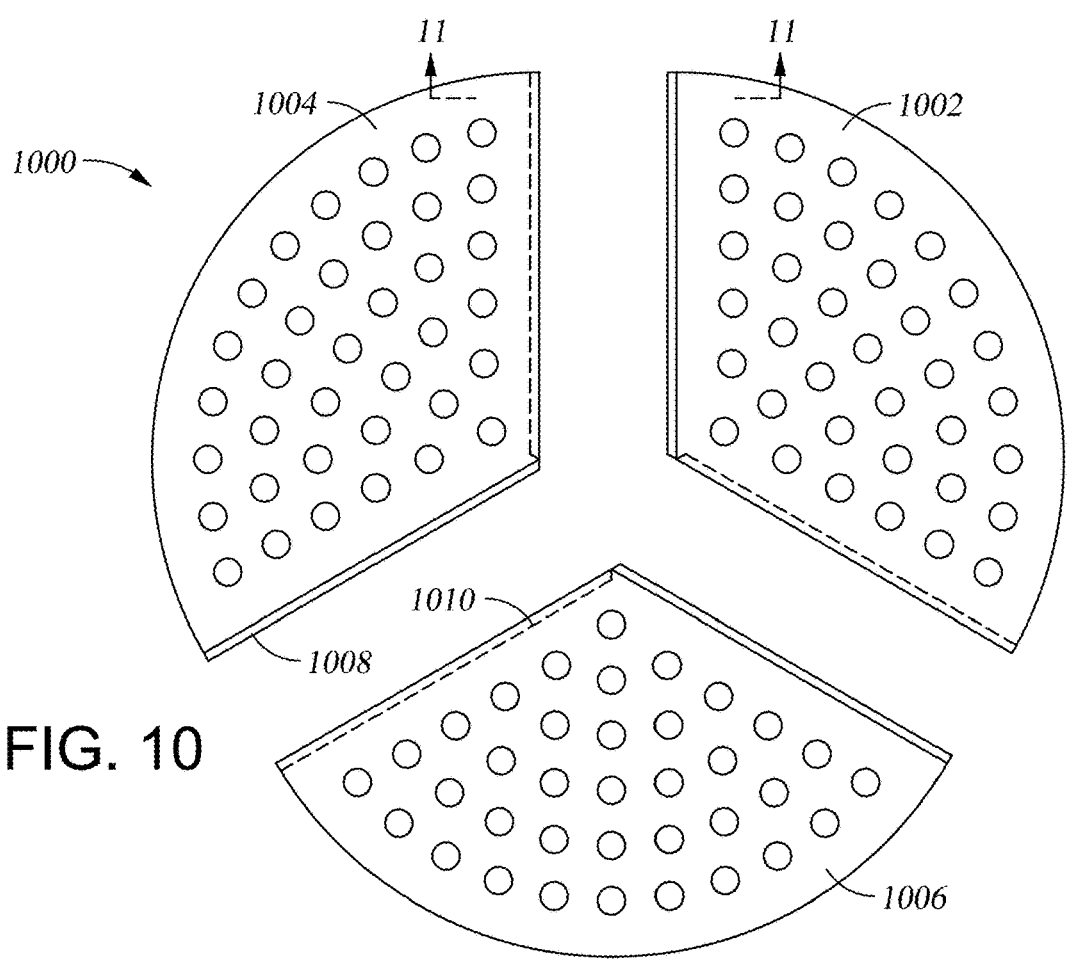
FIG. 10 is a schematic perspective sectional view of a polishing pad according to an embodiment of the present disclosure.

FIG. 10 is a schematic sectional view of a polishing pad 1000. The polishing pad 1000 may include two or more composite pad bodies 1002, 1006, 1004. The composite pad bodies 1002, 1004, 1006 may be formed by 3D printing. The composite pad bodies 1002, 1004, 1006 may have the same or different patterns formed thereon. The composite pad bodies 1002, 1004, 1006 may include locking features 1008, 1010 to securely connect with one another to form the polishing pad 1000. The multiple composite pad body configuration provides flexibility to polishing pad manufacturing and/or transportation.

FIG. 11 is a partial sectional view of the composite pad bodies 1002 and 1004 showing a locking feature according to one embodiment of the present disclosure. For example, the locking feature 1008 may be a horizontal ridge while the locking feature 1010 may be a horizontal recess for receiving a horizontal ridge. Any suitable locking features may be used to join the composite pad bodies 1002, 1004, 1006.

3D Printing Stations

FIG. 12 is a schematic sectional view of a 3D printing station 1200 for manufacturing polishing pads according to the present disclosure. The polishing pad 200 may be printed on a support 1202. The polishing pad 200 is formed by a droplet ejecting printer 1206 from a CAD (computer-aided design) program. The droplet ejecting printer 1206 and the support 1202 may move relative to each other during the printing process.

The droplet ejecting printer 1206 may one or more print heads having nozzles for dispensing liquid precursors. In the embodiment of FIG. 12, the droplet ejecting printer 1206 include a print head 1208 having a nozzle 1210 and a print head 1214 having a nozzle 1212. The nozzle 1210 may be configured to dispense a liquid precursor for a first material, such as a soft or elastic material, while the nozzle 1212 may be used to dispense a liquid precursor for a second material, such as a hard material. In other embodiment, the droplet ejecting printer 1206 may include more than two print heads to form polishing pads with more than two materials. The liquid precursors may be dispensed only at selected locations or regions to form the polishing pad 200. These selected locations collectively form the target printing pattern of surface features and base material layer and can be stored as a CAD-compatible file that is then read by an electronic controller 1204 (e.g., a computer) that controls the droplet ejecting printer 1206.

3D printing processes as described herein includes, but is not limited to, polyjet deposition, inkjet printing, fused deposition modeling, binder jetting, powder bed fusion, selective laser sintering, stereolithography, vat photopolymerization digital light processing, sheet lamination, directed energy deposition, among other 3D deposition or printing processes.

After 3D printing, the polishing pads may be solidified by curing. Curing may be performed by heating the printed polishing pads to a curing temperature. Alternatively, curing may be performed by exposing the printed polishing pad to an ultraviolet light beam generated by an ultra violet light source.

3D printing offers a convenient and highly controllable process for producing polishing pads with discrete features formed from different materials and/or different compositions of materials. In one embodiment, the elastic features and/or the hard features of a polishing pad may be formed from a single material. For example, the elastic features of a polishing pad may be formed from the first material dispensed from the print head 1210. The hard features of the polishing pad may be formed from droplets of the second material dispensed from the print head 1212.

Figure 13:
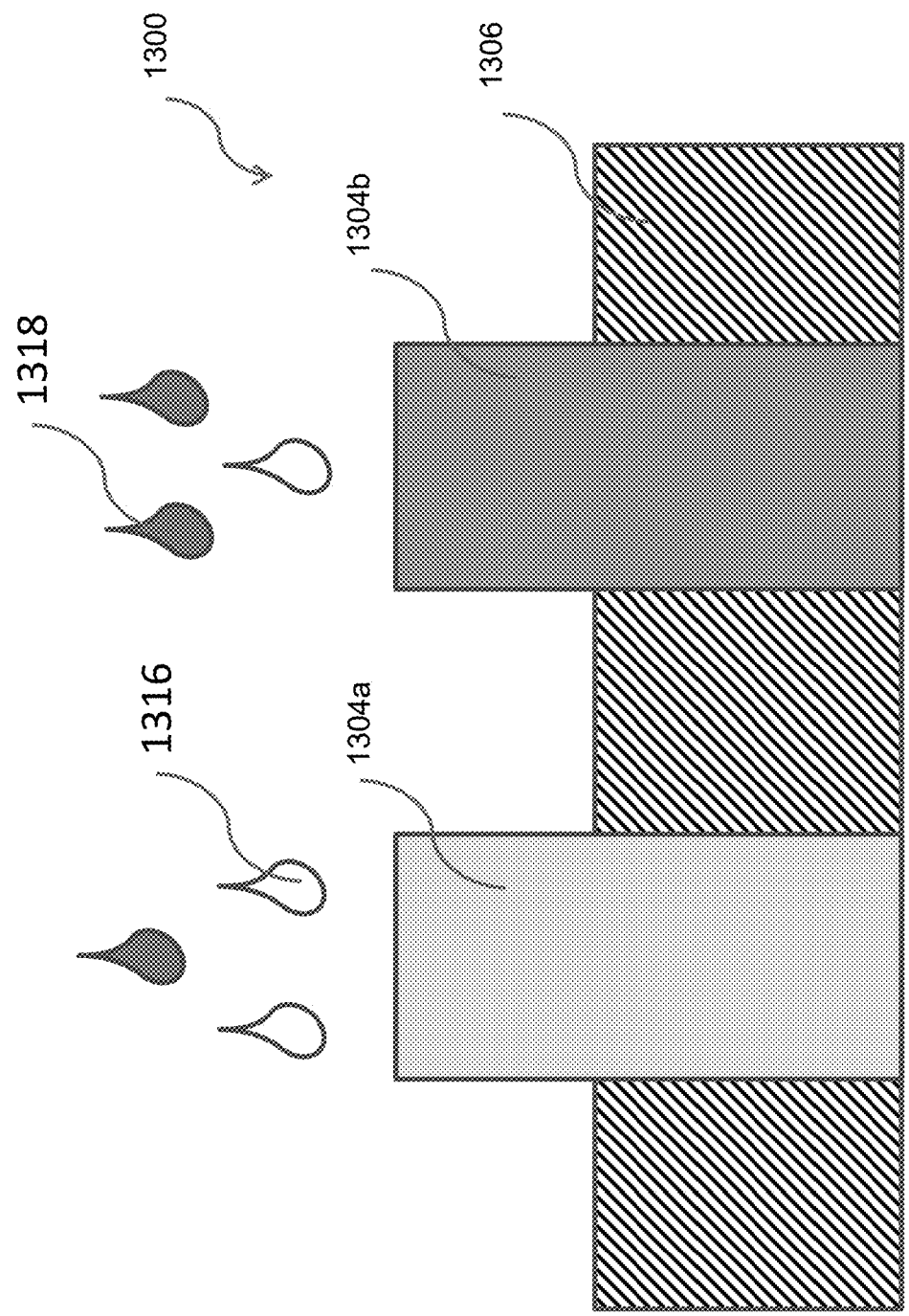
FIG. 13 is a schematic partial sectional view of a polishing pad having features formed from a composition of two materials according to an embodiment of the present disclosure.

In another embodiment, the elastic features and/or the hard features may be formed from a mixture of two or more materials. FIG. 13 is a schematic partial sectional view of a polishing pad 1300 having hard features 1304a, 1304b formed from a composition of two materials. The hard features 1304a, 1304b may be formed from a mixture of a first material and a second material. The first material may be dispensed in the form of droplets 1316 by a first print head, such as the print head 1210, and the second material may be dispensed in the form of droplets 1318 by a second print head, such as the print head 1212. To form the hard feature 1304a with a mixture of the droplets 1316 and the droplets 1318, the print head 1212 may first align with pixels corresponding to the hard feature 1304a and dispense droplets 1318 on predetermined pixels. The print head 1210 may then align with the pixels corresponding to the hard feature 1304a and dispense droplets 1316 on predetermined pixels. As a result, a layer including droplets 1316 and droplets 1318 is added to the hard feature 1304a. The polishing pad may thus be formed from a first material that comprises a first composition of materials that is formed by depositing droplets of one or more materials and a second material that comprises a second composition of materials that is formed by depositing droplets of one or more different materials.

Properties of the hard feature 1304a, 1304b may be adjusted or tuned according to the ratio and/or distribution of the first material and the second material. In one embodiment, the composition of the hard features 1304a, 1304b is controlled by selecting size, location, speed, and/or density of the droplets 1316, 1318.

The hard features 1304a, 1304b may have identical compositions. Alternatively, each hard feature 1304a, 1304b may have an individualized composition. Similarly, elastic features 1306 may be formed from a mixture of materials as well. Compositions of each elastic feature 1306 may also be individualized to achieve target properties. Even though only two materials are used in forming the features 1304a, 1304b, embodiments of the present disclosure encompass forming features on a polishing pad with a plurality of materials. In some configurations, the composition of the hard and/or elastic features in a polishing pad are adjusted within a plane parallel to the polishing surface and/or through the thickness of the polishing pad, as discussed further below.

Polishing Pad Patterns

Figure 14A:
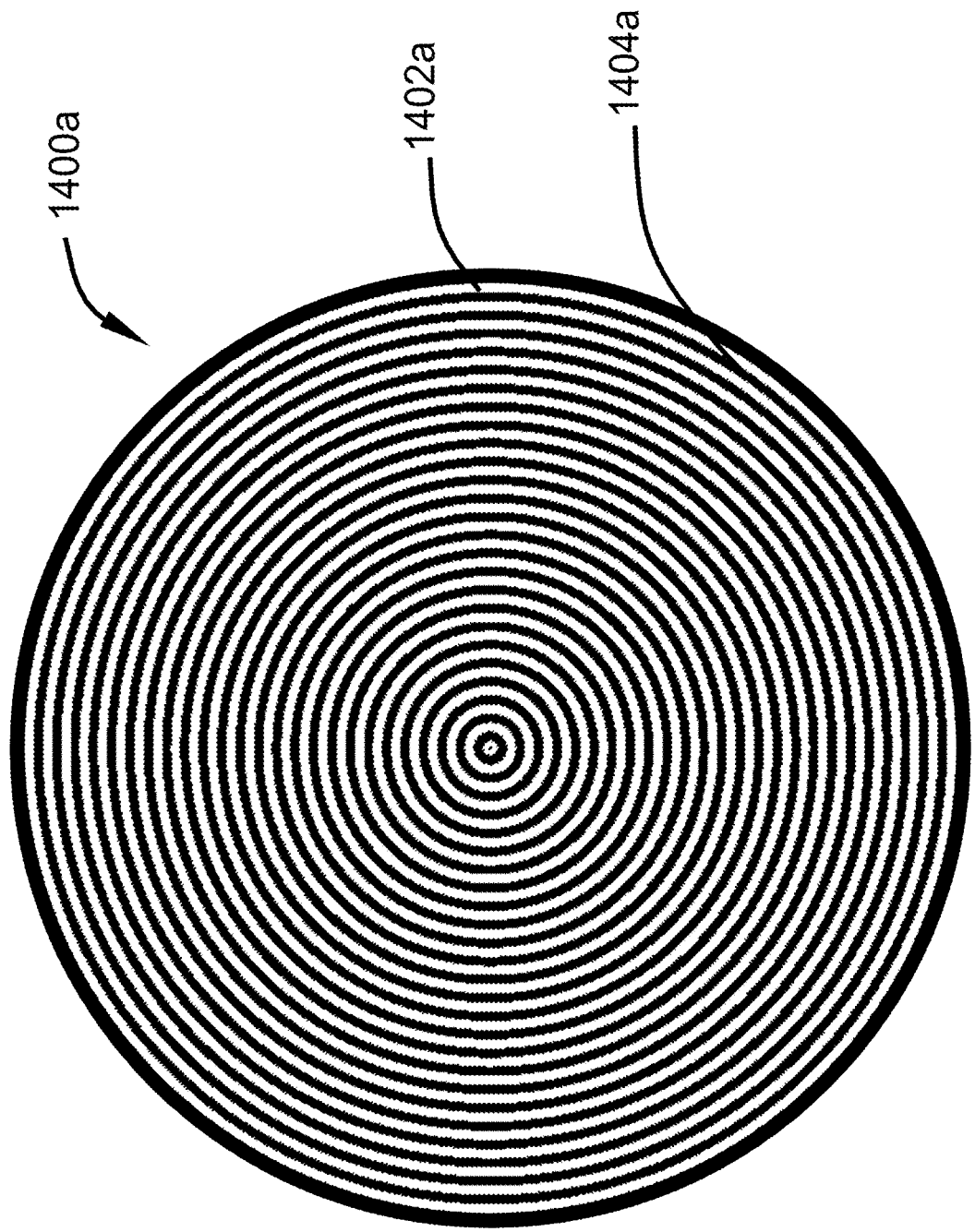
FIGS. 14A-14O are schematic views of polishing pad designs according to at least one embodiment of the present disclosure.
Figure 14B:
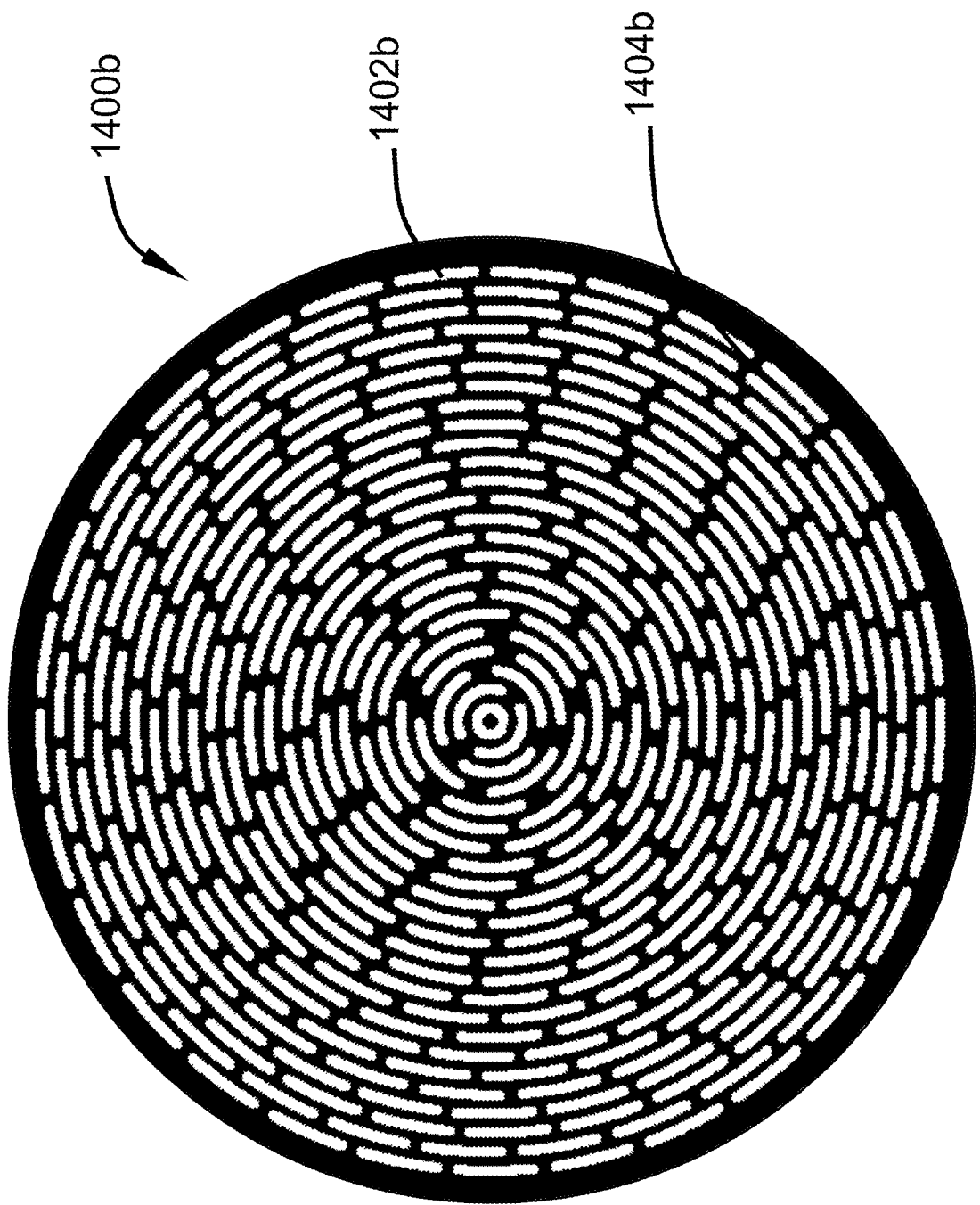
Figure 14C:
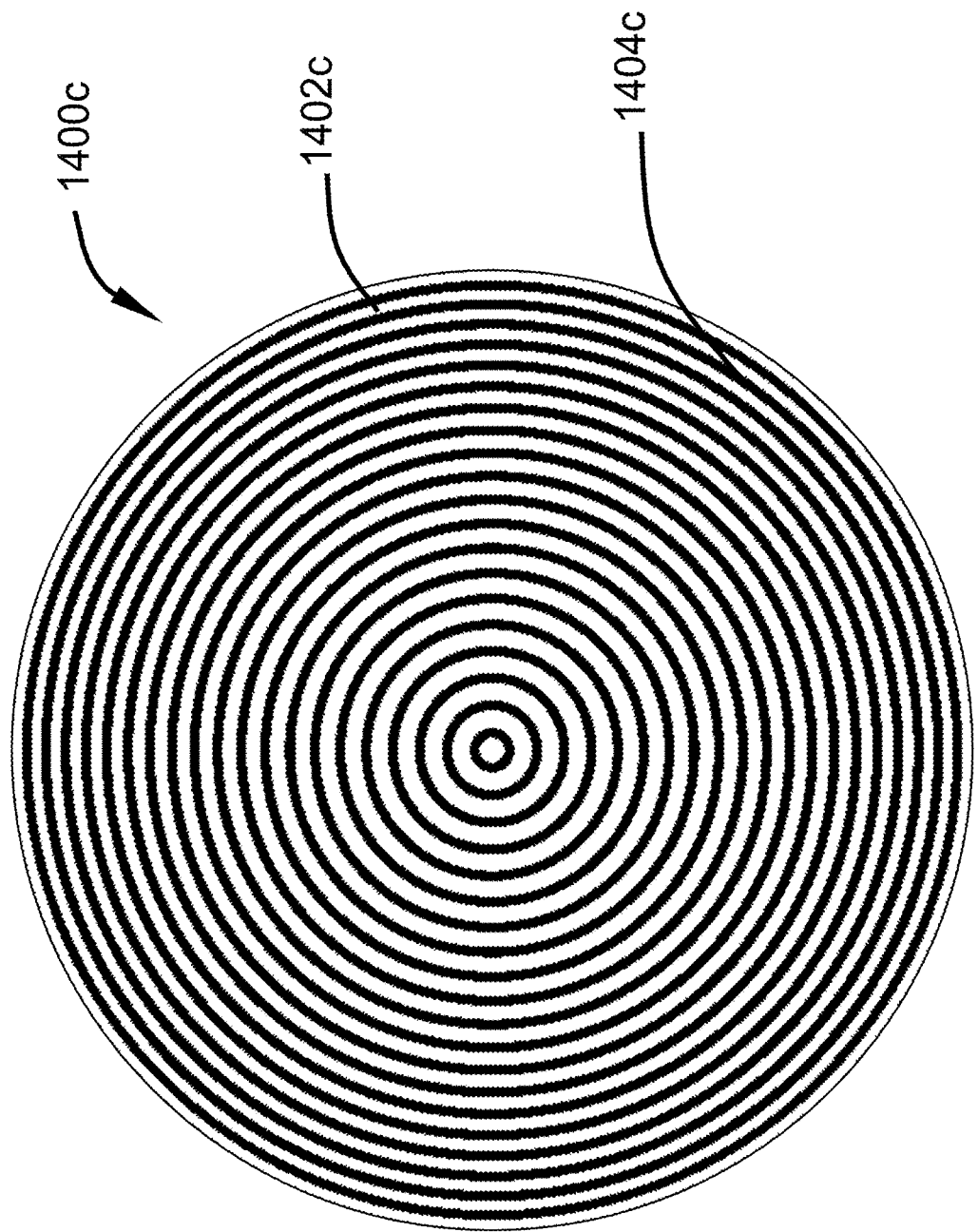
Figure 14D:
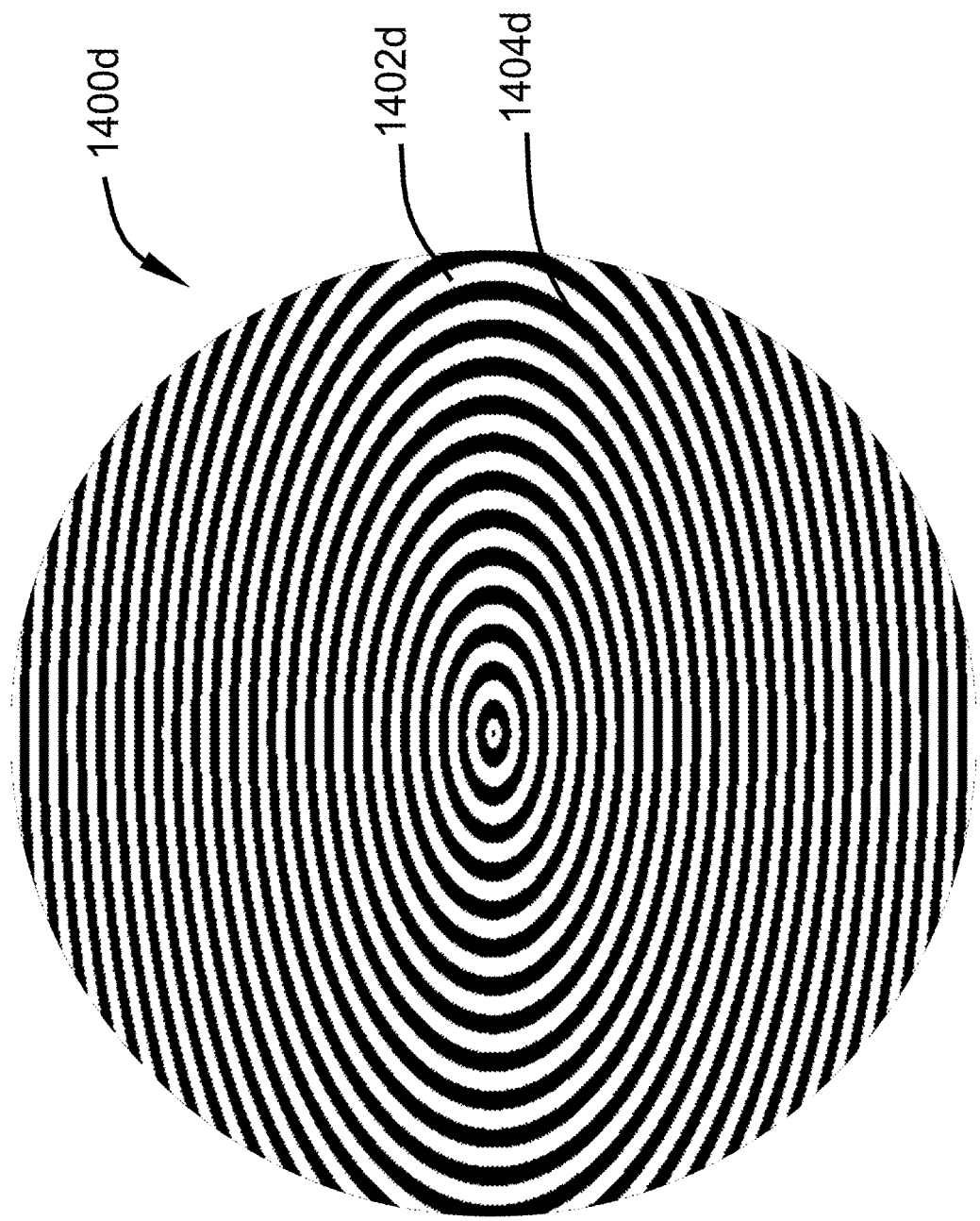
Figure 14E:
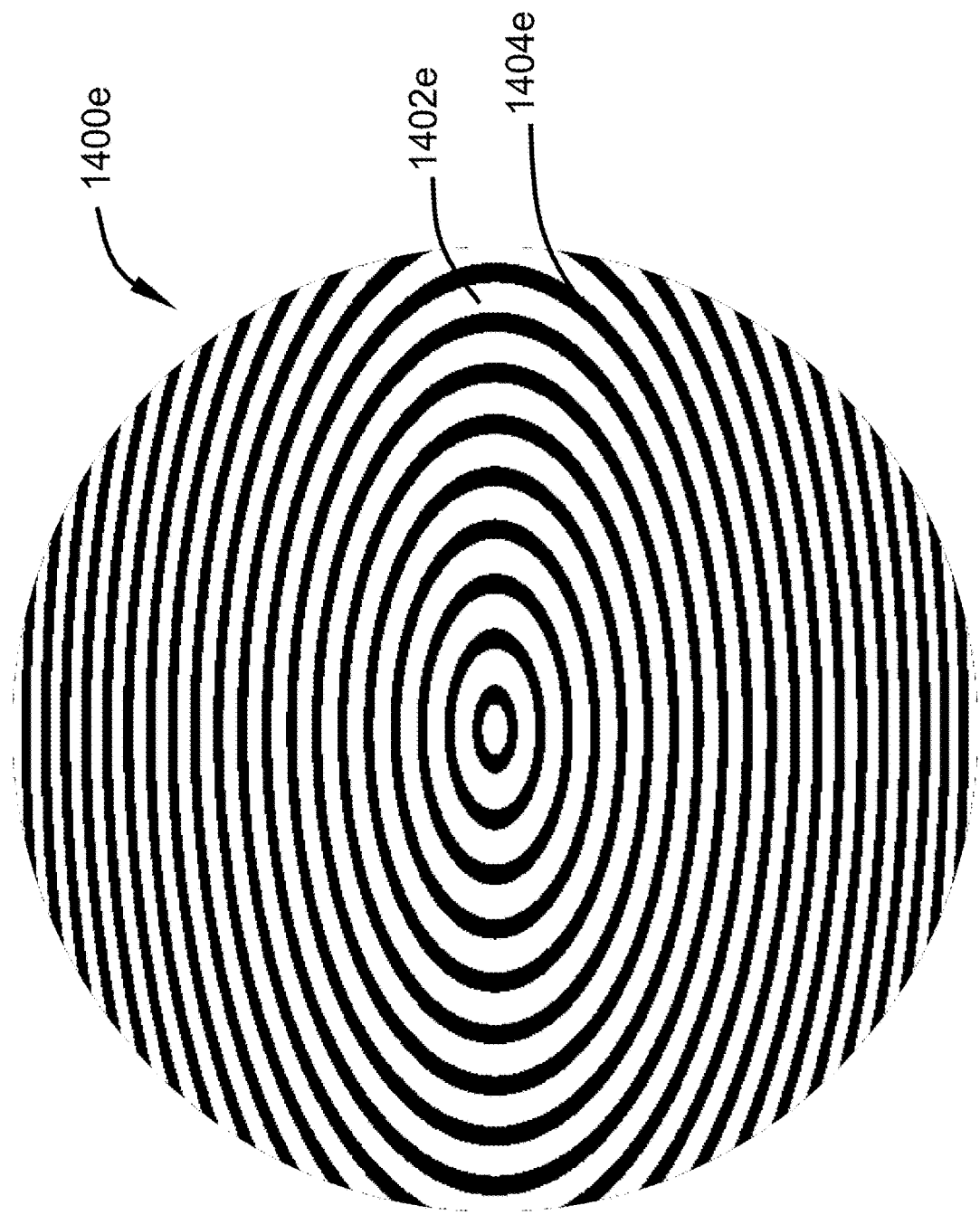
Figure 14F:
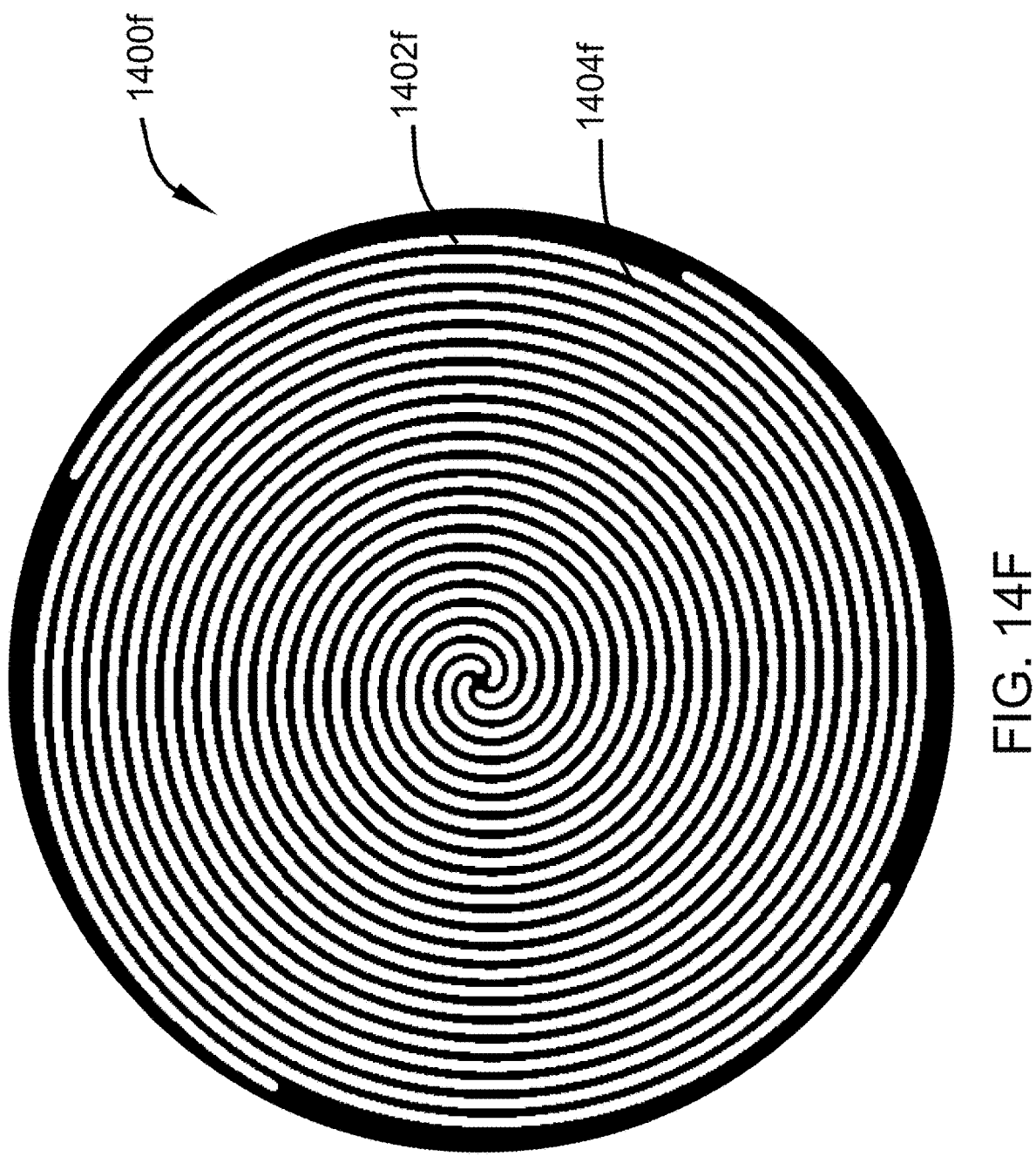
Figure 14G:
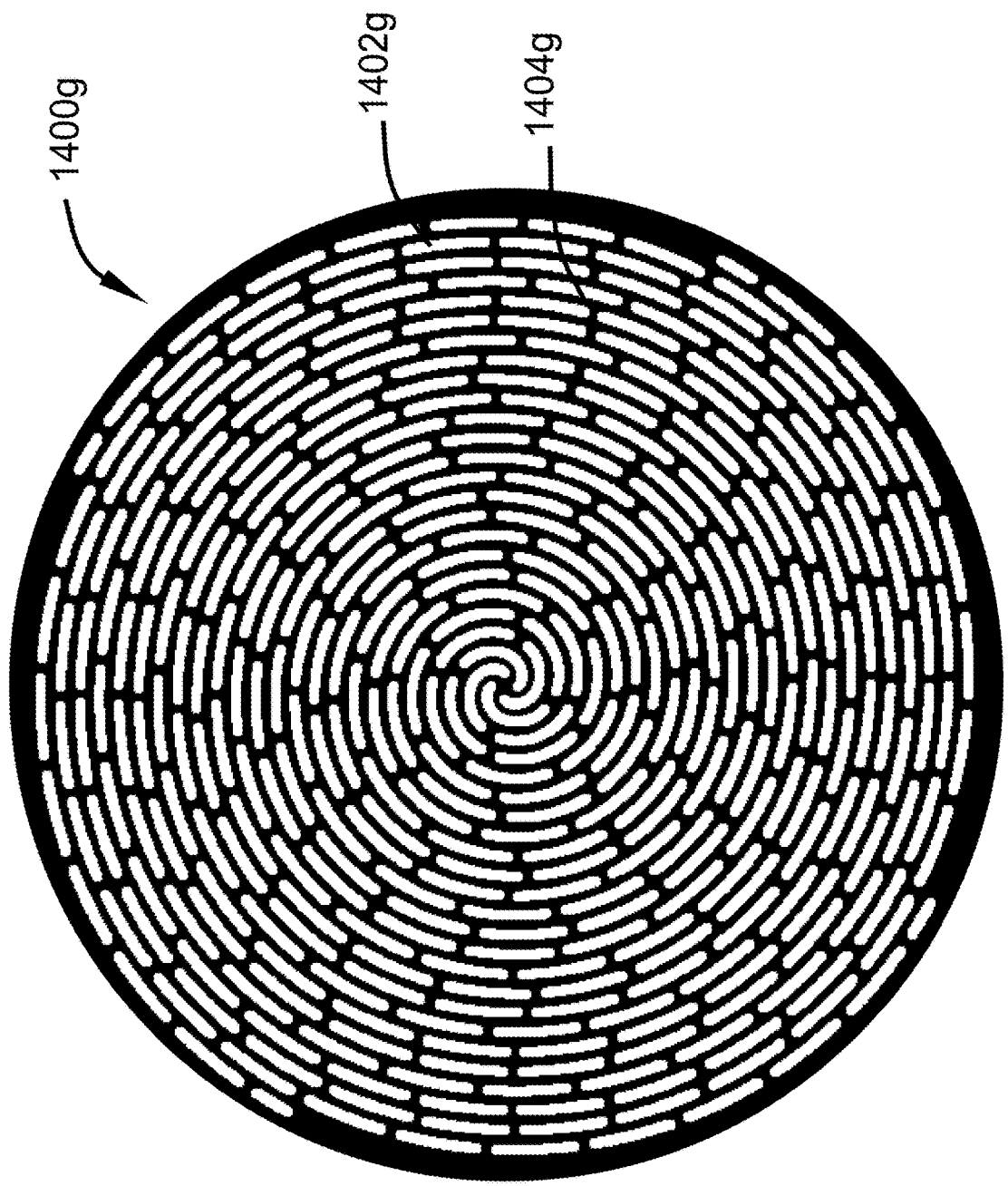
Figure 14H:
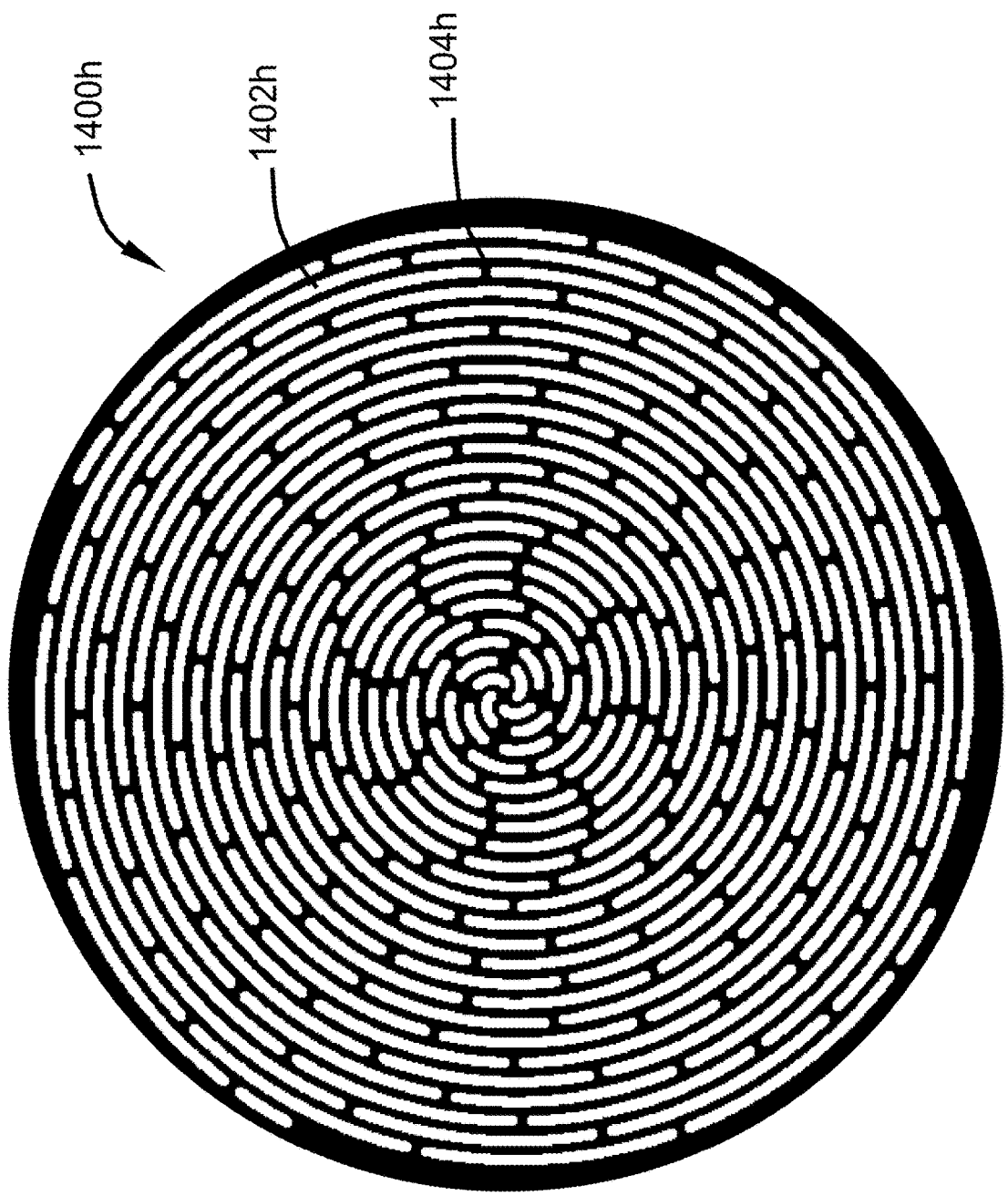
Figure 14I:
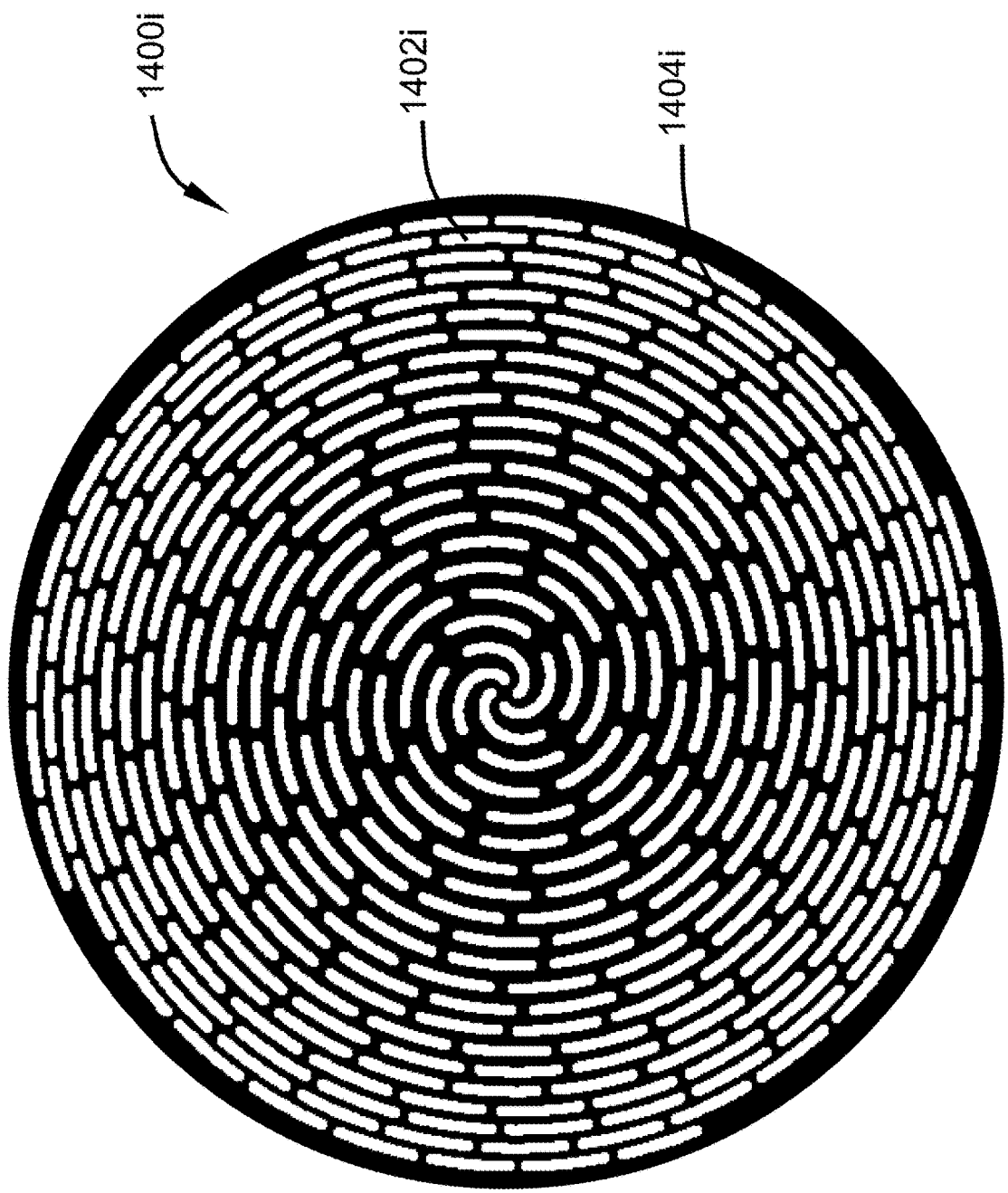
Figure 14J:
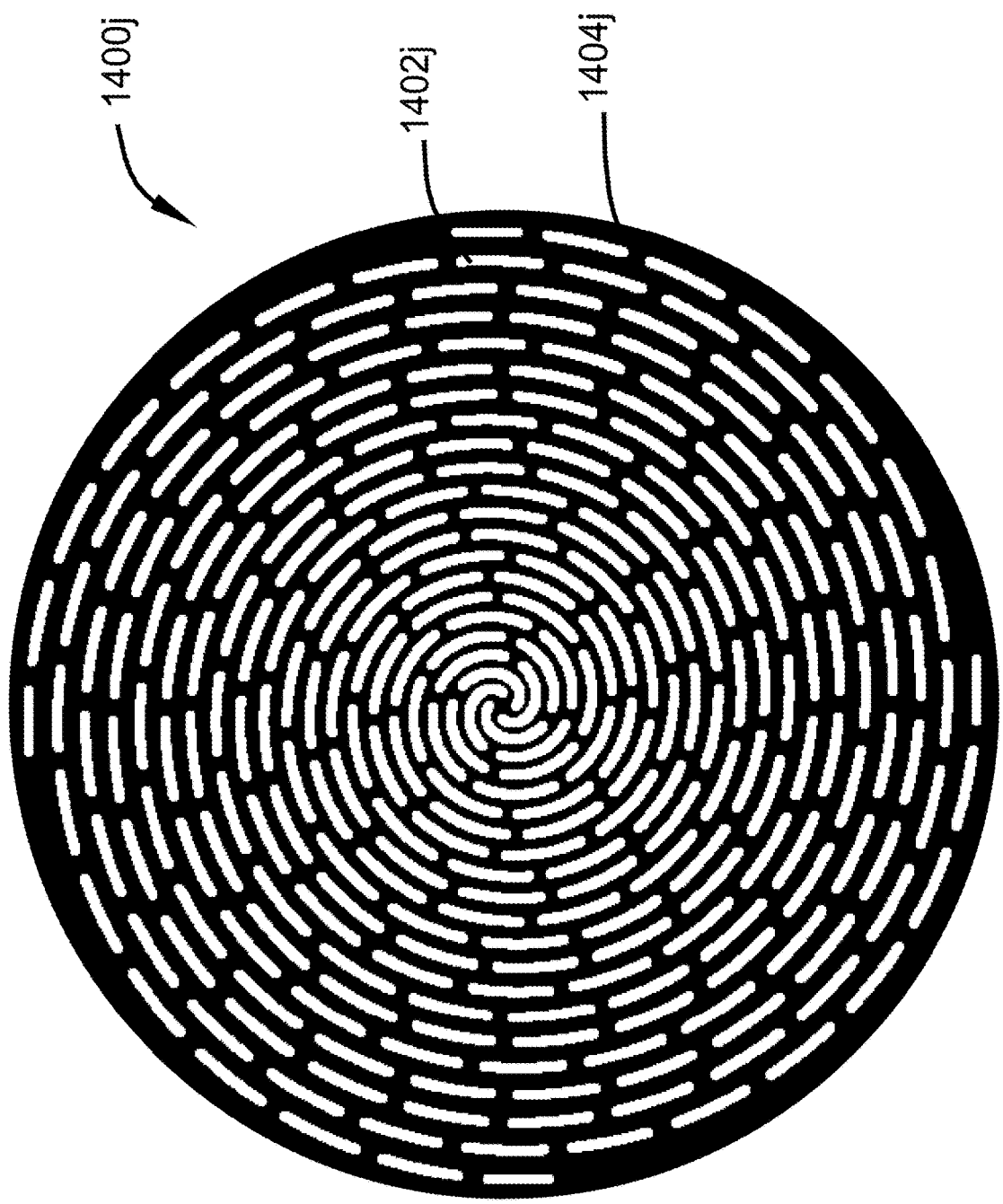
Figure 14K:
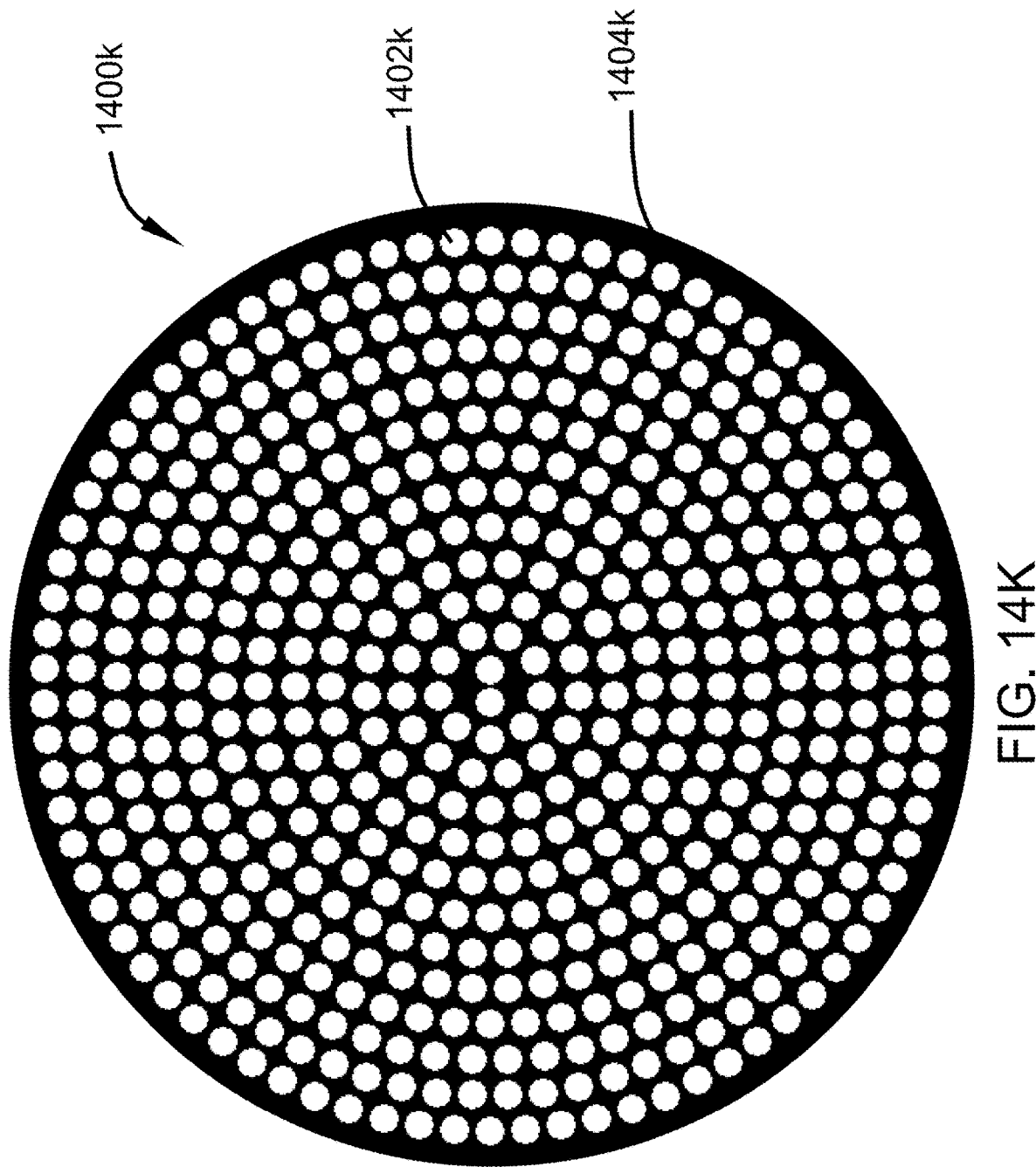
Figure 14L:
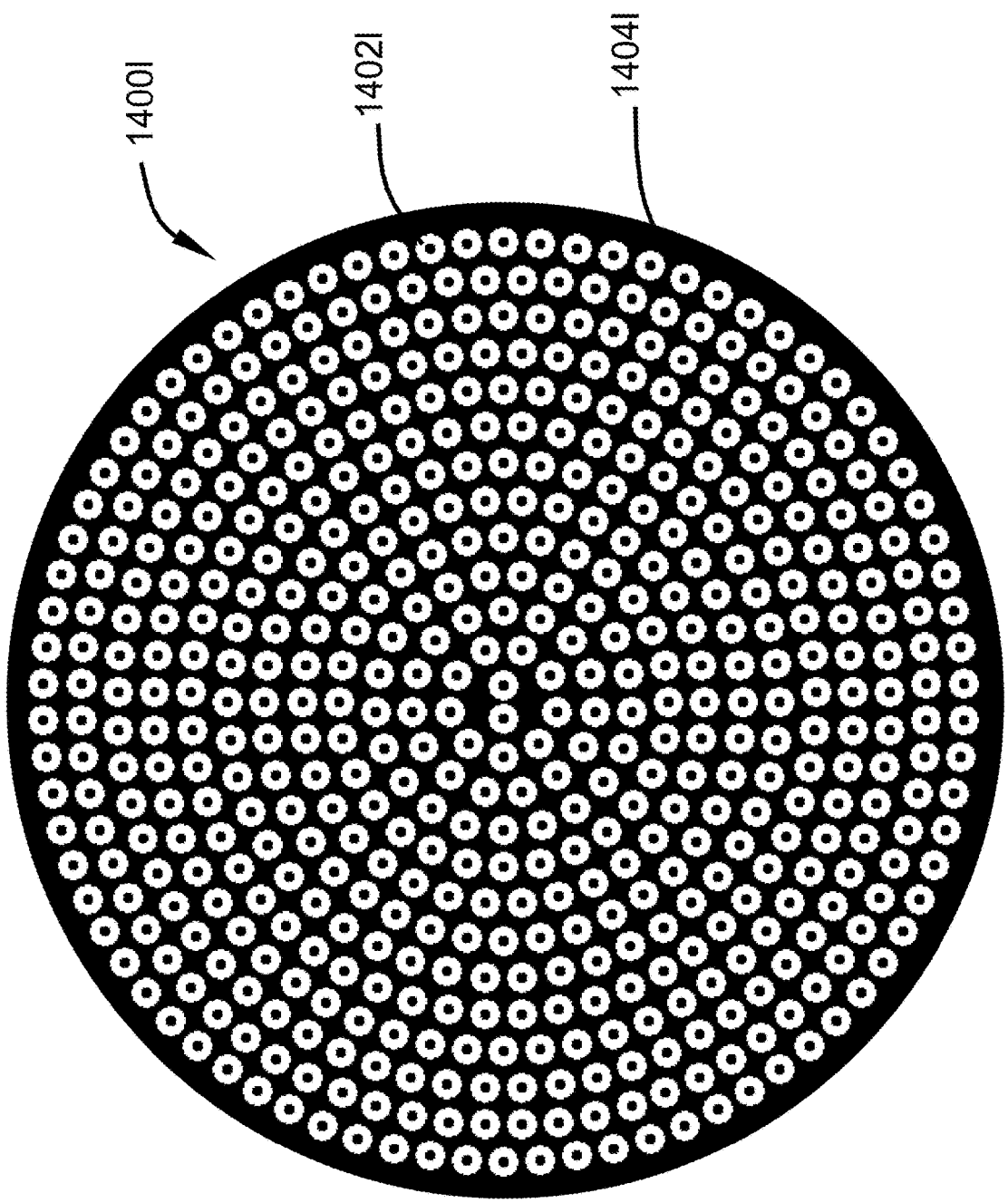
Figure 14M:
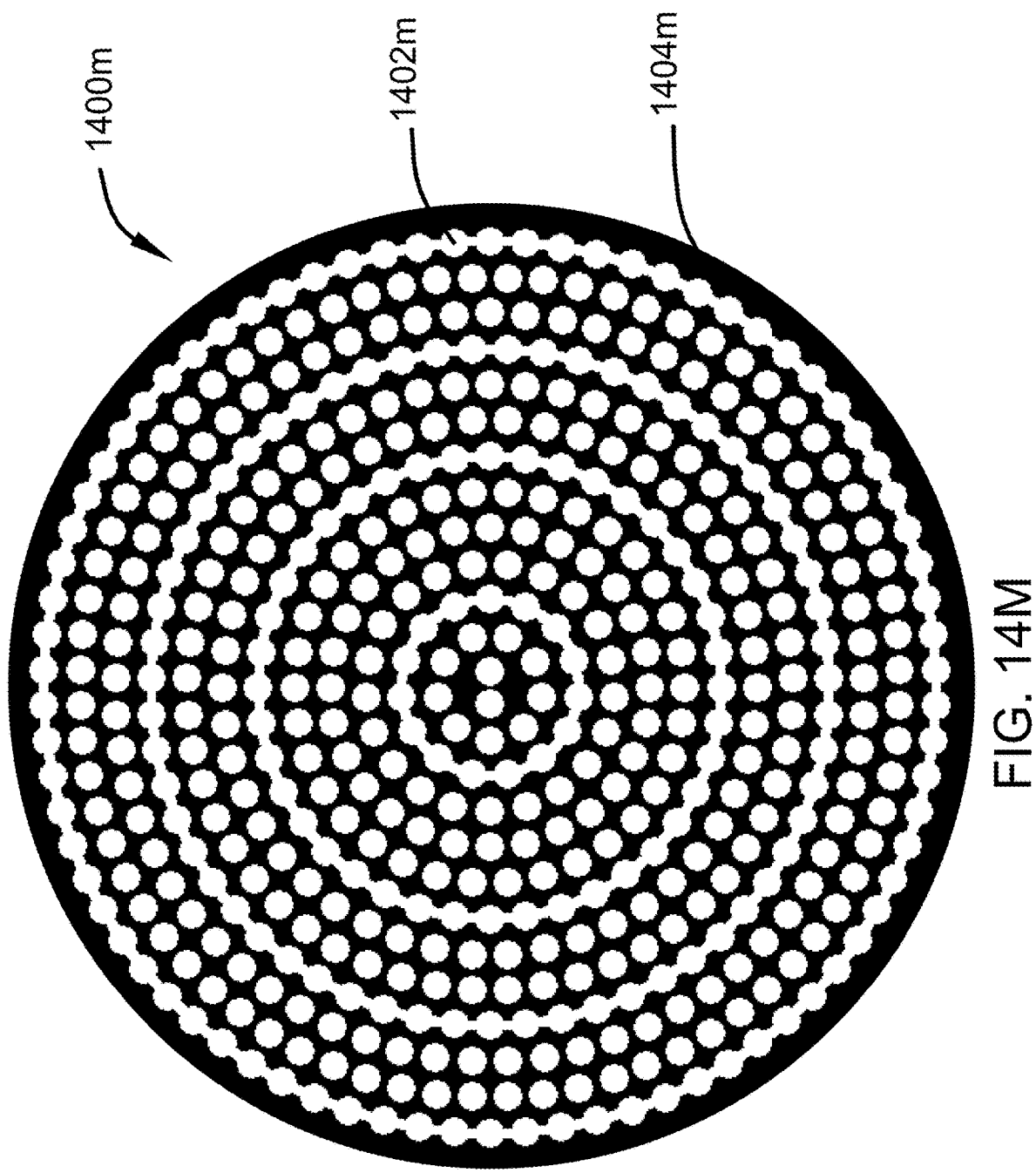
Figure 14N:
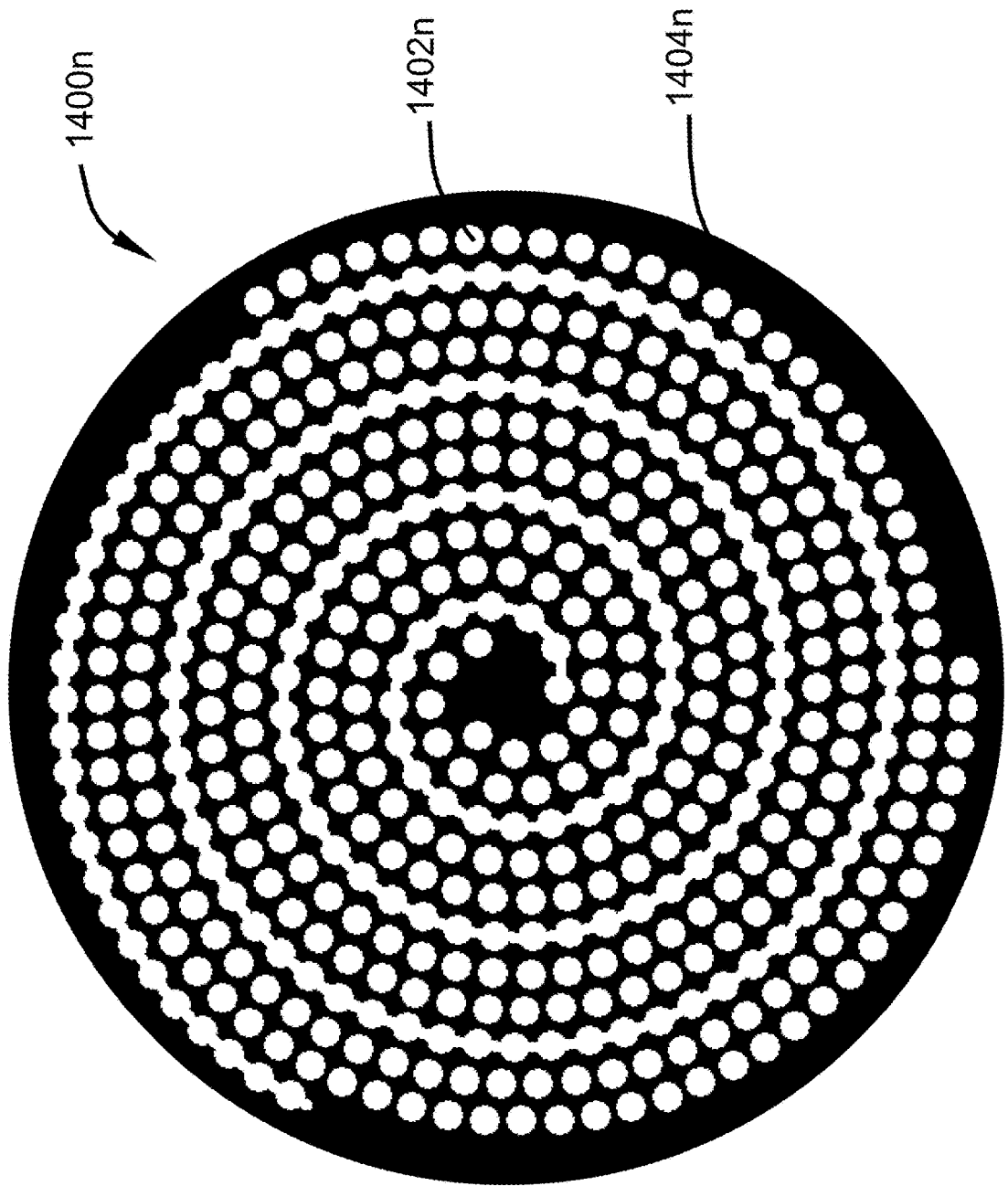
Figure 14O:
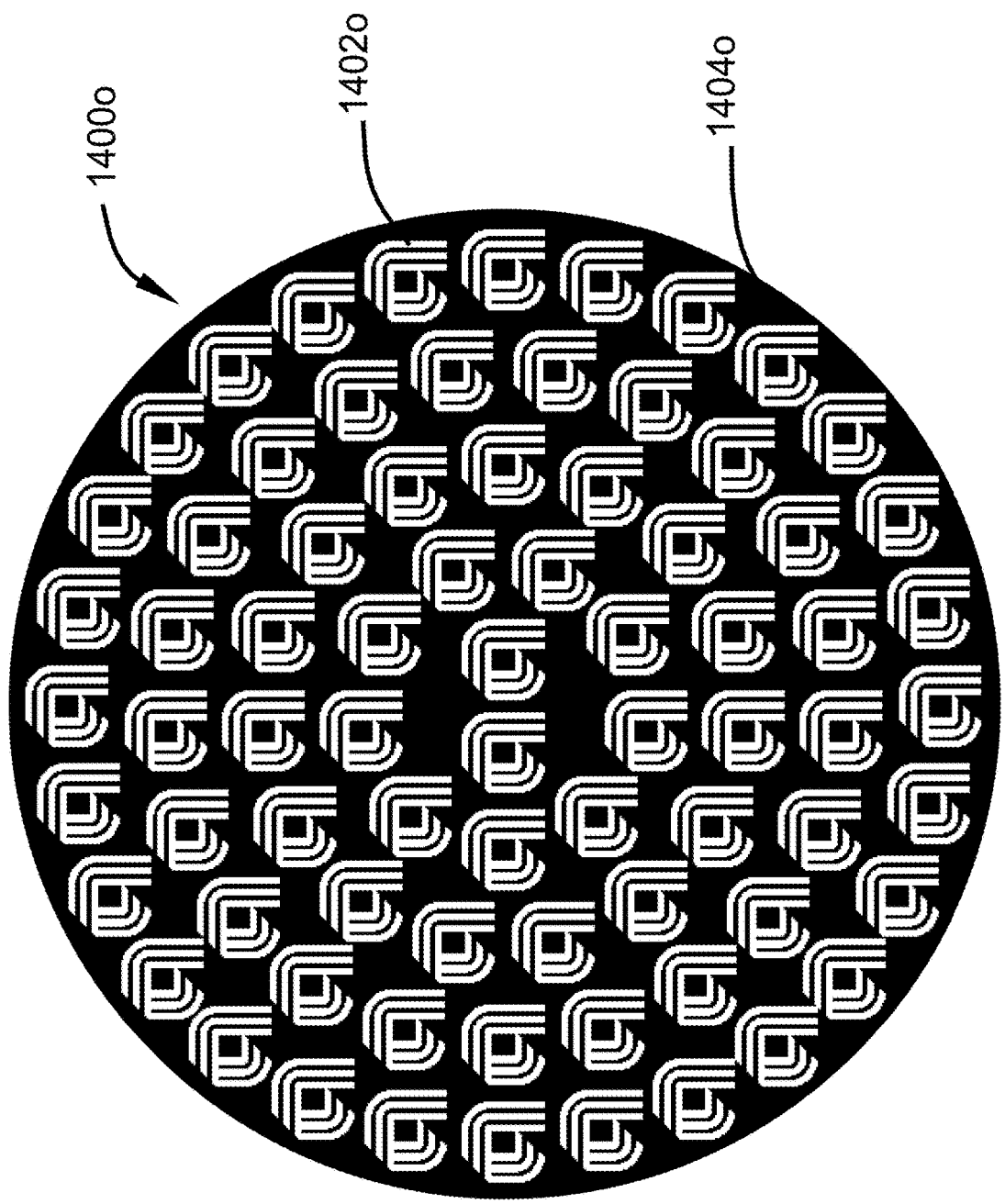

FIGS. 14A-14O are schematic views of polishing pad designs according to embodiments of the present disclosure. Each of the FIGS. 14A-14O include pixel charts having white regions (regions in white pixels) that represent polishing features 1402a-1402o for contacting and polishing a substrate, and black regions (regions in black pixels) that represent the base features 1404a-1404o. The polishing features 1402a-1402o may be similar to the hard features 204 of the polishing pad 200. The base features 1404a-1404o may be similar to the elastic features 206 of the polishing pad 200. The white regions generally protrude over the black regions so that channels are formed in the black regions between the white regions. Polishing slurry may flow through and may be retained in the channels during polishing. The polishing pads shown in FIGS. 14A-14O may be formed by depositing a plurality of layers of materials using a 3D printer. Each of the plurality of layers may include two or more materials to form the polishing features 1402a-1404o and the base features 1404a-1404o. In one embodiment, the polishing features 1402a-1402o may be thicker than the base features 1404a-1404o in a direction normal to a plane that is parallel to the plurality of layers of materials so that grooves and/or channels are formed on a top surface of the polishing pad.

FIG. 14A is a schematic pixel chart of a polishing pad design 1400a having a plurality of concentric polishing features 1402a. The polishing features 1402a may be concentric circles of identical width. In one embodiment, the base features 1404a may also have identical width so that the pitch of the polishing features 1402a is constant along the radial direction. During polishing, channels between the polishing features 1402a retain the polishing slurry and prevent rapid loss of the polishing slurry due to a centrifugal force generated by rotation of the polishing pad about its central axis (i.e., center of concentric circles).

FIG. 14B is a schematic pixel chart of a polishing pad design 1400b having a plurality of segmented polishing features 1402b arranged in concentric circles. In one embodiment, the segmented polishing features 1402b may have substantially identical length. The segmented polishing features 1402b may form a plurality of concentric circles. In each circle, the segmented polishing features 1402b may be equally distributed within each concentric circle. In one embodiment, the segmented polishing features 1402b may have an identical width in the radial direction. In some embodiments, the segmented polishing features 1402b each substantially have an identical length irrespective of the radius is of the concentric circle (e.g., equal arc length except for the center region of the polishing pad). In one embodiment, the base features 1404b between the plurality of concentric circles may also have identical width so that the pitch of the concentric circles is constant. In one embodiment, gaps between the segmented polishing features 1402b may be staggered from circle to circle to prevent polishing slurry from directly flowing out of the polishing pad under the centrifugal force generated by rotation of the polishing pad about its central axis.

FIG. 14C is a schematic pixel chart of a polishing pad design 1400c having a plurality of concentric polishing features 1402c formed over base features 1404c. The pad design in FIG. 14C is similar to the pad design 1400a in FIG. 14A except the widths of the polishing features 1402c gradually vary along the radial direction. In one embodiment, the widths of the polishing features reduce from a center of the polishing pad towards an edge of the polishing pad while the distance between neighboring polishing features 1402c remain constant. The variation of the width of the polishing features 1402c may be used to compensate the difference in linear speed of the substrate being polished at various radial locations of the polishing pad, while the polishing pad is rotating about a center axis.

FIG. 14D is a schematic pixel chart of a polishing pad design 1400d having a plurality of concentric polishing features 1402d formed over base features 1404d. The pad design in FIG. 14D is similar to the pad design 1400a in FIG. 14A except the polishing features 1402d are elliptical instead of circular. The elliptical polishing features 1402d will allow any radial location on the polishing pad to have polishing features of multiple dimensions and orientations, thus, improving polishing uniformity.

FIG. 14E is a schematic pixel chart of a polishing pad design 1400e having a plurality of concentric elliptical polishing features 1402e formed over base features 1404e. The pad design in FIG. 14E is similar to the pad design 1400d in FIG. 14D except the elliptical polishing features 1402e vary in width along a radial direction. The elliptical polishing features with varied width will allow a radial location on the polishing pad to have more variation in the polishing features that contact a substrate during polishing, thus, improving polishing uniformity.

FIG. 14F is a schematic pixel chart of a polishing pad design 1400f having spiral polishing features 1402f over base features 1404f. In FIG. 14F, the polishing pad 1400f has four spiral polishing features 1402f extending from a center of the polishing pad to an edge of the polishing pad. Even though four spiral polishing features are shown, less or more numbers of spiral polishing features 1402f may be arranged in similar manner. The spiral polishing features 1402f define spiral channels. In one embodiment, each of the spiral polishing features 1402f has a constant width. In one embodiment, the spiral channels also have a constant width. During polishing, the polishing pad may rotate about a central axis in a direction opposite to the direction of the spiral polishing features 1402f to retain polishing slurry in the spiral channels. For example, in FIG. 14F, the spiral polishing features 1402f and the spiral channels are formed in a counter-clockwise direction, and thus during polishing the polishing pad may be rotated clockwise to retain polishing slurry in the spiral channels and on the polishing pad. In some configurations, each of the spiral channels is continuous from the center of the polishing pad to the edge of the polishing pad. This continuous spiral channels allow polishing slurry along with any polishing waste to flow from the center of the polishing pad to the edge of the polishing pad. In one embodiment, the polishing pad may be cleaned by rotating the polishing pad in the same direction as the spiral polishing features 1402f (e.g., counter-clockwise in FIG. 14F).

FIG. 14G is a schematic pixel chart of a polishing pad design 1400g having segmented polishing features 1402g arranged in a spiral pattern on base features 1404g. The polishing pad in FIG. 14G is similar to the polishing pad in FIG. 14F except that the spiral polishing features 1402g are segmented. In one embodiment, the segmented polishing features 1402g are substantially the same length. The segmented polishing features 1402g may be equally distributed along each spiral polishing feature. In some embodiments, the segmented polishing features 1402g may each substantially have an identical length in the spiral direction.

FIG. 14H is a schematic pixel chart of a polishing pad design 1400h having segmented polishing features 1402h arranged in a spiral pattern on base features 1404h. The polishing pad in FIG. 14H is similar to the polishing pad in FIG. 14G except that the segmented polishing features 1402h vary in length. In one embodiment, the lengths of the segmented polishing features 1402h increase from a center of the polishing pad to an edge region of the polishing pad.

FIG. 14I is a schematic pixel chart of a polishing pad design 1400i having segmented polishing features 1402i arranged in a spiral pattern on base features 1404i. The polishing pad in FIG. 14I is similar to the polishing pad in FIG. 14G except that radial pitch of the segmented polishing features 1402i varies. In one embodiment, the radial pitch of the segmented polishing features 1402i decreases from a center of the polishing pad to an edge region of the polishing pad.

FIG. 14J is a schematic pixel chart of a polishing pad design 1400j having segmented polishing features 1402j arranged in a spiral pattern on base features 1404j. The polishing pad in FIG. 14J is similar to the polishing pad in FIG. 14I except that radial pitch of the segmented polishing features 1402j increases from a center of the polishing pad to an edge region of the polishing pad.

FIG. 14K is a schematic pixel chart of a polishing pad design 1400k having a plurality of discrete polishing features 1402k formed in base features 1404k. In one embodiment, each of the plurality of polishing features 1402k may be a cylindrical post. In one embodiment, the plurality of polishing features 1402k may have the same dimension in the plane of the polishing surface. In one embodiment, the plurality of cylindrical polishing features 1402k may be arranged in concentric circles. In one embodiment, the plurality of cylindrical polishing features 1402k may be arranged in a regular 2D pattern relative to the plane of the polishing surface.

FIG. 14L is a schematic pixel chart of a polishing pad design 1400l having a plurality of discrete polishing features 1402l formed over base features 1404l. The polishing pad of FIG. 14L is similar to the polishing pad of FIG. 14K except that each of the discrete polishing features 1402l in FIG. 14L may be hollow cylindrical post, or have a depression relative to the polishing surface, formed therein. The hollow cylindrical posts allow some polishing slurry to be retained therein.

FIG. 14M is a schematic pixel chart of a polishing pad design 1400m having a plurality of discrete polishing features 1402m formed over base features 1404m. The polishing pad of FIG. 14M is similar to the polishing pad of FIG. 14K except that some polishing features 1402m in FIG. 14M may be connected to form one or more closed circles. The one or more closed circles may create one or more damns to retain polishing slurry during polishing.

FIG. 14N is a schematic pixel chart of a polishing pad design 1400n having a plurality of discrete polishing features 1402n formed in base features 1404n. The polishing pad of FIG. 14N is similar to the polishing pad of FIG. 14M except that some polishing features 1402n in FIG. 14N may be connected to form one or more spiral chains. The one or more spiral chains may guide the fluid flow of the polishing slurry to assist polishing slurry retention and polishing pad cleaning.

FIG. 14O is a schematic pixel chart of a polishing pad design 1400o having a plurality of discrete polishing features 1402o and base features 1404o. The polishing pad of FIG. 14O is similar to the polishing pad of FIG. 14K except that each of the discrete polishing features 1402o in FIG. 14O is in the shape of the logo of Applied Materials, Inc. FIG. 14O demonstrates that embodiments of the present disclosure encompass polishing pads having polishing features with any suitable design, pattern and/or arrangement.

The polishing features 1402a-1402o in the designs of FIGS. 14A-14O may be formed from identical material or identical composition of materials. Alternatively, the material composition and/or material properties of the polishing features 1402a-1402o in the designs of FIG. 14A-14O may vary from polishing feature to polishing feature. Individualized material composition and/or material properties allows polishing pads to be tailored for specific needs.

When polishing features are formed from two different 3D printing materials, the polishing feature may be manufactured by printing at least two superimposed images using two print heads. FIGS. 15A-15B to FIGS. 18A-18B provide examples of the designs for polishing pads with composite polishing features. In FIGS. 15-18, the white pixels marks are where a droplet of material is dispensed while the black pixels mark where no material is dispensed within one or more layers used to form a polishing pad. By use of these techniques, gradients in material composition can be formed in one or more of the printed layers used to form at least part of a complete polishing pad. The tailored composition of one or more of the printed layers within a polishing pad can be used to adjust and tailor the overall mechanical properties of the polishing pad.

By use of these techniques, in some embodiments, it is desirable to form a gradient in material composition in a direction normal to the polishing surface of the polishing pad (e.g., direction normal to illustrations shown in FIGS. 15-18) or in the plane of the polishing surface of the polishing pad (e.g., radial direction). In one embodiment, it is desirable to form a gradient in the material composition in the hard and/or elastic features, which are discussed above, in a direction normal to the polishing surface of the polishing pad. In one example, it is desirable to have higher concentrations of a material used to form the elastic features in the printed layers near the base of the polishing pad (e.g., opposite to the polishing surface), and higher concentrations of a material used to form the hard features in the printed layers near the polishing surface of the polishing pad. In another example, it is desirable to have higher concentrations of a material used to form the hard features in the printed layers near the base of the polishing pad, and a higher concentration of a material used to form the elastic features in the printed layers near the polishing surface of the polishing pad.

Gradients in the material composition and/or material properties of the stacked 3D printed layers can vary from a high concentration to a low concentration in one direction, or vice versa. In some cases, one or more regions with polishing pad may include more complex concentration gradients, such as a high/low/high or low/high/low concentration gradient. In one configuration, a gradient in concentration can be formed by varying the position and/or amount of a first printed component to a second printed component in each successive layer of a formed polishing pad. For example, a first layer may have a ratio of the first printed component to the second printed component of 1:1, a ratio of the first printed component to the second printed component of 2:1 in a second layer and a ratio of the first printed component to the second printed component of 3:1 in a third layer. A gradient can also be formed within different parts of a single layer by adjusting the placement of the printed droplets within the plane of the deposited layer.

Figure 15B:
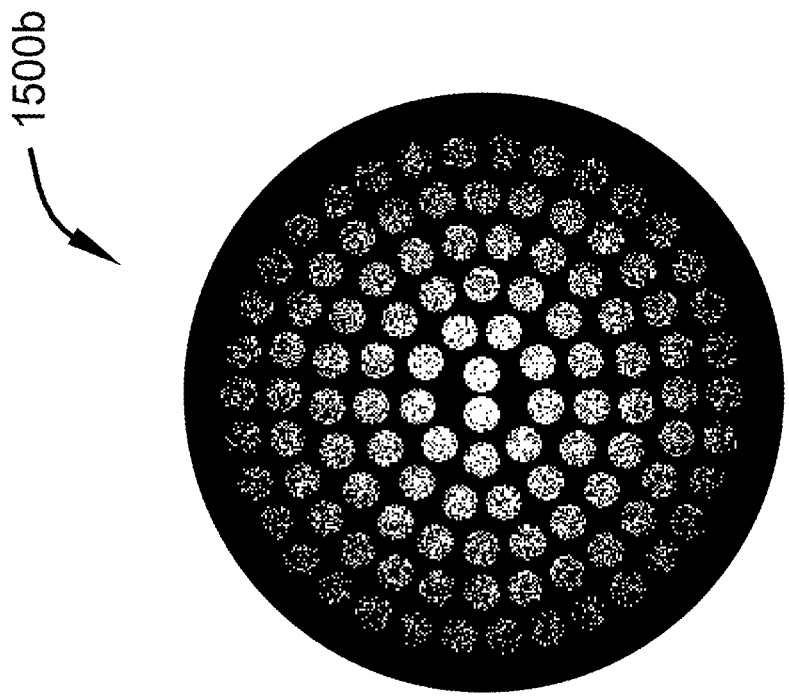
FIGS. 15A and 15B are schematic views of a polishing pad having composite features, according to at least one embodiment of the present disclosure.
Figure 15A:
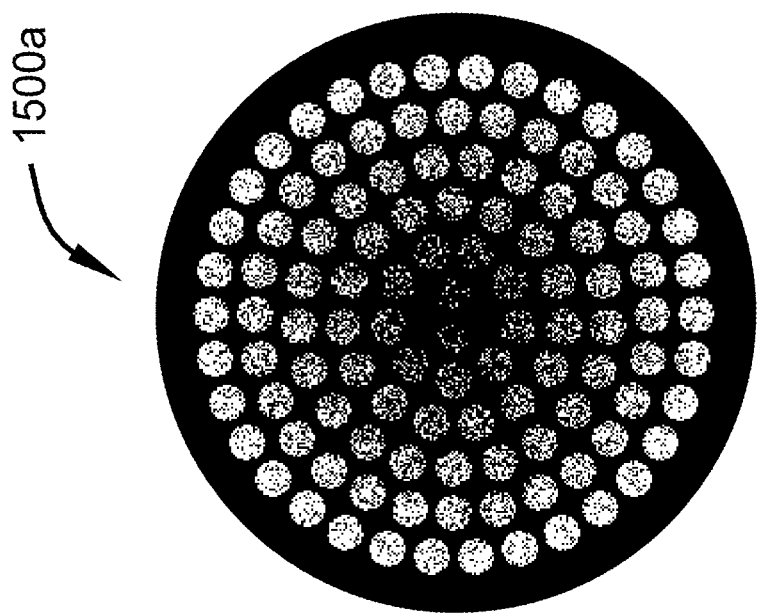

FIGS. 15A and 15B are black and white bitmap images reflecting pixel charts of a polishing pad having composite features. In FIGS. 15A, 15B, the white pixels mark are where a droplet of material is dispensed while the black pixels mark where no material is dispensed. FIG. 15A is the pixel chart 1500a of a first material for a polishing pad and FIG. 15B is the pixel chart 1500b of a second material for the same polishing pad. The first material may be dispensed by a first print head according to the pixel chart 1500a and the second material may be dispensed by a second print head according to the pixel chart 1500b. The two print heads superimpose the pixel charts 1500a, 1500b together to form a plurality of discrete polishing features. The polishing features near an edge region of the polishing pad include more of the first material than the second material. The polishing features near a center region of the polishing pad include more of the second material than the first material. In this example, each polishing feature has a unique composition of the first material and the second material.

Figure 16B:
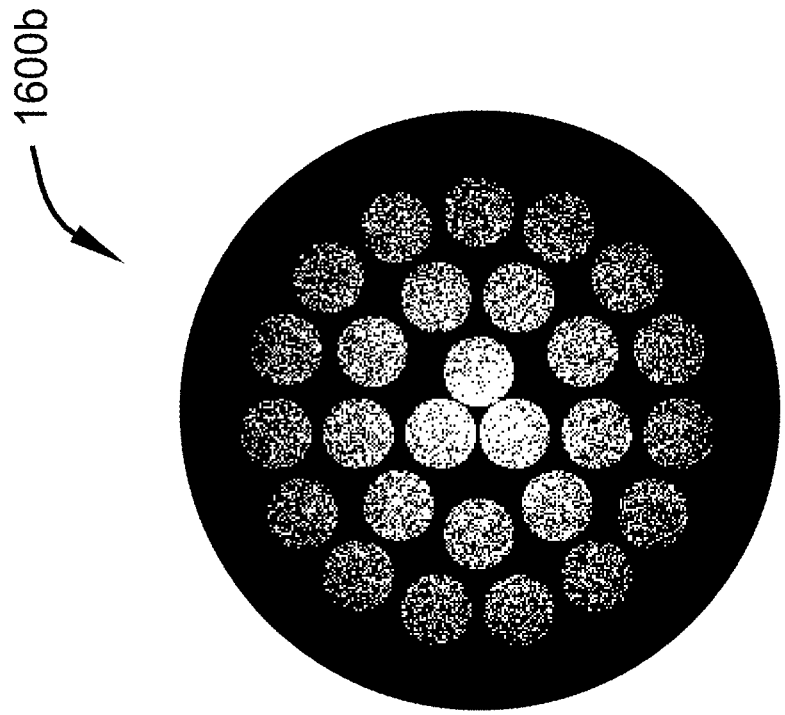
FIGS. 16A and 16B are schematic views of a polishing pad having composite features, according to at least one embodiment of the present disclosure.
Figure 16A:
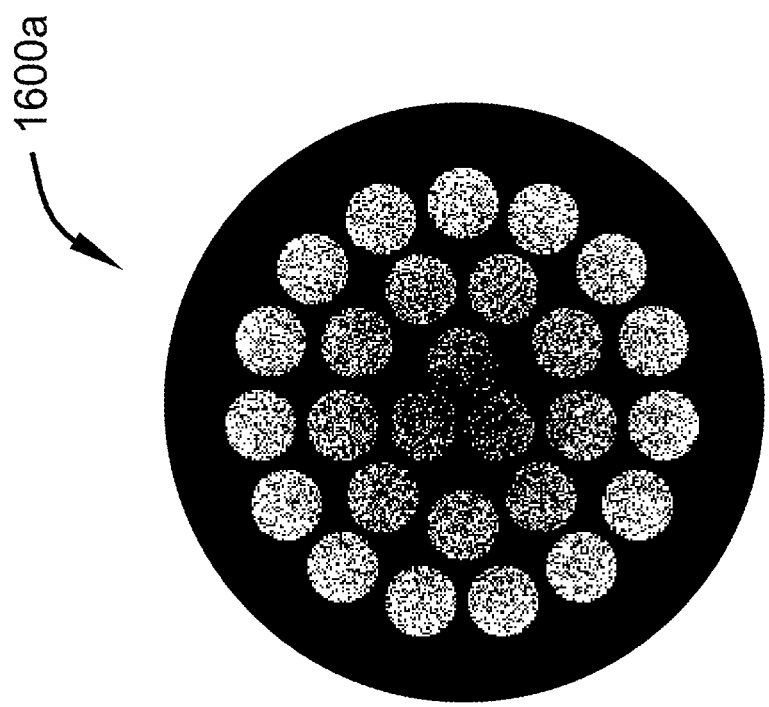

FIGS. 16A and 16B are schematic pixel charts 1600a, 1600b of a polishing pad having composite features. FIG. 16A is the pixel chart 1600a of a first material for a polishing pad and FIG. 16B is the pixel chart 1600b of a second material for the same polishing pad. The polishing pad according to FIGS. 16A, 16B is similar to the polishing pad of FIGS. 15A, 15B except that the polishing features are larger in FIGS. 16A, 16B.

Figure 17B:
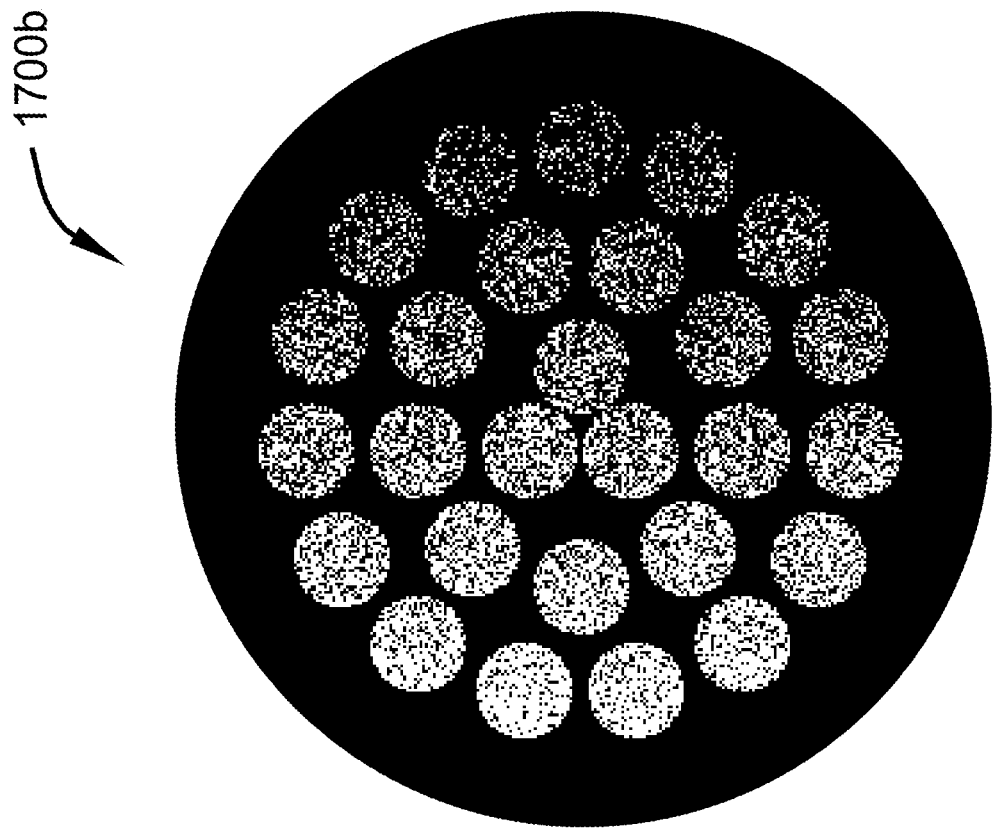
FIGS. 17A and 17B are schematic views of a polishing pad having composite features, according to at least one embodiment of the present disclosure.
Figure 17A:
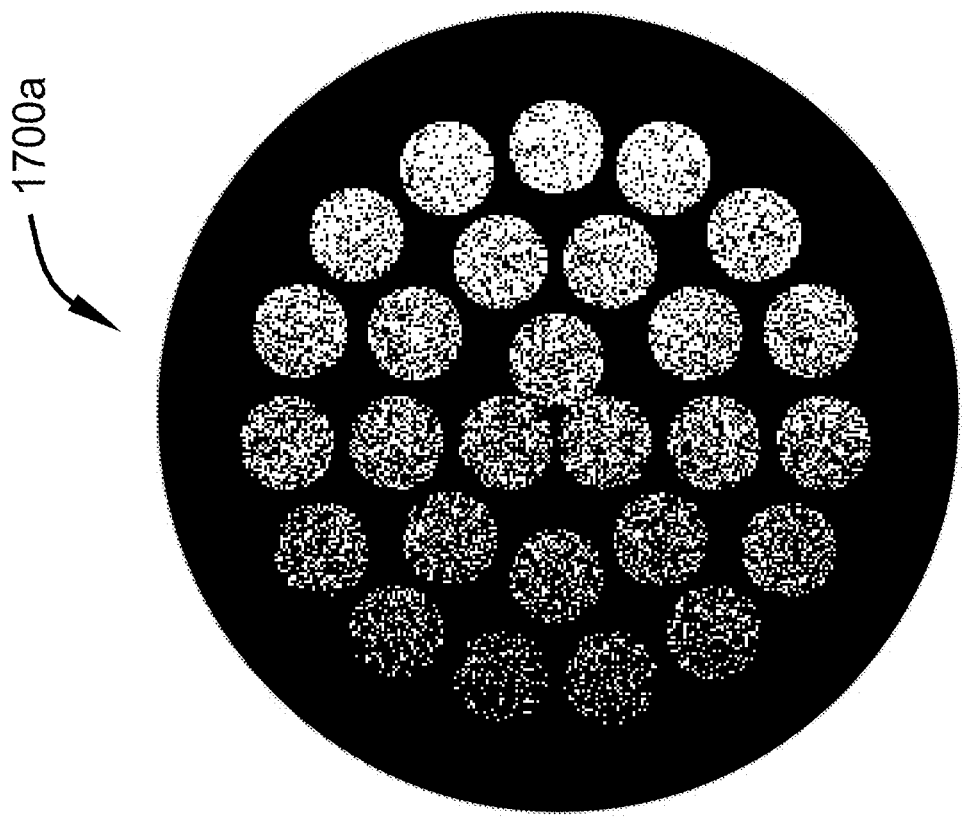

FIGS. 17A and 17B are schematic pixel charts 1700a, 1700b of a polishing pad having composite features. FIG. 17A is the pixel chart 1700a of a first material for a polishing pad and FIG. 17B is the pixel chart 1700b of a second material for the same polishing pad. The polishing pad according to FIGS. 17A, 17B is similar to the polishing pad of FIGS. 15A, 15B except the composition of the polishing features varies from left to right across the polishing pad.

Figure 18B:
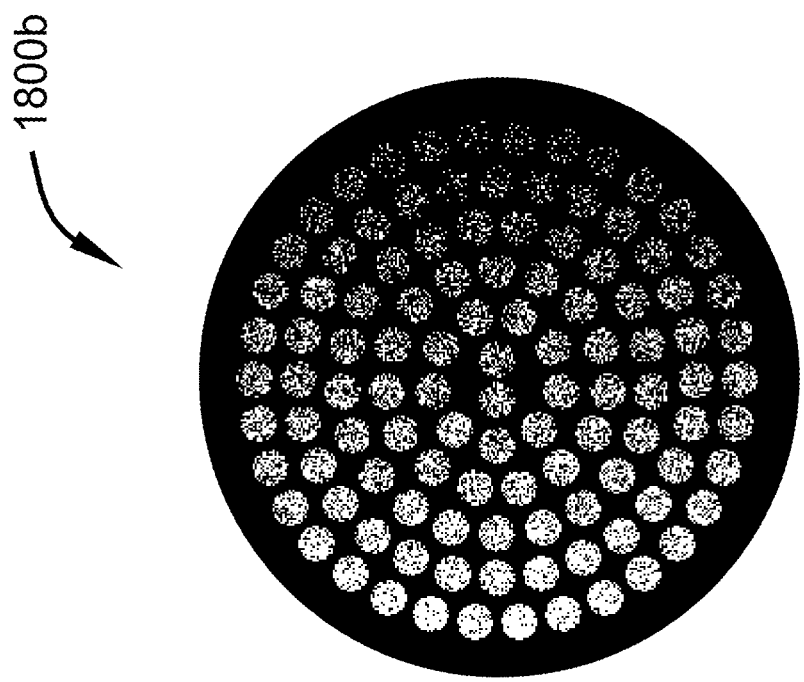
FIGS. 18A and 18B are schematic views of a polishing pad having composite features, according to at least one embodiment of the present disclosure.
Figure 18A:
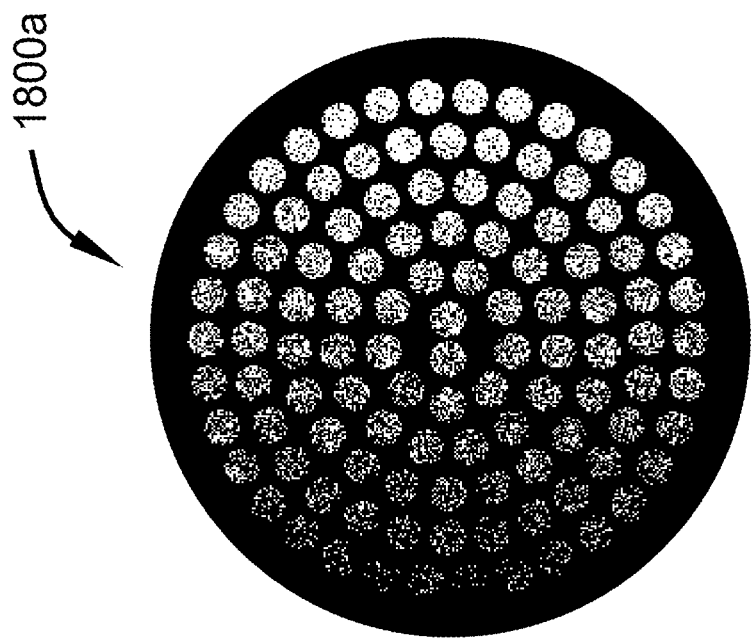

FIGS. 18A and 18B are schematic pixel charts 1800a, 1800b of a polishing pad having composite features. FIG. 18A is the pixel chart 1800a of a first material for a polishing pad and FIG. 18B is the pixel chart 1800b of a second material for the same polishing pad. The polishing pad according to FIGS. 18A, 18B is similar to the polishing pad of FIGS. 17A, 17B except the polishing features are larger in FIGS. 18A, 18B.

It should be noted that the composition of polishing features may vary in any suitable pattern. Although polishing pads described above are shown to be formed from two kinds of materials, composite polishing pads including three or more kinds of features are within the scope of the present disclosure.

It should be noted that compositions of the polishing features in any designs of the polishing pad, such as the polishing pads in FIGS. 14A-14O, may be varied in similar manner as the polishing pads in FIGS. 15-18.

Additive Manufacturing and Curing Techniques

Figure 19:
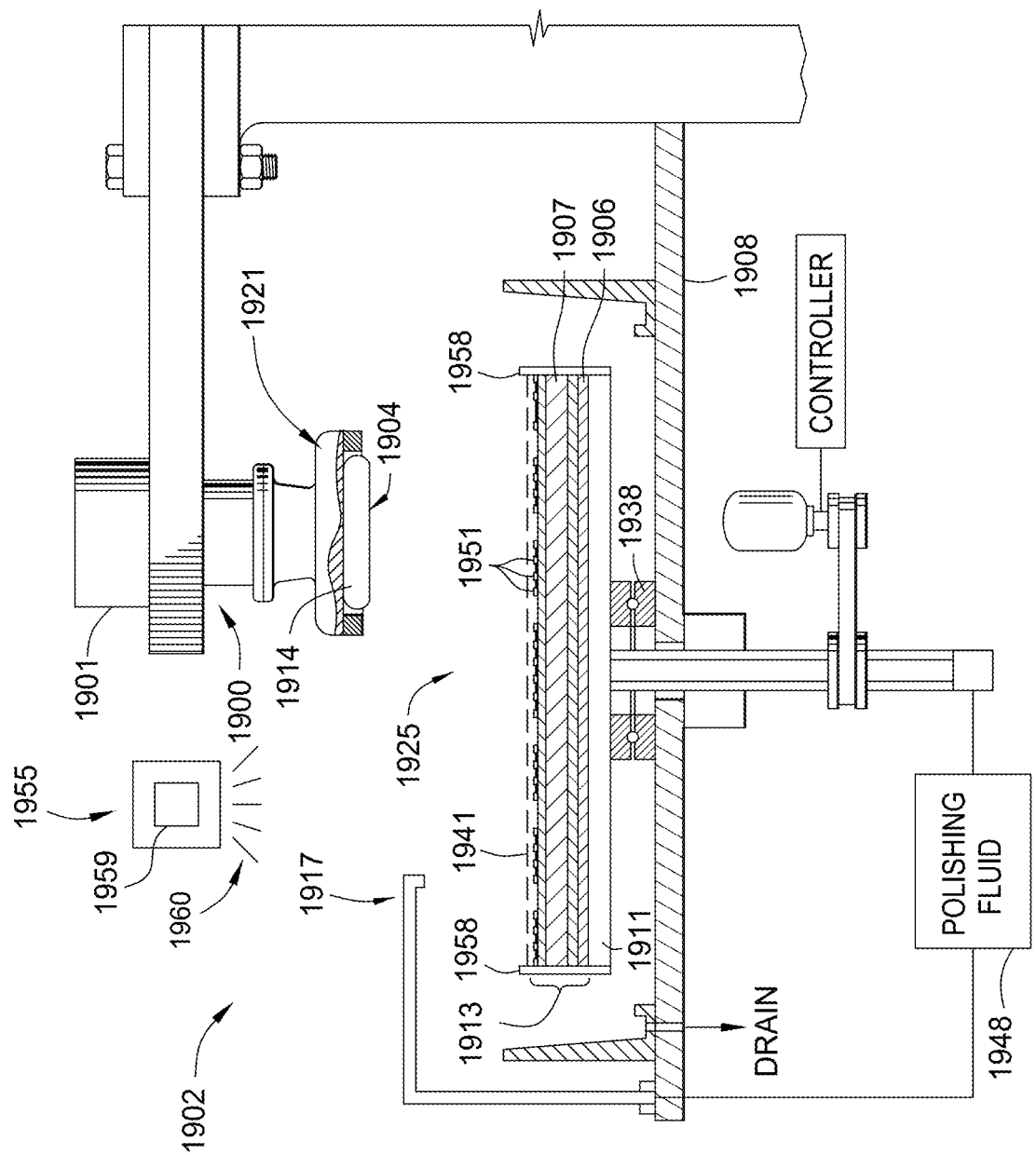
FIG. 19 is a schematic sectional view of a polishing station according to an embodiment of the present disclosure.

FIG. 19 depicts a sectional view of an exemplary CMP station 1902 having a carrier head assembly 1900 positioned over a platen assembly 1911. The carrier head assembly 1900 generally comprises a drive system 1901 coupled to a carrier head 1921. The drive system 1901 may be coupled to a controller (not shown) that provides a signal to the drive system 1901 for controlling the rotational speed and direction of the carrier head 1921. The drive system 1901 generally provides at least rotational motion to the carrier head 1921 and additionally may be actuated toward the platen assembly 1911 such that a feature 1904 side of the substrate 1914, retained in the carrier head 1921, may be disposed against a 1925 processing surface of a pad assembly 1913 of the CMP station 1902 during processing. Typically, the substrate 1914 and processing pad assembly 1913 are rotated relative to one another to remove material from the feature side 1904 of the substrate 1914. Depending on process parameters, the carrier head 1921 is rotated at a rotational speed greater than, less than, or equal to, the rotational speed of the platen assembly 1911. The carrier head assembly 1900 is also capable of remaining fixed and may move in a path during processing. The carrier head assembly 1900 may also provide an orbital or a sweeping motion across the processing surface 1925 of the pad assembly 1913 during processing. The pad assembly 1913 may be adapted to releasably couple to an upper surface of the platen assembly 1911 using an adhesive layer 1906. The pad assembly 1913 generally includes the processing surface 1925, the adhesive layer 1906, and may include an optional backing layer 1907.

The platen assembly 1911 is rotationally disposed on a base 1908 and is typically supported above the base 1908 by a bearing 1938 so that the platen assembly 1911 may be rotated relative to the base 1908. The platen assembly 1911 may be fabricated from a rigid material, such as a metal or rigid plastic, and in one embodiment the platen assembly 1911 has an upper surface that is fabricated from or coated with a dielectric material, such as CPVC. The platen assembly 1911 may have a circular, rectangular or other plane form.

A polishing fluid may be provided from a polishing fluid source 1948, through appropriate plumbing and controls to nozzle a 1917 positioned above the processing pad assembly 1913 of the CMP station 1902. In the embodiment shown in FIG. 19, a polishing fluid 1941 is provided from the nozzle 1917. The polishing fluid 1941 may be contained by a platen lip 1958. The polishing fluid 1941 may be deionized water (DIW) or other polishing fluid consisting primarily of water (e.g., DIW), or a slurry having abrasive particles entrained in DIW.

The processing surface 1925 of the pad assembly 1913 may further include a patterned surface 1951 formed on the upper surface thereof to facilitate polishing of the substrate 1914. Patterns of the patterned surface 1951 may include a plurality of small protrusions extending above the processing surface 1925. The protrusions may take any geometrical form, such as ovals, circles, rectangles, hexagons, octagons, triangles, or combinations thereof and may be formed by a three-dimensional printing process as described herein. The patterned surface 1951 may be maintained and/or refreshed using a conditioning device 1955 positioned to interact with the processing surface 1925 of the pad assembly 1913. In one embodiment, the conditioning device 1955 comprises an electromagnetic energy source 1959. The electromagnetic energy source 1959 is a laser in one embodiment, and is utilized to emit one or more beams 1960 of electromagnetic energy toward the processing surface 1925. The one or more beams 1960 of electromagnetic energy are utilized to selectively heat and/or ablate multiple regions of the processing surface 1925 in order to refresh or maintain the patterned surface 1951 thereon. In some embodiments, the electromagnetic energy source 1959 may be utilized to tune the processing surface 1925 of the pad assembly 1913 by selectively heating discrete regions of the processing surface 1925.

Figure 20A:
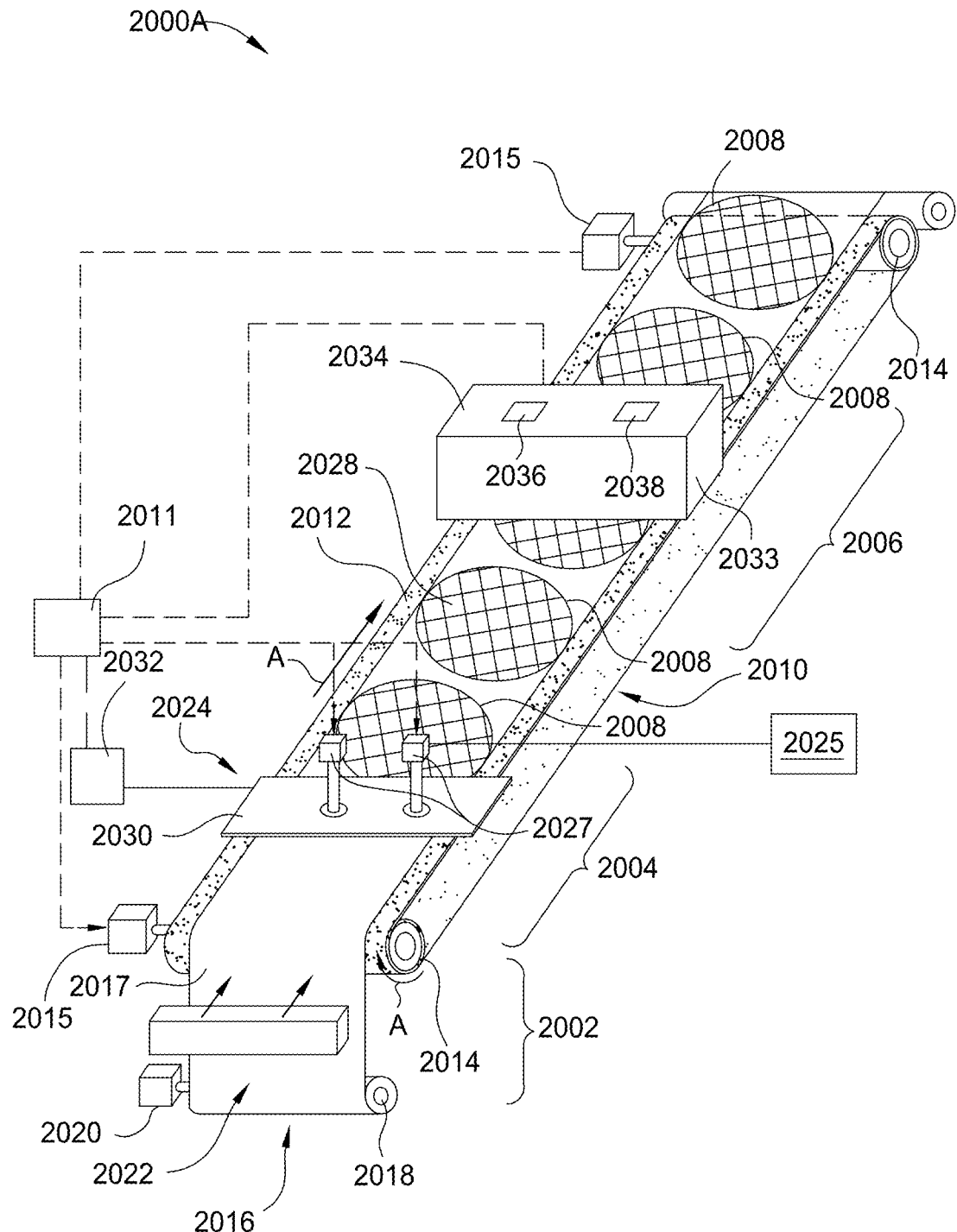
FIG. 20A is a schematic perspective view of a polishing pad manufacturing system according to an embodiment of the present disclosure.

FIG. 20A is a schematic isometric view of one embodiment of a pad manufacturing system 2000A for preparing a pad assembly that may be used on a platen assembly, for example the pad assembly 1913 used in the platen assembly 1911 of FIG. 19. In one embodiment, the pad manufacturing system 2000A generally includes a feed section 2002, a print section 2004 and a curing section 2006. The pad manufacturing system 2000A is utilized to produce a plurality of printed pads 2008 that may be used as the pad assembly 1913 in the platen assembly 1911 of FIG. 19. While not shown, the pad manufacturing system 2000A may also be modified to print a pad for use in a roll-to-roll polishing system.

The pad manufacturing system 2000A also includes a conveyor 2010 including a web 2012 disposed between at least two rollers 2014. One or both of the rollers 2014 may be coupled to a drive motor 2015 that rotates the rollers 2014 and/or the web 2012 in the direction depicted by the arrow indicated at A. The feed section 2002, the print section 2004 and the curing section 2006 may be operably coupled to a controller 2011. The conveyor 2010 may be operated to move continuously or intermittently by the controller 2011.

The feed section 2002 may include a supply roll 2016 that is operably coupled to the conveyor 2010. The supply roll 2016 may be a backing material 2017, such a polymeric material, for example, a biaxially-oriented polyethylene terephthalate (BoPET) material. The supply roll 2016 may be disposed on a feed roller 2018 that is driven or controlled by a motion control device 2020. The motion control device 2020 may be a motor and/or include a brake system that provides a predetermined tension on the supply roll 2016 such that the unwinding speed of the supply roll 2016 is driven by the drive motor 2015 and/or the web 2012. The feed section 2002 may also include a pretreatment device 2022. The pretreatment device 2022 may be configured to spray or otherwise provide a coating onto the backing material 2017 prior to printing at the print section 2004. In some embodiments, the pretreatment device 2022 may be utilized to heat the backing material 2017 prior to printing at the print section 2004.

The print section 2004 includes a 3D printing station 2024 disposed downstream of the feed section 2002. The print section 2004 utilizes one or more print heads 2027 to provide a patterned surface 2028 onto the backing material 2017. The print section 2004 may include a movable platform 2030 that is coupled to a motion control device 2032 that may be utilized to move the print heads 2027 relative to the backing material 2017 and the web 2012.

The print heads 2027 may be coupled to a material source 2025 having print materials that may be used to form the patterned surface 2028. Print materials may include polymeric materials such as polyurethanes, polycarbonates, fluoropolymers, PTFE, PTFA, polyphenylene sulfide (PPS), or combinations thereof. Examples also include polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes and combinations thereof, or any of the other materials described above.

In one embodiment, a polymeric material may be deposited as a base material on the backing material 2017. The polymeric material formed may comprise an open-pored or closed-pored polyurethane material, and may include nanoscale particles interspersed therein. The particles may include organic nanoparticles. In one embodiment, the nanoparticles may include molecular or elemental rings and/or nanostructures. Examples include allotropes of carbon (C), such as carbon nanotubes and other structures, molecular carbon rings having 5 bonds (pentagonal), 6 bonds (hexagonal), or more than 6 bonds. Other examples include fullerene-like supramolecules. In another embodiment, the nano-scale particles may be a ceramic material, alumina, glass (e.g., silicon dioxide ($SiO_2$)), and combinations or derivatives thereof. In another embodiment, the nano-scale particles may include metal oxides, such as titanium (IV) oxide or titanium dioxide ($TiO_2$), zirconium (IV) oxide or zirconium dioxide ($ZrO_2$), combinations thereof and derivatives thereof, among other oxides.

The patterned surface 2028 formed by the print heads 2027 may comprise a composite base material, such as a polymeric matrix, which may be formed from urethanes, melamines, polyesters, polysulfones, polyvinyl acetates, fluorinated hydrocarbons, and the like, and mixtures, copolymers and grafts thereof. In one embodiment, the polymeric matrix comprises a urethane polymer that may be formed from a polyether-based liquid urethane. The liquid urethane may be reactive with a polyfunctional amine, diamine, triamine or polyfunctional hydroxyl compound or mixed functionality compounds, such as hydroxyl/amines in urethane/urea cross-linked compositions that form urea links and a cross-linked polymer network when cured.

The curing section 2006 includes a curing device 2033 that may be disposed in or on a housing 2034. The housing 2034 is disposed over the web 2012 such that the web 2012 and the patterned surface 2028 on the backing material 2017 may pass thereunder. The curing device 2033 may be a thermal oven, an ultraviolet (UV) light emitter, or combinations thereof. In one embodiment, the curing device 2033 may include one or both of a laser source 2036 and an electron beam emitter 2038 that may be used to cure the material deposited by the print heads 2027 forming the patterned surface 2028. In some embodiments, when the electron beam emitter is utilized, the pad manufacturing system 2000A may be positioned in an enclosure where the pressure can be controlled. The laser source 2036 and the electron beam emitter 2038 may be utilized alone or in combination with the thermal or UV energy. In some embodiments, the laser source 2036 and the electron beam emitter 2038 may be used in a spot curing process where specific portions of the patterned surface 2028 are targeted. The spot targeting by the laser source 2036 or the electron beam emitter 2038 may heat discrete regions of the patterned surface 2028 to create a surface of the discrete regions that may be harder or less compressible than the surrounding portions. The laser source 2036 may also be used to ablate portions of the patterned surface 2028 to create a fine texture thereon.

FIG. 2000B is a schematic side view of another embodiment of a pad manufacturing system 2000B. The pad manufacturing system 2000B includes the conveyor 2010 having the feed section 2002, the print section 2004 and the curing section 2006 that may be similar to the pad manufacturing system 2000A of FIG. 20A. The pad manufacturing system 2000B may also include a wind-up section 2009 for use in manufacturing a polishing article 2029 for use in a roll-to-roll system. The wind-up section 2009 includes a take-up roll 2040 where the polishing article 2029 having the patterned surface 2028 printed thereon may be wound. The take-up roll 2040 may be removed from the pad manufacturing system 2000A to be utilized as the supply roll 2018 in the roll-to-roll platen assembly. During manufacturing, the take-up roll 2040 may be coupled to a motion control device 2042. The motion control device 2042 may be a motor and/or include a brake system that controls the winding speed of the take-up roll 2040. In some embodiments, the pad manufacturing system 2000B is utilized to print a plurality of printed pads 2008 (shown in FIG. 20A) that may be used as the pad assembly 1913 in the platen assembly 1911 of FIG. 19.

The pad manufacturing system 2000B includes a supply roll 2016 that controllably unwinds a web 2012 that moves over the conveyor 2010 to the take-up roll 2040. The web 2012 may be a backing material similar to the backing material 2017 described in FIG. 20A. Motion of the web 2012 as well as the conveyor 2010 and the take-up roll 2040 may be controlled by motion control devices and a controller similar to the pad manufacturing system 2000A described in FIG. 20A and the description is omitted in FIG. 20B for the sake of brevity.

The pad manufacturing system 2000B includes an optional pretreatment section 2044 positioned between the feed section 2002 and the print section 2004. The pretreatment section 2044 may be used to form an adhesive or release layer onto the web 2012. Alternatively, an adhesive or release layer may be formed at the print section 2004 using the 3D printing station 2024. When the pretreatment section 2044 is used, a slot/die coater 2046 may be used to deposit a layer or layers onto the web 2012. Additionally, a curing station 2048, utilizing UV light or heating elements, may be used to cure material deposited by the slot/die coater 2046.

In this embodiment, the 3D printing station 2024 comprises an array of print heads 2026. The print heads 2026 may be used to optionally form an adhesive or release layer on the web 2012 as well as to form the patterned surface 2028 on the web 2012. In one example, multiple rows and columns of print heads 2027 may span the width of the conveyor 2010 and a portion of the length of the conveyor 2010. In some embodiments, one or more of the print heads 2026 may be movable relative to the conveyor 2010. The print heads 2026 would be coupled to the material source 2025 as described in FIG. 20A.

The curing section 2006 may include one or both of an optional electromagnetic energy source 2050 and a thermal curing device 2052. The electromagnetic energy source 2050 may be one or a combination of a laser source or an electron beam emitter as described in FIG. 20A. The thermal curing device 2052 may be an oven or a UV light array.

The pad wind-up section 2009 includes the take-up roll 2040 where the polishing article 2028 may be wound. The take-up roll 2040 may be removed from the pad manufacturing system 2000A to be utilized as the supply roll in a roll-to-roll platen assembly.

Figure 20B:
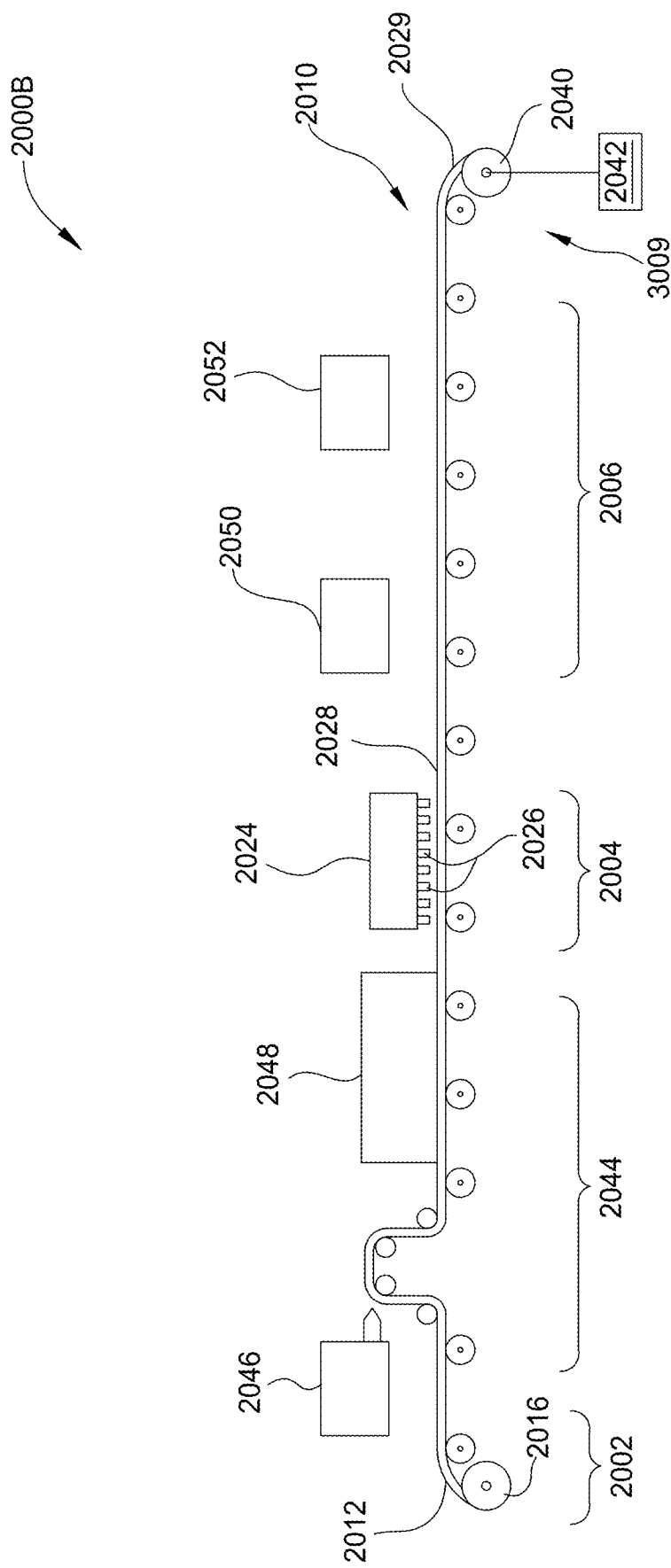
FIG. 20B is a schematic view of a polishing pad manufacturing system according to another embodiment of the present disclosure.
Figure 21A:
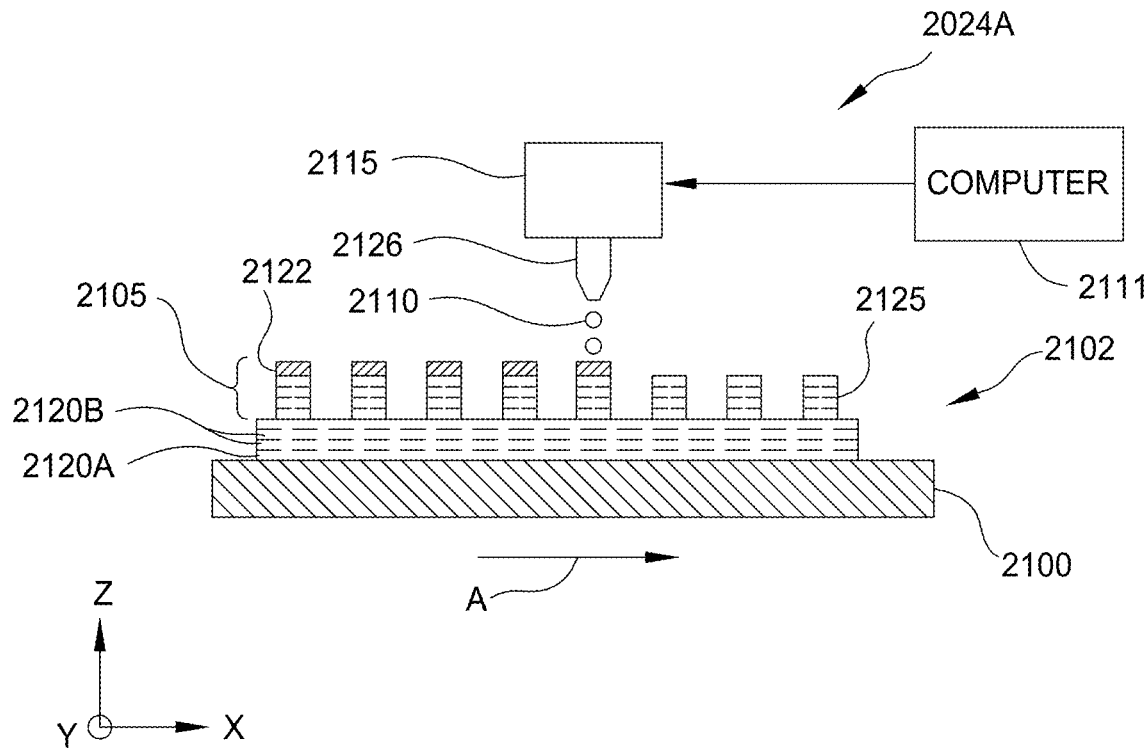
FIG. 21A is a schematic view of a 3D printing station according to an embodiment of the present disclosure.

FIG. 21A is a schematic cross-sectional view of one embodiment of a 3D printing station 2024A that may be used in the pad manufacturing system 2000A of FIG. 20A or the pad manufacturing system 2000B of FIG. 20B. FIG. 21A shows a portion of one embodiment of a polishing pad 2102 manufactured using a 3D printing process. The polishing pad 2102 may be the pad assembly 1913 described in FIG. 19, the printed pad 2008 (shown in FIG. 20A) or the polishing article 2029 (shown in FIG. 20B). 3D printing offers a convenient and highly controllable process for producing polishing articles with abrasives embedded in specific locations within the polishing layer. The polishing pad 2102 may be printed on a support 2100, which may be the backing material 2017 of FIG. 20A or the web 2012 of FIG. 20B.

Referring to FIG. 21A, at least a polishing layer 2105 of the polishing pad 2102 is manufactured using a 3D printing process. In the manufacturing process, thin layers of material are progressively deposited and fused on the support 2100 while the support is moved along the arrow indicated by A (in the X direction). For example, droplets 2110 of pad precursor material (from the material source 2025 of FIG. 20A) can be ejected from a nozzle 2126 of a droplet ejecting printer 2115 to form a plurality of layers 2120A, 2120B and 2122. The layers may form a solidified material 2125 comprising the pad precursor material enabling sequential deposition of other layers thereon. The droplet ejecting printer 2115 may be similar to an inkjet printer, but uses the pad precursor material rather than ink. The nozzle 2126 may be translated in one or both of the X and the Y direction while the support 2100 is continuously or intermittently moved in the X direction during manufacturing.

In one example, a first layer 2120A may be deposited by ejection of droplets 2110 onto the support 2100. Subsequent layers, such as layers 2120B and 2122 (other layers therebetween are not called out for the sake of brevity), can be deposited on the first layer 2120A after solidification. After each layer is solidified, a new layer is then deposited over the previously deposited layer until the full 3-dimensional polishing layer 2105 is fabricated. Solidification can be accomplished by polymerization. For example, the layers of pad precursor material can be a monomer, and the monomer can be polymerized in-situ by UV curing or thermally. The pad precursor material can be cured effectively immediately upon deposition, or an entire layer of pad precursor material can be deposited and then all the deposited layers can be cured simultaneously.

Each layer may be applied by the nozzle 2126 in a pattern stored in a 3D drawing computer program that is provided on a controller 2111. Each layer 2120A, 2120B and 2122 may be less than 50% or less than the total thickness of the polishing layer 2105. In one example, each layer 2120A, 2120B and 2122 may be less than 10% of the total thickness of the polishing layer 2105, for example less than 5%, such as about less than 1% of the total thickness of the polishing layer 2105. In one embodiment, the thickness of each layer may include a thickness of about 30 microns to about 60 microns or less, such as on the order of nanometers (e.g., 1 to 100 nanometers), and even to picoscale dimensions (e.g., ($10^{-12}$ meters).

The support 2100 can be a rigid base, or a flexible film, such as a layer of polytetrafluoroethylene (PTFE). If the support 2100 is a film, then the support 2100 can optionally form a portion of the polishing pad 2102. For example, the support 2100 can be the backing layer 2017 or a layer between the backing layer 2017 and the polishing layer 2105. Alternatively, the polishing layer 2105 can be removed from the support 2100 and the layers 2120A and 2120B may form the backing layer 2017.

In some embodiments, abrasive particles may be dispersed in the droplets 2110 of pad precursor material. The abrasive particles may be locally dispensed into polishing layer 2105 during formation of each of the layers. Local dispensing of the abrasive particles may assist in minimization of agglomeration. In some embodiments, abrasive particles can be premixed with a liquid thermoset polymer precursor. Continuous agitation of the mixture of the thermoset polymer precursor and the abrasive particles prevents agglomeration of the particles, similar to apparatus used to homogenize ink pigments used in ink jet printers. In addition, the continuous agitation of the mixture ensures fairly uniform distribution of the abrasive particles in the precursor material. This can result in a more uniform distribution of particles through the polishing layer, which can lead to improved polishing uniformity and can also help avoid agglomeration.

The premixed mixture may be dispensed from a single nozzle (e.g., the nozzle 2126) according to a particular pattern. For example, the premixed mixture can be uniformly dispensed to produce a homogeneous polishing layer 2105 having a uniform distribution of embedded abrasive particles throughout the thickness of the polishing layer 2105.

Figure 21B:
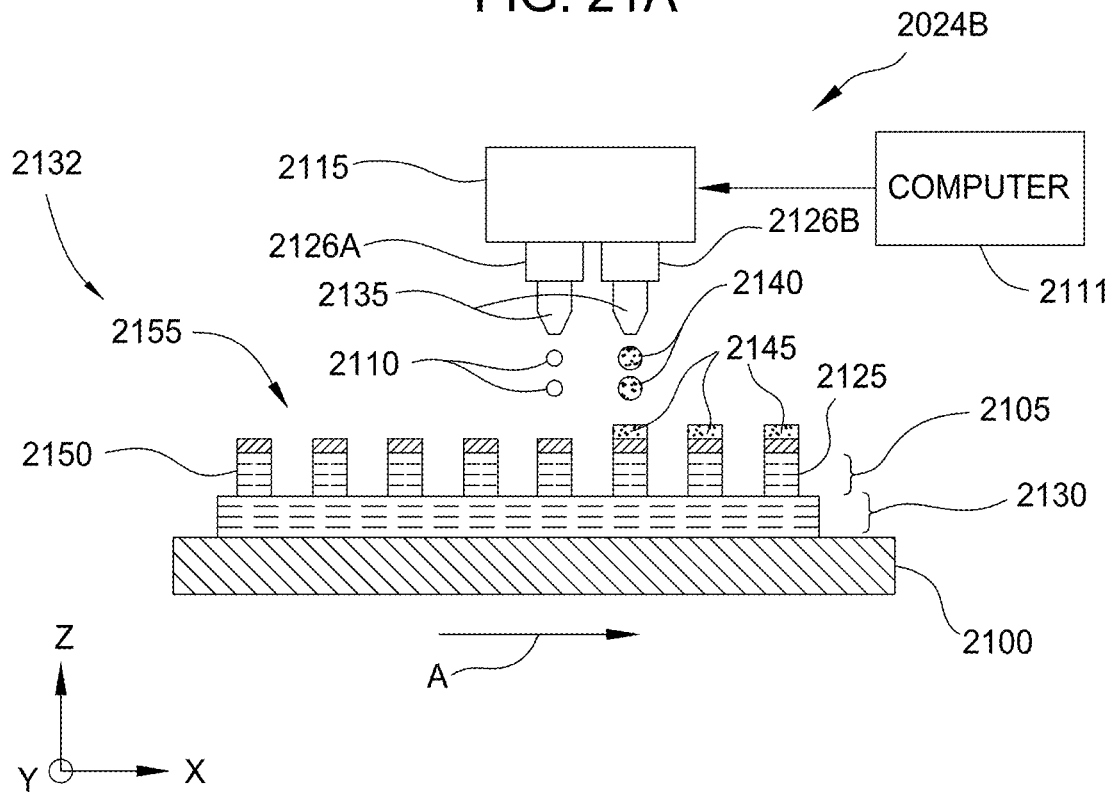
FIG. 21B is a schematic view of a 3D printing station according to another embodiment of the present disclosure.

FIG. 21B is a schematic cross-sectional view of one embodiment of a 3D printing station 2024B that may be used in the pad manufacturing system 2000A of FIG. 20A or the pad manufacturing system 2000B of FIG. 20B. FIG. 21B shows a cross-sectional view of a portion of another embodiment of a polishing pad 2132 manufactured using a 3D printing process. The polishing pad 2132 may be the pad assembly 1913 described in FIG. 19, the printed pad 2008 (shown in FIG. 20A) or the polishing article 2029 (shown in FIG. 20B).

As shown in FIG. 21B, the polishing pad 2132 is formed by the droplet ejecting printer 2115 to include a plurality of structures 2150 separated by grooves 2155 based on instructions from a CAD program. The structures 2150 and grooves 2155 may form the polishing layer 2105. A sublayer 2130 may also be formed with the polishing article by the droplet ejecting printer 2115. The sublayer 2130 may be the backing layer 2017 (shown in FIG. 20A). For example, the sublayer 2130 and the polishing layer 2105 could be fabricated in an uninterrupted operation by the droplet ejecting printer 2115. The sublayer 2130 can be provided with a different hardness than the polishing layer 2105 by using a different precursor and/or a different amount of curing, for example, a different intensity or duration of UV radiation. In other embodiments, the sublayer 2130 is fabricated by a conventional process and then secured to the polishing layer 2105. For example, the polishing layer 2105 can be secured to the sublayer 2130 by a thin adhesive layer such as a pressure sensitive adhesive.

In FIG. 21B, a print head 2126A having a nozzle 2135, can be used to dispense a pure liquid thermoset polymer precursor, while a print head 2126B having a nozzle 2135 may be used to liquid thermoset polymer precursor or a molten thermoplastic having abrasive particles 2145 contained therein. Droplets 2140 of the abrasive particles 2145 may be dispensed only at selected locations on the polishing pad 2132. These selected locations collectively form the target printing pattern of the abrasive particles and can be stored as a CAD-compatible file that is then read by an electronic controller (e.g., the controller 2111) that controls the droplet ejecting printer 2115. Electronic control signals are then sent to the droplet ejecting printer 2115 to dispense the premixed mixture only when the nozzle 2135 is translated to the position specified by the CAD-compatible file.

Alternatively, instead of using a liquid thermoset polymer precursor, the abrasive particles 2145 can be premixed with a molten thermoplastic. In this embodiment, the mixture with abrasive particles 2145 is also continuously agitated prior to being dispensed. After the mixture is dispensed from the droplet ejecting printer 2115 according to a target printing pattern, the molten portion of the mixture cools and solidifies, and the abrasive particles 2145 are frozen in place. The continuous agitation of the mixture ensures fairly uniform distribution of the abrasive particles 2145 in the precursor material. This can result in a more uniform distribution of particles 2145 through the polishing layer, which can lead to improved polishing uniformity and can also minimize agglomeration.

Similar to the case when liquid thermoset polymer precursor is used, the thermoplastic mixture can be uniformly dispensed to produce a uniform distribution of abrasive particles 2145 across the entire polishing layer 2105. Alternatively, the thermoplastic mixture containing the abrasive particles can be dispensed only at selected locations of the polishing layer 2105, according to a target printing pattern of the abrasive particles 2145 that is stored as a CAD-compatible file and read by an electronic controller used to drive the droplet ejecting printer 2115.

Rather than dispensing abrasive particles in a suspension from the nozzle 2135 coupled to the print head 2126B, abrasive particles can be dispensed directly in powder form from the nozzle 2135 of the print head 2126B, while the nozzle 2135 of the print head 2126A is used to dispense the pad polymer precursor. In one embodiment, the polymer precursor is dispensed before the abrasive particles 2145 are dispensed into the deposited polymer material, and the mixture is then subsequently cured.

Although 3D printing is particularly useful to construct the polishing pad 2132 using abrasive particles 2145, for example, alumina, ceria, and others, that would be prone to agglomeration, this approach can be used to dispense other abrasive particles. Thus, the abrasive particles can include silica, ceramic oxides, metals and hard polymers.

The droplet ejecting printer 2115 can deposit particles 2145 that are either solid or particles 2145 that have a hollow core. The droplet ejecting printer 2115 can also dispense different types of particles, some of which can undergo chemical reactions during CMP processing to produce target changes on layer or layers of the polishing pad 2132 as well a chemical reactions with a substrate that is being polished. Examples of chemical reactions used in CMP processing include chemical processes that occur within the basic pH range of 10-14 that involve one or more of potassium hydroxide, ammonium hydroxide and other proprietary chemical processes used by manufactures of slurry. Chemical processes that occur within an acidic pH range of 2-5 involving organic acids such as acetic acid, citric acid are also used in CMP processing. Oxidization reactions involving hydrogen peroxide are also examples of chemical reactions used in CMP processing. Abrasive particles 2145 can also be used to provide mechanically abrasive functions. The particles 2145 can have sizes up to 1 millimeter, or less, such as 10 microns, or less, for example 1 micron, or less. The particles 2145 can have different morphology, for example, the particles 2145 can be round, elongated or faceted.

The 3D printing approach allows tight tolerances to be achieved in patterns of the polishing layer 2105 and high tolerances in the distribution of abrasive particles 2145 that are embedded in the polishing layer 2105 due to the layer-by-layer printing approach.

Polishing Pads

Figure 22:
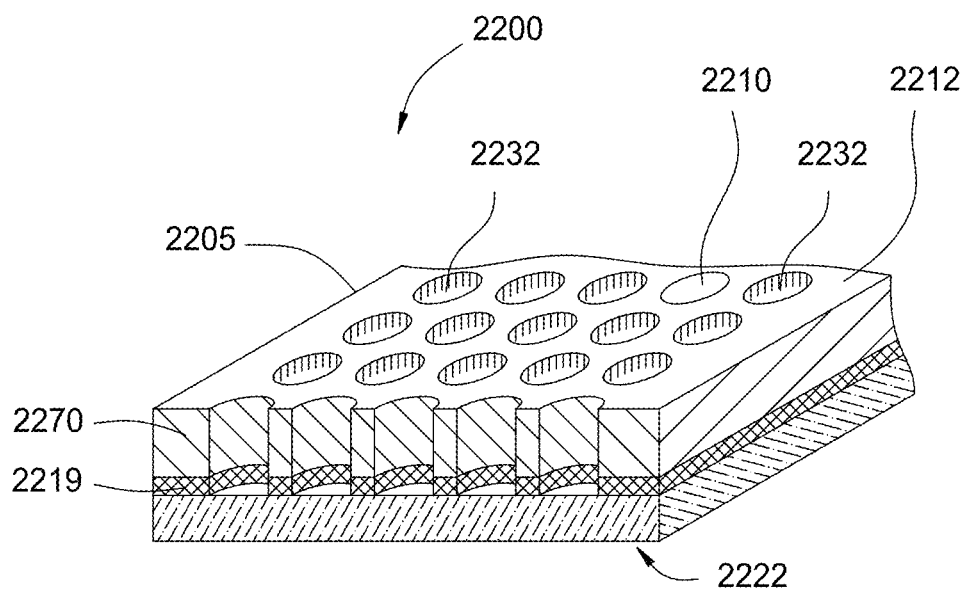
FIG. 22 is a schematic perspective view of a polishing pad according to an embodiment of the present disclosure.

FIG. 22 shows a portion of one embodiment of a polishing pad 2200 that may be used as the pad assembly 1913 described in FIG. 19, the printed pad 2008 (shown in FIG. 20A) or the polishing article 2029 (shown in FIG. 20B). The polishing pad 2200 includes a polishing surface 2205 forming the patterned surface 2028 of FIGS. 20A and 20B. The polishing surface 2205 includes a plurality of pores 2232 formed in the polishing material 2270. The polishing material 2270 may be bound to the backing material 2222 by a suitable adhesive 2219 that is chosen for resistance to chemical and physical elements used in CMP processes. The pores 2232 in the polishing pad 2200 are substantially circular or oval shapes, but may comprise other annular geometric shapes, such as a cone or hollow frustum, i.e., a cone between substantially parallel planes. The polishing pad 2200 may also be formed to match any of the polishing pad designs illustrated in FIGS. 14A-14O or other designs described herein.

In one embodiment, the pores 2232 may be hollow (i.e., empty space) that are sized and/or spaced to enhance slurry retention and aid in rolling of the polishing pad 2200. In other embodiments, the pores 2232 may be filled at least partially with a first material 2210 that is different that the polishing material 2270 (a second material 2212). The first material 2210 may be a polymer material that has a different reactivity to a curing method as compared to the second material 2212. For example, in one embodiment, the second material 2212 may be curable with UV energy while the first material 2210 is not significantly affected by UV energy. However, the first material 2210 may be cured thermally in one embodiment. In other embodiments, the first material 2210 and the second material 2212 may be cured at a different rate. In one embodiment, the polishing pad 2200 may be differentially cured using the first material 2210 and the second material 2212. In one example of differential curing, the first material 2210 and the second material 2212 of the polishing pad 2200 may be cured with UV energy that does not cure the first material 2210. This may make the second material 2212 harder than the first material 2210 which may add compressibility and/or flexibility to the polishing pad 2200 as the first material 2210 is more viscous than the second material 2212.

In one embodiment, the first material 2210 is thermally cured to make the pores 2232 having the first material 2210 disposed therein harder, but still softer and more compressible than the second material 2212. In another embodiment, the first material 2210 in the pores 2232 is cured thermally by heat produced by friction during a substrate polishing process. In this embodiment, the first material 2210 may be cured to be harder than the second material 2212 thus forming domains on the polishing surface 2205 that are harder than the surrounding second material 2212.

In other embodiments, the first material 2210 may have a different reactivity with electromagnetic energy, such as a beam or beams of energy from the electromagnetic energy source 1958 (shown in FIG. 19) when compared with the second material 2212. The different reactivity may be used to form a micro texture on the polishing surface 2205. The different reactivity between the first material 2210 and the second material 2212 may provide that the first material 2210 will be ablated at a greater rate than the second material 2212, or vice versa. The pores 2232 may be micron sized or nano sized materials that form micron sized or nano sized domains within the polishing surface 2205 of the polishing pad 2200. In one embodiment, the pores 2232 may include a mean diameter which is less than about 150 microns to about 10 microns, or less.

One embodiment of the present disclosure provides a polishing pad including a composite pad body. The composite pad body includes one or more first features formed from a first polymer material, and one or more second features formed from a second polymer material. The one or more first features and the one or more second features are formed by depositing a plurality of layers comprising the first polymer material and second polymer material. One of the first features or second features are differentially cured to provide a differential hardness or other useful material property therebetween. In one embodiment, the one or more first features and the one or more second features are arranged alternatively across the pad body. In one embodiment, the one or more first features are thicker than the one or more second features so that grooves and/or channels are formed on a top surface of the composite pad body. In one embodiment, the one or more first features comprise a plurality of concentric rings separated by the one or more second features. In one embodiment, the one or more first features comprise a plurality of columns surrounded by the one or more second features. In one embodiment, the one or more first features and one or more second features are formed by 3D printing. In one embodiment, the polishing pad further includes two or more composite pad bodies joined together at edges thereof. In one embodiment, the polishing pad further includes a sub pad body, wherein the composite pad body is formed over the sub pad body. In one embodiment, the one or more first features comprise a pore having a third material disposed therein. The third material is a thermally cured material. In one embodiment, the first polymer material has a first Young's modulus and the second polymer material has a second Young's modulus. In one embodiment, the first material has a higher modulus of elasticity than the second material.

Although polishing pads described herein are circular in shape, polishing particles according to the present disclosure may include any suitable shape, such as polishing webs configured to move linearly during polishing.

While the foregoing is directed to embodiments of the present disclosure, other and further embodiments of the disclosure may be devised without departing from the basic scope thereof, and the scope thereof is determined by the claims that follow.

The invention claimed is:

1. A method of forming a polishing pad, comprising:
depositing a plurality of composite layers with a printer to reach a target thickness, wherein depositing the plurality of composite layers comprises:
depositing a first material over one or more first regions of a surface; and
depositing a second material over one or more second regions of the surface, wherein the one or more first regions and the one or more second regions form a continuous part of each of the plurality of composite layers; and
solidifying the plurality of composite layers to form a composite pad body having one or more first features comprising the first material and one or more second features comprising the second material, wherein the one or more first features and the one or more second features form a unitary body.

2. The method of claim 1, wherein the first material comprises a first composition of materials that is formed by depositing droplets of a third material and a fourth material.

3. The method of claim 2, wherein the second material comprises a second composition of materials that is formed by depositing droplets of a fifth material and a sixth material.

4. The method of claim 1, further comprising depositing a plurality of discontinuous layers with a printer after depositing the plurality of composite layers, wherein each of the discontinuous layer comprises one or more feature regions that are disconnected from one another.

5. The method of claim 4, wherein the one or more feature regions are disposed over the one or more first regions.

6. The method of claim 4, wherein depositing each of the discontinuous layers comprises:
depositing the first material and the second material on each of one or more feature regions, wherein the second material surrounds the first material in each feature region.

7. The method of claim 1, wherein the first material comprises one or more thermoplastic polymers.

8. The method of claim 7, wherein the one or more thermoplastic polymers comprises polyurethane, polypropylene, polystyrene, polyacrylonitrile, polymethyle methacrylate, polychlorotrifluoroethylene, polytetrafluoroethylene, polyoxymethylene, polycarbonate, polyimide, polyetheretherketone, polyphenylene sulfide, polyether sulfone, acrylonitrile butadiene styrene (ABS), polyetherimide, polyamides, melamines, polyesters, polysulfones, polyvinyl acetates, fluorinated hydrocarbons, and acrylate, copolymers, grafts, and mixtures thereof.

* * * * *

UNITED STATES PATENT AND TRADEMARK OFFICE
CERTIFICATE OF CORRECTION

PATENT NO. : 10,537,974 B2
APPLICATION NO. : 15/876436
DATED : January 21, 2020
INVENTOR(S) : Rajeev Bajaj et al.

It is certified that error appears in the above-identified patent and that said Letters Patent is hereby corrected as shown below:

On the Title Page

On the Page 4, in Column 2, under "Other Publications", Line 67, delete "Ersosion" and insert -- Erosion --, therefor.

On the Page 5, in Column 1, under "Other Publications", Line 1, delete "Planariarization" and insert -- Planarization --, therefor.

On the Page 5, in Column 1, under "Other Publications", Lines 27-28, delete "Interprenetrating" and insert -- Interpenetrating --, therefor.

In the Specification

In Column 1, Line 14, after "2014." insert -- Each of the aforementioned patent applications is incorporated by reference. --.

In Column 5, Line 67 and Column 6, Line 1, delete "polymethyle methacrylate," and insert -- polymethylmethacrylate, --, therefor.

In Column 6, Line 30, delete "polymethyle methacrylate," and insert -- polymethylmethacrylate, --, therefor.

In Column 6, Line 58, delete "10 m Pa." and insert -- 10 MPa. --, therefor.

In Column 16, Line 18, delete "1400I" and insert -- 1400l --, therefor.

In Column 16, Line 19, delete "1402I" and insert -- 1402l --, therefor.

In Column 16, Line 19, delete "1404I." and insert -- 1404l. --, therefor.

Signed and Sealed this
Thirty-first Day of March, 2020

Andrei Iancu
*Director of the United States Patent and Trademark Office*

CERTIFICATE OF CORRECTION (continued)
U.S. Pat. No. 10,537,974 B2

In Column 16, Line 21, delete "1402I" and insert -- 1402l --, therefor.

In Column 16, Line 56, delete "FIG." and insert -- FIGS. --, therefor.

In Column 20, Line 32, delete "hydropropylmethylcellulose," and insert -- hydroxypropylmethylcellulose, --, therefor.

In Column 21, Line 29, delete "2000B" and insert -- 20B --, therefor.

In Column 23, Line 20, delete "meters)." and insert -- meters)). --, therefor.

In the Claims

In Column 28, Lines 21-22, in Claim 8, delete "polymethyle methacrylate," and insert -- polymethylmethacrylate, --, therefor.